(12) United States Patent
Kodan et al.

(10) Patent No.: US 7,150,334 B2
(45) Date of Patent: Dec. 19, 2006

(54) RADIATOR SUPPORT STRUCTURE

(75) Inventors: Keishi Kodan, Saitama (JP); Hideo Ogura, Saitama (JP); Hideo Amino, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/237,615

(22) Filed: Sep. 10, 2002

(65) Prior Publication Data

US 2003/0066697 A1 Apr. 10, 2003

(30) Foreign Application Priority Data

Sep. 17, 2001 (JP) .............................. 2001-282463

(51) Int. Cl.
*B60K 11/04* (2006.01)

(52) U.S. Cl. ...................................... 180/68.4; 180/229

(58) Field of Classification Search ............... 180/68.4, 180/68.1, 219, 229; 248/232; 165/41
See application file for complete search history.

(56) References Cited

U.S. PATENT DOCUMENTS

| | | | |
|---|---|---|---|
| 2,071,761 A * | 2/1937 | Nicholson | 180/226 |
| 3,937,484 A * | 2/1976 | Morioka et al. | 180/219 |
| 3,944,009 A * | 3/1976 | Katagiri | 180/219 |
| 4,011,921 A * | 3/1977 | Sakamoto et al. | 180/229 |
| 4,019,595 A * | 4/1977 | Imai et al. | 180/229 |
| 4,237,996 A * | 12/1980 | Matsuda et al. | 180/229 |
| 4,396,086 A * | 8/1983 | Hattori | 180/229 |
| 4,461,366 A * | 7/1984 | Honda | 180/229 |
| 4,478,306 A * | 10/1984 | Tagami | 180/229 |
| 4,641,721 A * | 2/1987 | Yamaguchi | 180/229 |
| 4,678,054 A * | 7/1987 | Honda et al. | 180/225 |
| 4,745,887 A * | 5/1988 | Ito et al. | 123/90.31 |
| 4,876,778 A * | 10/1989 | Hagihara et al. | 29/890.046 |
| 4,971,171 A * | 11/1990 | Yamada et al. | 180/68.1 |
| 5,211,255 A * | 5/1993 | Fukuda | 180/219 |
| 5,390,758 A * | 2/1995 | Hunter et al. | 180/228 |
| 5,566,746 A * | 10/1996 | Reise | 165/41 |
| 5,984,035 A * | 11/1999 | Katoh et al. | 180/68.1 |
| 6,019,161 A * | 2/2000 | Travis | 165/41 |
| 6,073,719 A * | 6/2000 | Ohmika et al. | 180/219 |
| 6,851,499 B1 * | 2/2005 | Yagisawa et al. | 180/219 |

FOREIGN PATENT DOCUMENTS

JP 2834998 B 10/1998

* cited by examiner

*Primary Examiner*—Christopher P. Ellis
*Assistant Examiner*—Bridget Avery
(74) *Attorney, Agent, or Firm*—Birch, Stewart, Kolasch & Birch, LLP

(57) ABSTRACT

A radiator support structure in which in case a radiator is supported in a housed state between down pipes, the effective area of the radiator can be increased. A radiator is supported in a housed state between down pipes branched in two directions from a head pipe and extended downward. An upper part support is provided on the upper surface of the radiator, a lower part support is provided on the lower surface of the radiator, and the radiator is supported by the down pipes via the upper part support and the lower part support.

12 Claims, 41 Drawing Sheets

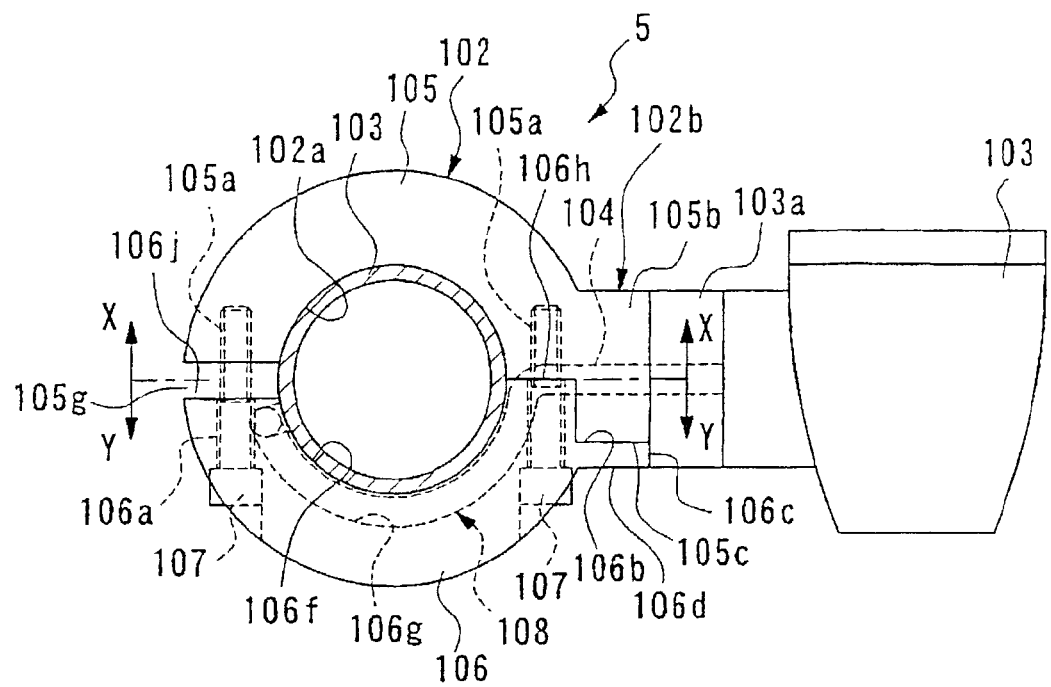
FIG. 4
[図 5]
Fig. 5
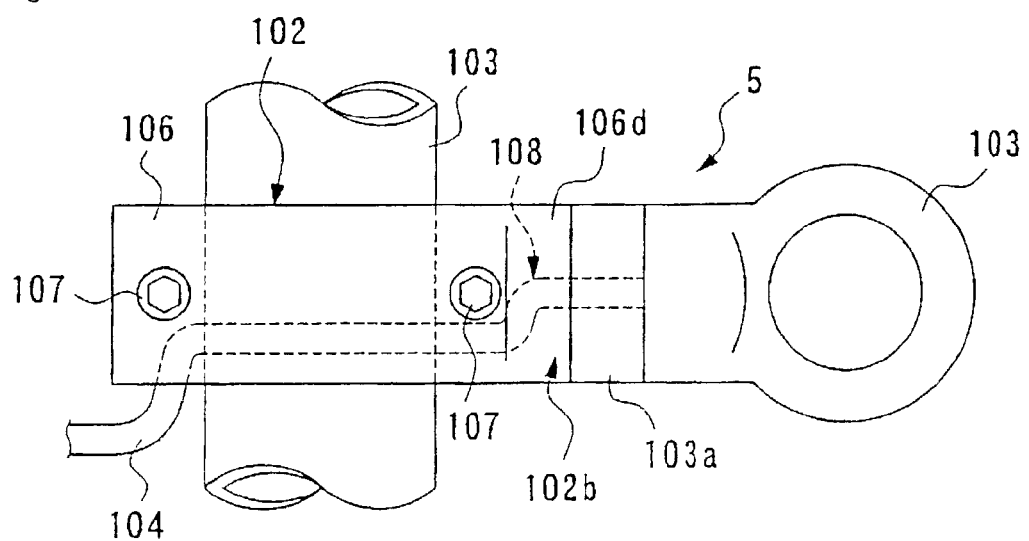
FIG. 5

RADIATOR SUPPORT STRUCTURE

CROSS-REFERENCE TO RELATED APPLICATION

The present application claims priority under 35 U.S.C. §119 to Japanese Patent Application No. 2001-282463, filed Sep. 17, 2001, the entire contents of which are hereby incorporated by reference.

BACKGROUND OF THE INVENTION

1. Field of the Invention

The present invention relates to radiator support structure that supports a radiator with a body frame in a motorcycle.

2. Description of Background Art

Conventionally, when a radiator is supported with a body frame in a motorcycle, it is supported in a state that it is housed between a head pipe that supports a front fork of the body frame and a down pipe that branches in two directions and is extended downward for a reason such as design. One example of such a conventional radiator support structure is disclosed in a U.S. patent application Ser. No. 2,834,998. For the radiator support structure, a side supporting part is provided on the right and left sides of a radiator, a lower part supporting part is provided on the lower part and the radiator is supported by down pipes via these side supporting part and lower part supporting part.

However, as described above, the side supporting part and a supporting member for supporting the radiator by the down pipes via the side supporting part are arranged between the radiator and the down pipe. As a result, the width of the radiator must necessarily be reduced by the amount of these side supporting parts. Thus, the effective area of the radiator is reduced.

SUMMARY AND OBJECTS OF THE INVENTION

Therefore, the object of the present invention is to provide radiator support structure in which the effective area of a radiator can be increased while in a state housed between down pipes.

To achieve this object, a first aspect of the present invention provides a radiator support structure in which a radiator 10 is supported in a housed state between a head pipe (for example, a head pipe 21 in the embodiment) of a body frame (for example, a body frame 2 in the embodiment) that supports a front fork (for example, a front fork 3 in the embodiment) and a down pipe (for example, a down pipe 33 in the embodiment) branched in two directions and extended downward. An upper part support (for example, an upper part support 662 in the embodiment) is provided on the upper surface (for example, an upper surface 655 in the embodiment) of the radiator, a lower part support (for example, a lower part support 665 in the embodiment) is provided on the lower surface (for example, a lower surface 658 in the embodiment) of the radiator and the radiator is supported by the down pipes via the upper part support and the lower part support.

Therefore, as the radiator is supported by the down pipes via the upper part support provided on the upper surface of the radiator and the lower part support provided on the lower surface of the radiator, a part for coupling the radiator and the down pipe is not required to be arranged between the radiator and the down pipe even if the radiator is supported in a housed state between the down pipes. Accordingly, the width of the radiator housed between the down pipes can be increased.

According to a second aspect of the present invention, the lower part support 665 is supported by a supporting member (for example, an engine hanger 664 in an embodiment) for supporting an engine by the down pipe.

As described above, since the lower part support is supported by the supporting member for supporting the engine by the down pipe, a separate supporting member is not required to be provided only to support the lower part support.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a plan showing a winder of the motorcycle to which the embodiment of the invention is applied;

FIG. 5 is a side view showing the winker of the motorcycle to which the embodiment of the invention is applied;

DETAILED DESCRIPTION OF THE PREFERRED EMBODIMENTS

Figure 1:
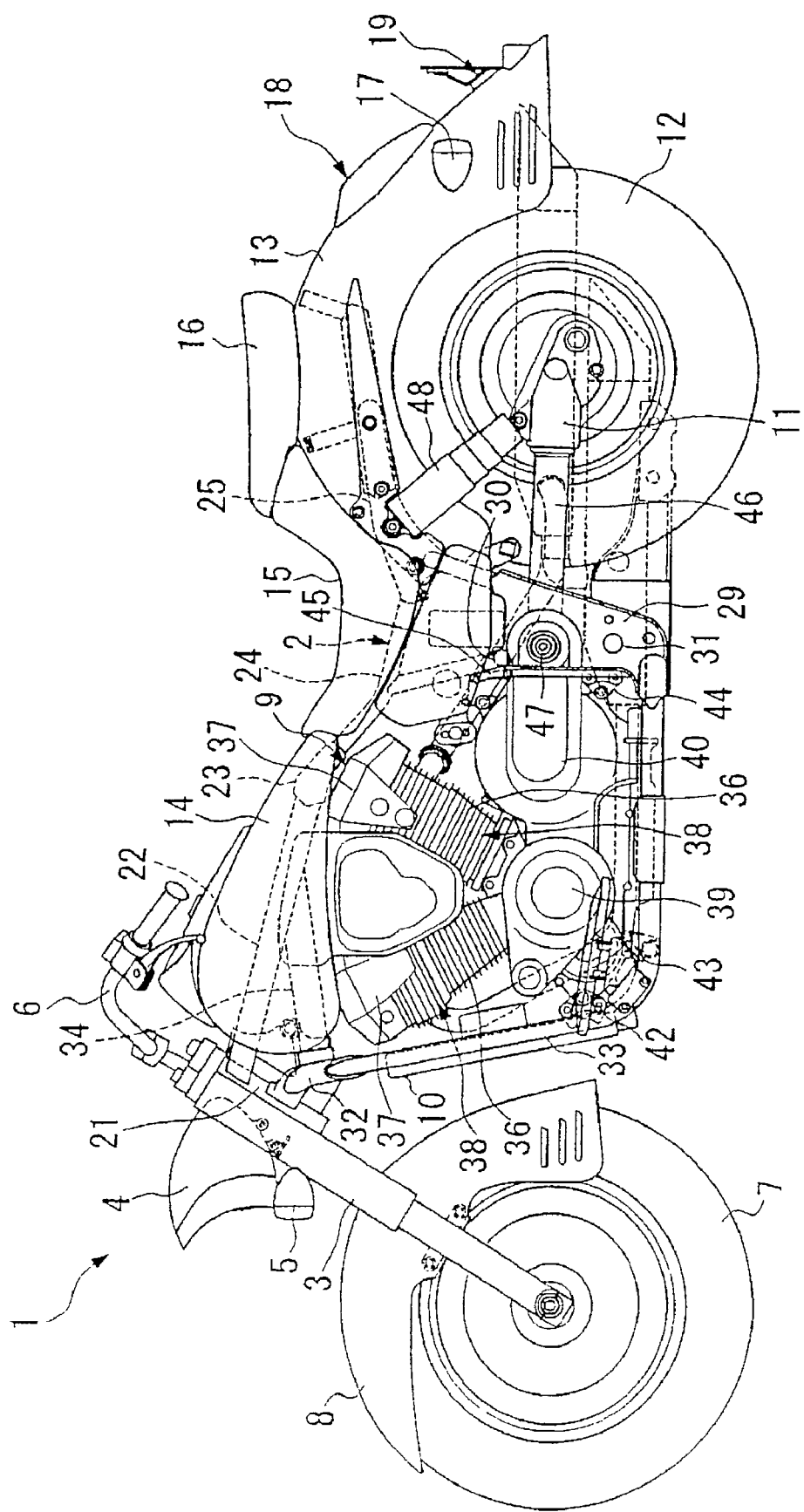
FIG. 1 is a side view showing a motorcycle to which one embodiment of the invention is applied.

Referring to the drawings, one embodiment of the invention will be described below. Directions such as the front, the rear, the right and the left in the description denote directions in a vehicle body.

FIG. 1 is a side view showing the whole configuration of a motorcycle to which this embodiment is applied.

The motorcycle 1 is a so-called American type and is provided with a body frame 2, a front fork 3 having a pair of right and left ends and supported at the front end of the body frame 2 so that the front fork can be turned, a headlight 4 provided on an upper part of the front fork 3, a pair of right and left front winkers provided under the headlight 4 of the front fork 3 and a steering handlebar 6 attached to the upper end of the front fork 3 and arranged in an upper part of the front of the vehicle body.

The motorcycle 1 is also provided with a front wheel 7 supported by the front fork 3 so that the front wheel can be turned, a front fender 8 supported by the front fork 3 and covering the upside of the front wheel 7, an engine 9 supported by the body frame 2, a radiator 10 arranged ahead of the engine 9, a rear swing arm 11 provided on the rear of the vehicle body so that the rear swing arm can be swung around right and left axles with the body frame 2, a rear wheel 12 suspended from the rear end of the rear swing arm 11 so that the rear wheel can be turned and turned by the driving force of the engine 9 and a rear fender 13 supported by the body frame 2 and covering the upside of the rear wheel 12.

Further, the motorcycle 1 is provided with a teardrop-type fuel tank 14 arranged in the upper part of the body frame 2, a main seat 15 which is arranged at the back of the fuel tank 14 and on which a rider sits, a pillion seat 16 provided on the rear fender 13 on the rear side of the main seat 15 for an occupant to sit, a pair of right and left rear winkers 17 provided on the rear part of the rear fender 13, a brake lamp 18 provided on the center of the rear part of the rear fender 13 and license plate fittings 19 provided on the rear end of the rear fender 13.

Figure 2:
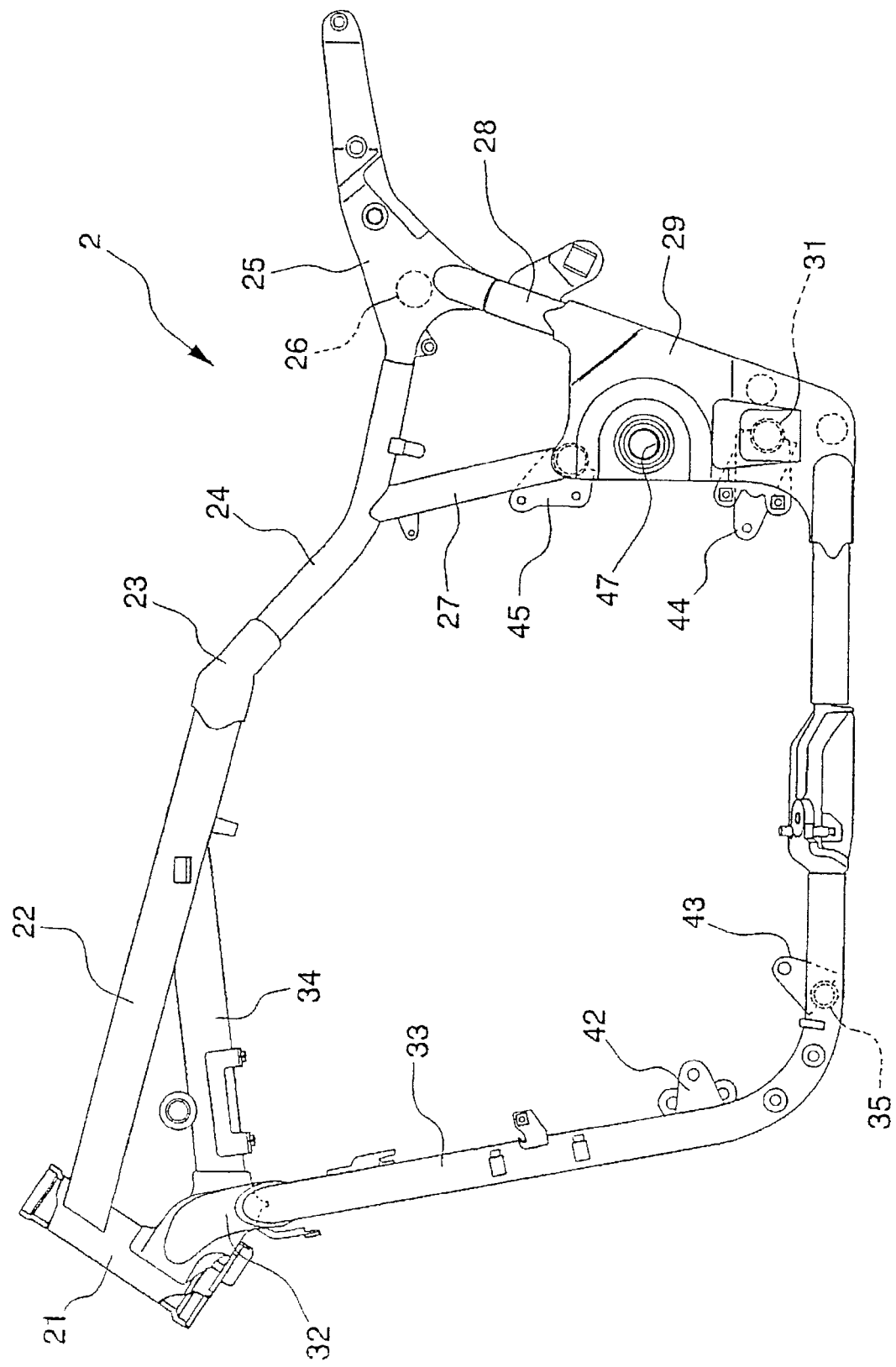
FIG. 2 is a side view showing a body frame of the motorcycle to which the embodiment of the invention is applied.
Figure 3:
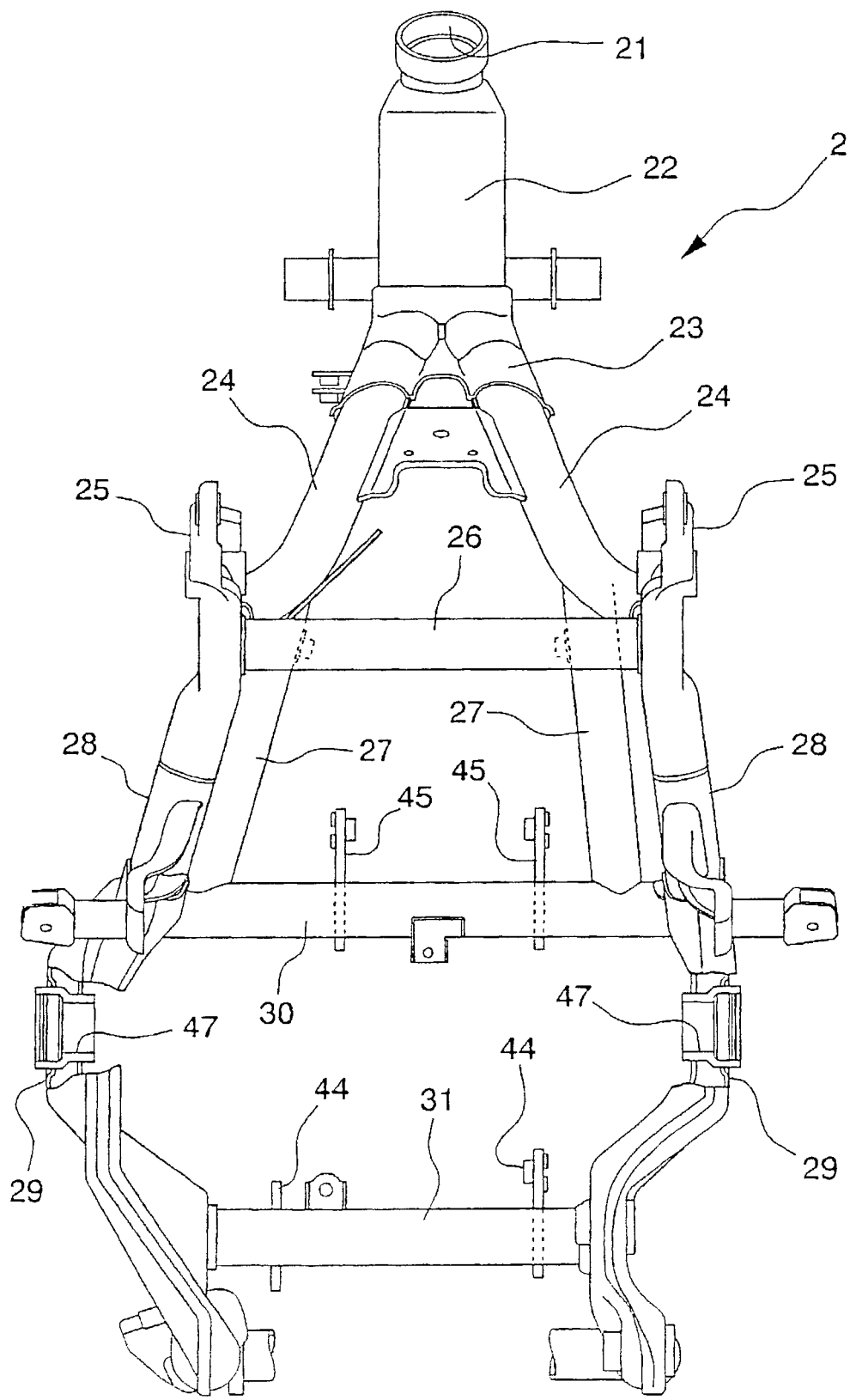
FIG. 3 is a back view showing the body frame of the motorcycle to which the embodiment of the invention is applied.

As shown in FIGS. 2 and 3, the body frame 2 is provided with a head pipe 21 at the front end, a main pipe 22 extended backward from an upper part of the head pipe 21, an upper pipe joint 23 welded to the rear part of the main pipe 22, a pair of right and left center upper pipes 24 extended backward from the upper pipe joint 23 in a state in which the center upper pipes are separated right and left, a pair of right and left rear brackets 25 coupled to each center upper pipe 24, and a rear cross pipe 26 for coupling the right and left rear brackets 25. Also provided are a center pipe 27 extended downward from each center upper pipe 24, a rear pipe 28 extended downward from each rear bracket 25, a pair of right and left pivot plates 29 each of which is coupled to each lower side of the center pipe 27 and the rear pipe 28, a cross pipe 30 for coupling the right and left pivot plates 29 in the upper part, a cross pipe 31 for coupling the right and left pivot plates 29 in the lower part, a gusset 32 welded to a lower part of the head pipe 21, a pair of right and left down pipes 33 each of which is separated right and left from the gusset 32, each of which is extended in a state in which it is tilted downward and slightly diagonally backward, each of which is extended substantially horizontally backward from the lower part and each of which is coupled to the pivot plate 29, a subpipe 34 for coupling the gusset 32 and the main pipe 22 on the down side of the main pipe 22 and a front cross pipe 35 for coupling the right and left down pipes 33.

The engine 9 is a V-type two-cylinder four-cycle engine provided with a pair of front and rear cylinder blocks 38 each of which has a cylinder head 37 and a cylinder 36 and a crankcase 39 provided under the cylinder blocks 38, and a transmission 40 is coupled to the rear side of the crankcase 39 of the engine 9. The engine 9 and the transmission 40 are supported by the body frame 2 by coupling the front of the crankcase 39 to the down pipe 33 via a bracket 42, coupling an intermediate part of the crankcase 39 to the front cross pipe 35 via a bracket 43, coupling a lower part on the rear side of the transmission 40 to the cross pipe 31 via a bracket 44 and further coupling an upper part on the rear side of the transmission 40 to the cross pipe 30 via a bracket 45.

For the rear swing arm 11, a pair of right and left fork parts 46 are extended backward from the base at the front end and rear swing arm can be swung perpendicularly based upon a pivot 47 because the base is supported by the pivot 47 provided on each pivot plate 29. A pair of right and left rear cushion units 48 are provided among the side of each end of the rear swing arm 11 and each rear bracket 25 and hereby, vibration which the rear wheel 12 receives from a road surface is relieved and absorbed.

As shown in FIGS. 4 and 5, the front winker 5 is provided with a winker holder 102 attached to the front fork 3 of the motorcycle 1, a winker 103 supported on the outside of the winker holder 102 via a winker supporting base 103a and a winker cord 104 lead from the winker 103 and extracted outside via the inside of the winker holder 102.

The winker holder 102 includes of a pair of holder members 105 and 106 acquired by dividing a member provided with a cylindrical protruded part 102b to one side (the outside) of a cylinder having a hole 102a having an inside diameter substantially equal to the diameter of the peripheral part of the front fork 3 substantially into two by a plane along the axis of the cylinder. The winker holder 102 is attached to the front fork 3 so that the winker holder can be detached from the front fork by arranging each holder member 105, 106 before and after the front fork 3 with the front fork 3 between each holder member, fitting bolts 107, 107 inserted from bolt holes 106a, 106a made on both sides of the other (the rear) holder member 106 into screw holes 105a, 105a provided on both sides of one (the front) holder member 105 and tightening the bolts.

A protruded part 105b outside the one holder member 105 has a substantially cylindrical shape having a plane 105c acquired by cutting a part on the side of the other holder member 106 of the one holder member, and the winker 103 is supported by the holder member 105 by coupling the protruded part 105b to the winker supporting base 103a of the winker 103 so that the protruded part can be detached by a screw or other suitable tightening means.

Figure 6:
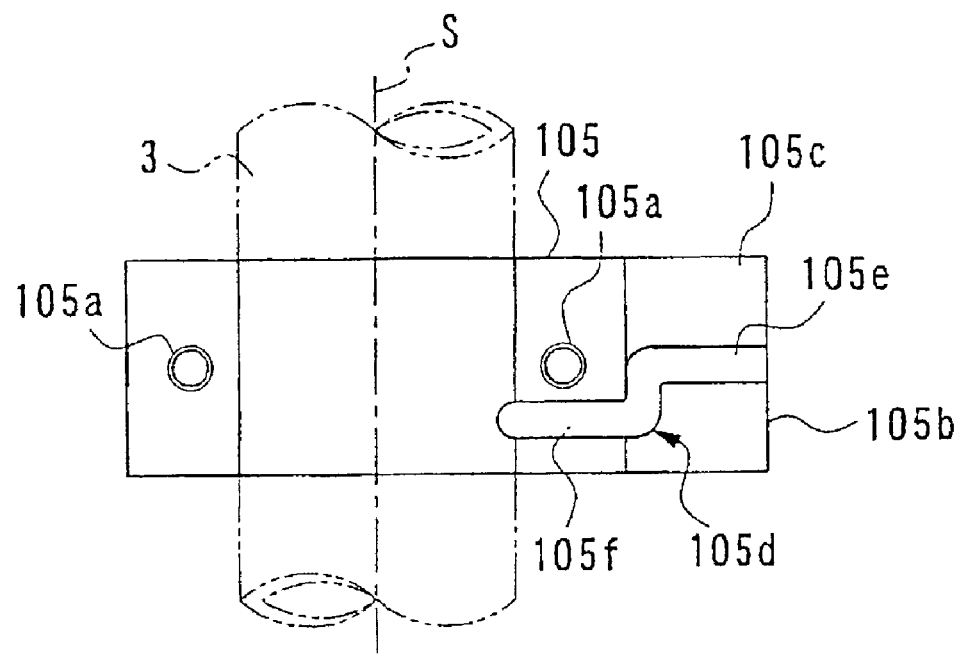
FIG. 6 is a view viewed along a line X—X in FIG. 4 showing the winker of the motorcycle to which the embodiment of the invention is applied.

In the one holder member 105, a grove 105d open to the side of the outside end (the side of the winker supporting base 103a), open to the side of the other holder member 106 and cranked when the groove is viewed from the side as shown in FIG. 6 continues to the inner part in contact with the peripheral surface of the front fork 3 of the holder member 105 through the downside of the screw hole 105a after the groove is extended to a part close to the screw hole 105a in a direction of the axis of the protruded part 105b (in a direction perpendicular to the axis S of the winker holder 102).

The cross section of a groove part 105f located below the screw hole 105a of the groove 105d is substantially semi-circular. A groove part 105e along the axis of the protruded part 105b of the groove 105d may be also formed as a hole the side of the other holder member 106 of which is closed in place of forming as a groove. The width of the groove 105d or the diameter of the hole in place of the groove 105d is formed so that it is slightly larger than the diameter of the winker cord 104.

Figure 7:
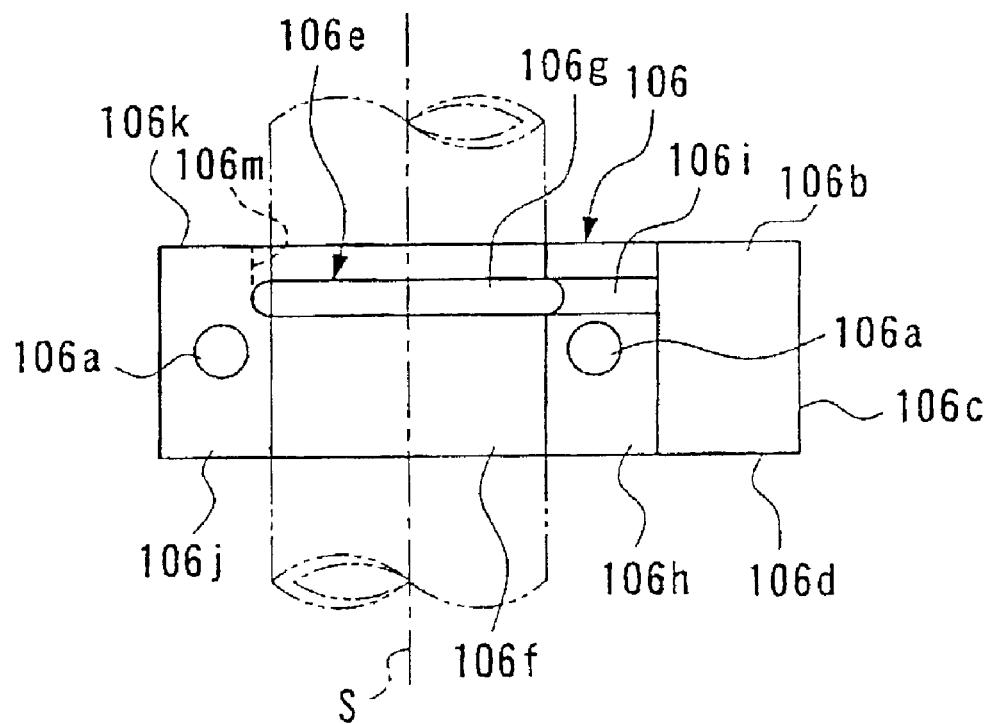
FIG. 7 is a view viewed along a line Y—Y in FIG. 4 showing the winker of the motorcycle to which the embodiment of the invention is applied.

For the other holder member 106, as shown in FIG. 7, a protruded part 106d forming the cylindrical protruded part 102b together with the protruded part 105b is provided on the side of the outside end (on the side of the winker supporting base 103a) by touching the joining surface 106b to the cut plane 105c of the protruded part 105b of the one holder member 105 and touching the outside end 106c to the winker supporting base 103a. A groove 106e, one end of which is connected to the groove part 105f in the one holder member 105 and which is open downward on the side of the other end (on the side reverse to the protruded part 106d) after the groove is extended in a direction perpendicular to the direction S of the hole 102a of the winker holder 102, is provided inside the other holder member 106.

The groove 106e includes an annular groove 106g having the width and the depth respectively slightly larger than the diameter of the winker cord 104 and formed along the periphery of the inner surface 106f in the shape of an arc being in contact with the front fork 3, and a groove part 106i continuing to the side of one end (the side on which the protruded part 106b exists) of the annular groove 106g, formed along the contact surface 106h of the other holder member 106 being in contact with the one holder member 105 and having a semicircular cross section having the diameter slightly larger than the diameter of the winker cord 104. The groove 106e also includes a groove part 106m which is formed in the vicinity of an opposite face 106j of the other holder member 106 opposite to the one holder member 105 via clearance 105g, the upper end of which (the lower end in FIG. 7) communicates with the side of the other end of the annular groove 106g (the side reverse to the side on which the protruded part 106b exists), the lower end of which (the upper end in FIG. 7) is open to the surface 106k at the lower end (the surface at the upper end in FIG. 7) of the other holder member 106 and which has the width and the depth respectively slightly larger than the diameter of the winker cord 104.

The groove 105*d* of the one holder member 105 and the groove 106*e* of the other holder member 106 form a cord insertion hole 108 for inserting the winker cord 104 into the inside of the winker holder 102. In the cord insertion hole 108, after the winker cord 104 led out of the winker supporting base 103*a* of the winker 103 is inserted into the groove part 105*e* of the protruded part 105*b*, the winker cord rounds the periphery of the front fork 3 by a half through the annular groove 106*g* from the groove parts 105*f* and 106*i*, detouring the bolt hole 106*a*, is extracted outside from the lower end of the other holder member 106 via the groove part 106*m* and is wired to required locations.

Though the following is not shown, a part for mounting the protruded part 102*b* (the protruded parts 105*b* and 106*b*) of the winker holder 102 and the winker supporting base 103*a* of the winker 103 is sealed so that rainwater is prevented from entering the inside of the winker 103 via the cord insertion hole 108.

It is described above that the front winker 5 is attached to the pipe on the right side of the front fork 3 (the right side in a traveling direction of the motorcycle 1), however, the configuration of a front winker attached to the left side of the front fork 3 is the same except that it is alternated with the front winker 5 on the right side.

A license light 110 and a license plate (a number plate) 111 illuminated by the license light are attached to the license plate fittings 19.

Figure 8:
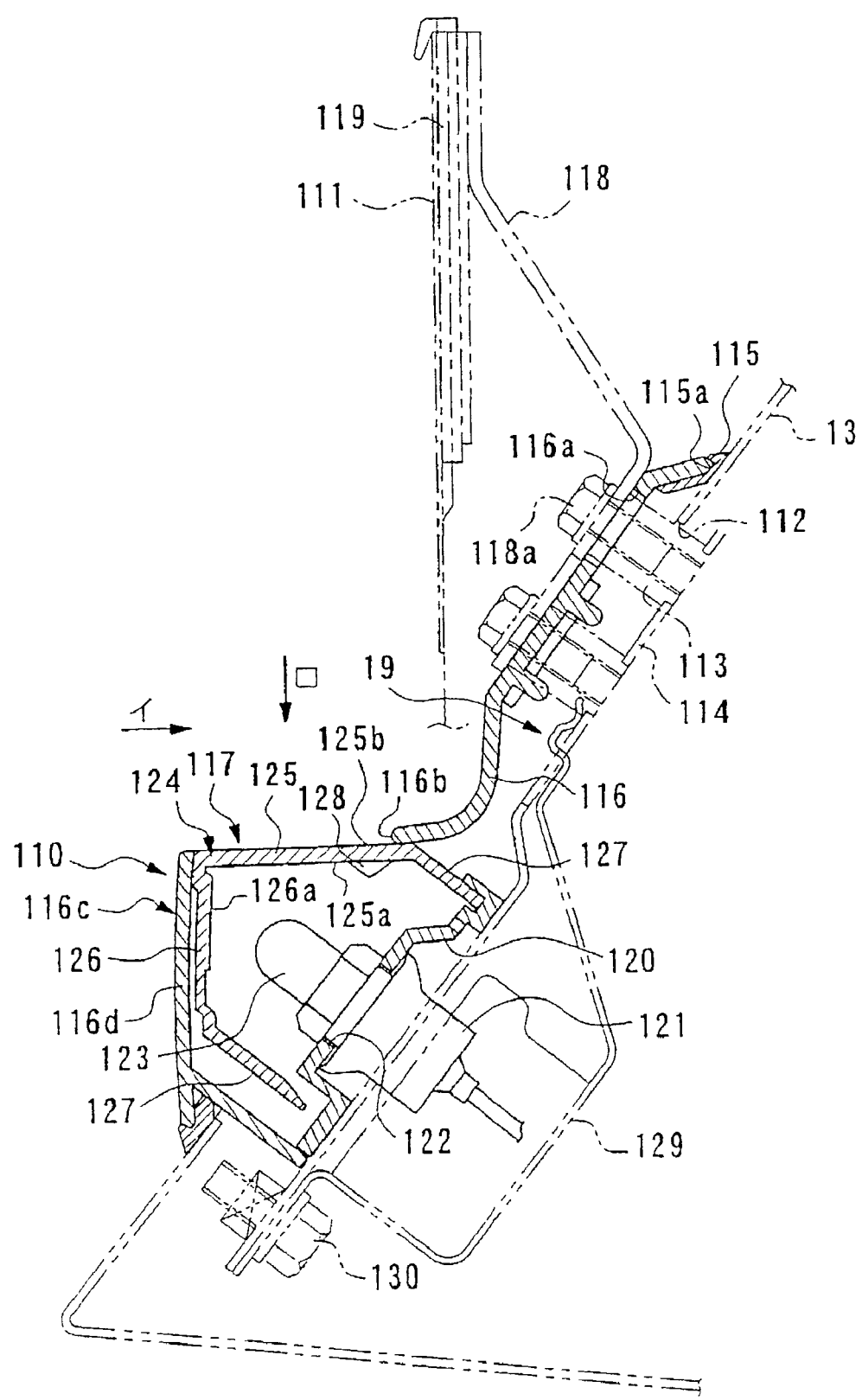
FIG. 8 is a longitudinal sectional view showing a license light of the motorcycle to which the embodiment of the invention is applied.
Figure 9:
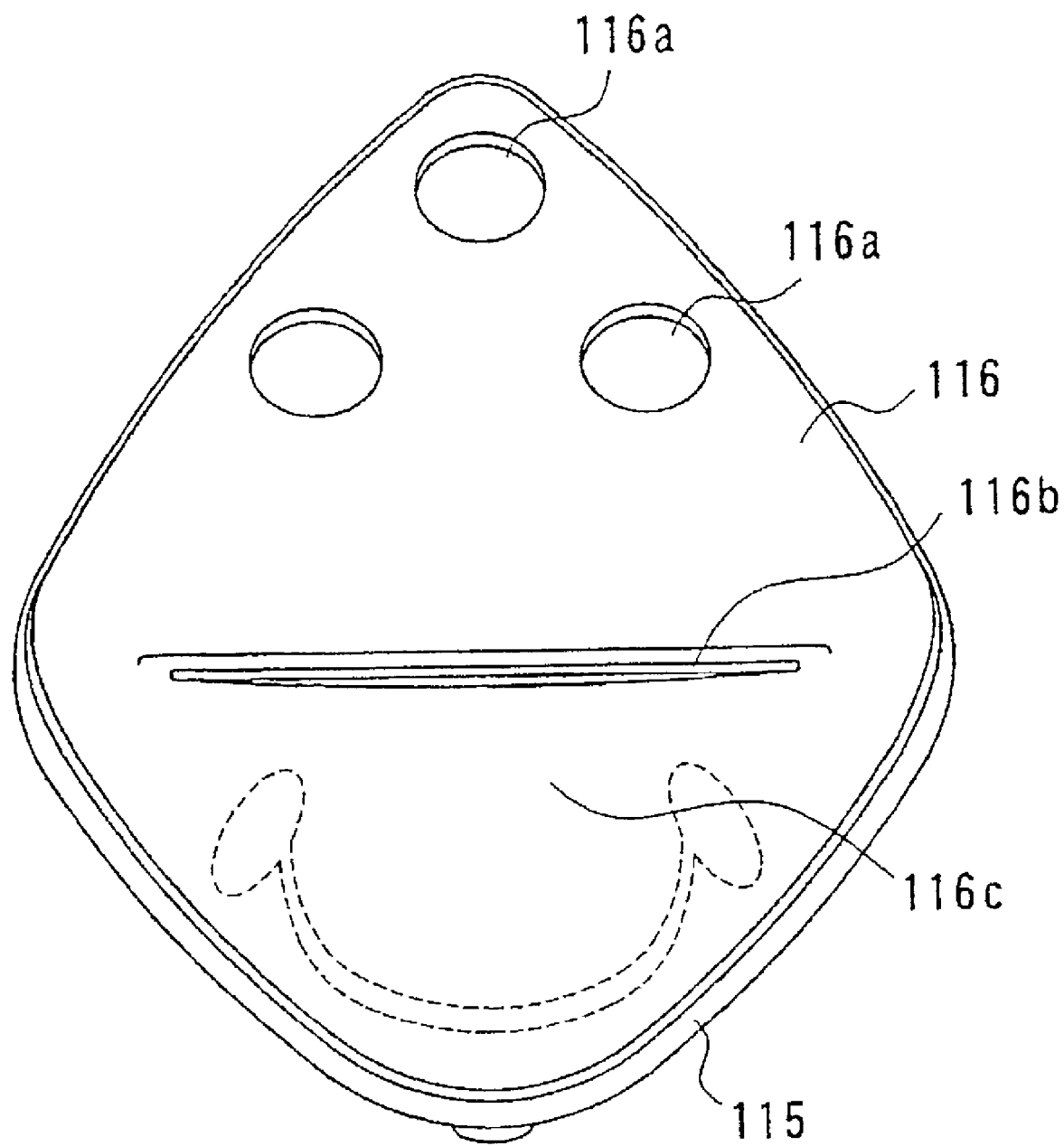
FIG. 9 is a view viewed along an arrow a in FIG. 8 showing the motorcycle to which the embodiment of the invention is applied.

As shown in FIG. 8, a mounting plate 114 corresponding to a substantially diamond-shaped opening 112 and having three female screw members 113 in an upper part on the rear side is fixed to the rear end of the rear fender 13, substantially diamond-shaped and ring-shaped cushion rubber 115 is fastened to the side of the surface so that the cushion rubber surrounds a margin of the opening 112, the margin of a rounded substantially diamond-shaped light cover 116 shown in FIG. 9 of the license light 110 is installed in an annular groove 115*a* formed along the periphery of the cushion rubber 115 and covers the opening 112.

Three holes 116*a* for inserting the female screw members 113 are provided on an upper part of the light cover 116, a light container 116*c* having an opening 116*b* substantially in the shape of an arc the rear side of the vehicle body of which is convex when the container is viewed from the top or in the shape of a triangle the convex portion of which is rounded in the upper part is provided on the lower part and the body of a light 117 of the license light 110 is installed in the light container 116*c*. A mounting plate 118 is fixed to the female screw member 113 of the mounting plate 114 inserted into the hole 116*a* of the light cover 116 by a bolt 118*a* and the number plate 111 is fixed to the mounting plate 118 via a supporting plate 119.

The body of the lamp 117 is provided with a base 120, a lamp 123 fixed to the base 120 via a bayonet-type mounting hole 122 screwed into a socket 121 and provided on the base 120 and a lens 124 fixed to the base 120 so that the lens surrounds the lamp 123. The lens 124 is composed of a horizontal upper surface 125 substantially in the shape of an arc the rear side of the vehicle body of which is convex when the upper surface is viewed from the top or in the shape of a triangle the convex portion of which is rounded, a vertical side 126 connected to the periphery of the upper surface 125 downward and a cylindrical barrel 127 respectively connected to the upper surface 125 and the base of the side 126. The lens is substantially in the shape of a pentagon the section along the center line of the vehicle body of which releases one side, a part of a free end of the barrel 127 is bonded to the surface of the base 120 by welding and others and hereby, the lens 124 is integrated with the base 120.

Figure 10:
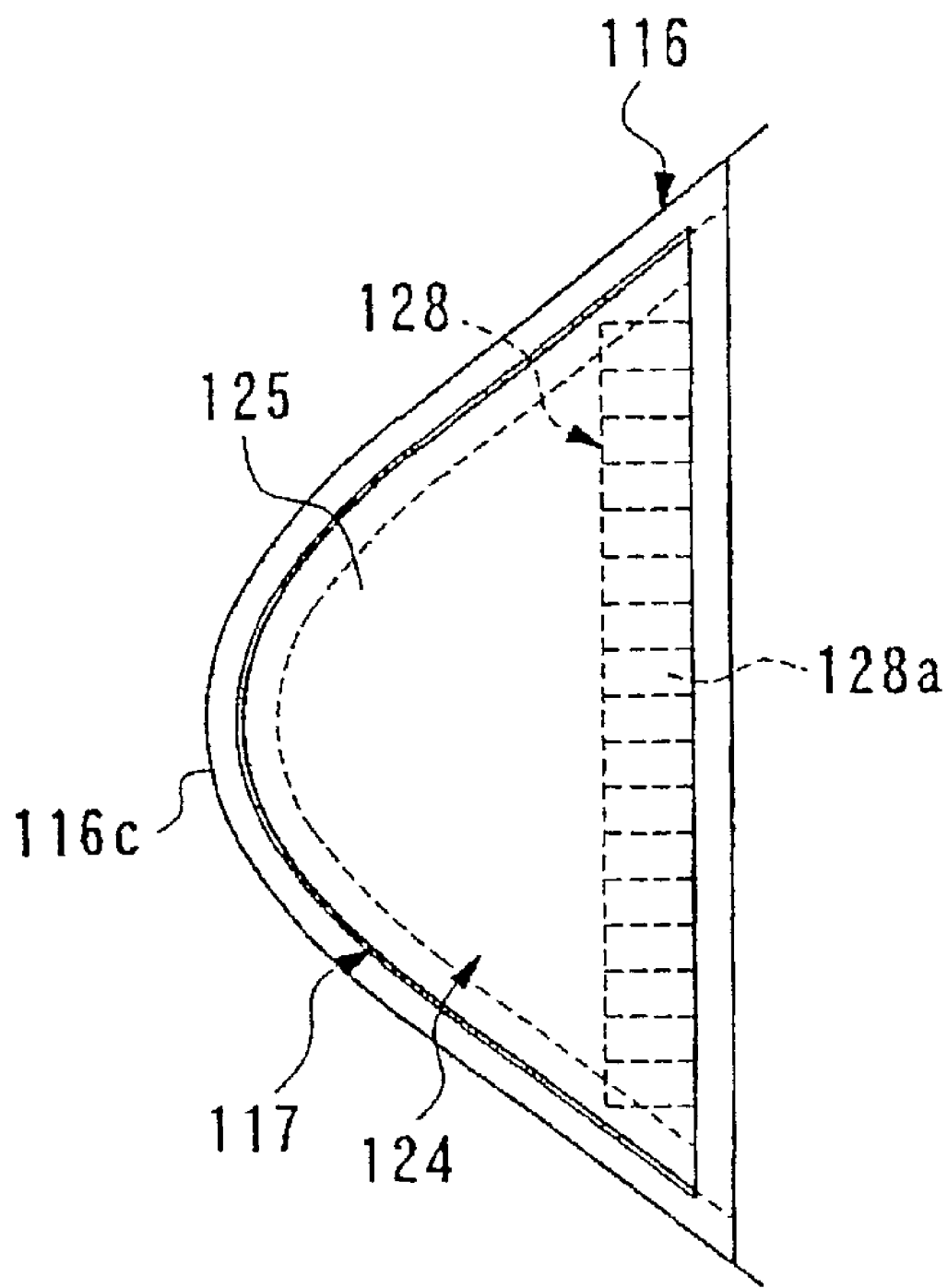
FIG. 10 is a view viewed along an arrow b in FIG. 8 showing the motorcycle to which the embodiment of the invention is applied.

The upper surface 125 of the lens 124 is substantially in the shape of an arc the rear side of the vehicle body of which is convex when the shape is viewed from the top or in the shape of a triangle the convex portion of which is rounded as shown in FIG. 10, a prism 128 is provided on one (the inside adjacent to the lamp 123) lens surface 125*a* on the side of the base and the other (the outside apart from the lamp 123) lens surface 125*b* is smoothed. For the prism 128, plural prism elements 128*a* parallel to the center line of the vehicle body are arranged in a right-angled direction with the center line. Each prism element 128*a* is in the shape of a four-sided pyramid the top of which is protruded on the side of the lamp 123 and which is longer before and after and is integrated with the lens surface 125*a* of the upper surface 125 as a so-called fish eye cut surface.

The side 126 has a curved surface substantially along the shape of the upper surface 125 and a reflecting surface 126*a* to which surface roughening for reflecting light from the lamp 123 is applied in a range of the curved surface close to the prism 128 is provided on the upside of the inner surface on the side adjacent to the lamp 123.

The body of the lamp 117 is inserted into the light container 116*c* of the light cover 116 in a state in which the convex portion of the lens 124 is directed to the rear of the vehicle body and the upper surface 125 is directed upward, the upper surface 125 is exposed from the opening 116*b*, and the side 126 is installed in the light container 116*c* by touching the side 126 to the rear side of a rear wall 116*d* formed in the similar curved surface to the side 126 of the lens 124 in the light container 116 and fixing the side 126 to the back of the rear wall 116*d* by a bolt not shown. A reference number 129 denotes a back cover covering the side of the socket 122 of the lamp 123, the side of the upper end is inserted into a fitting hole of the mounting plate 114 and the side of the lower end is fixed to the mounting plate 114 by a bolt 130.

Figure 11:
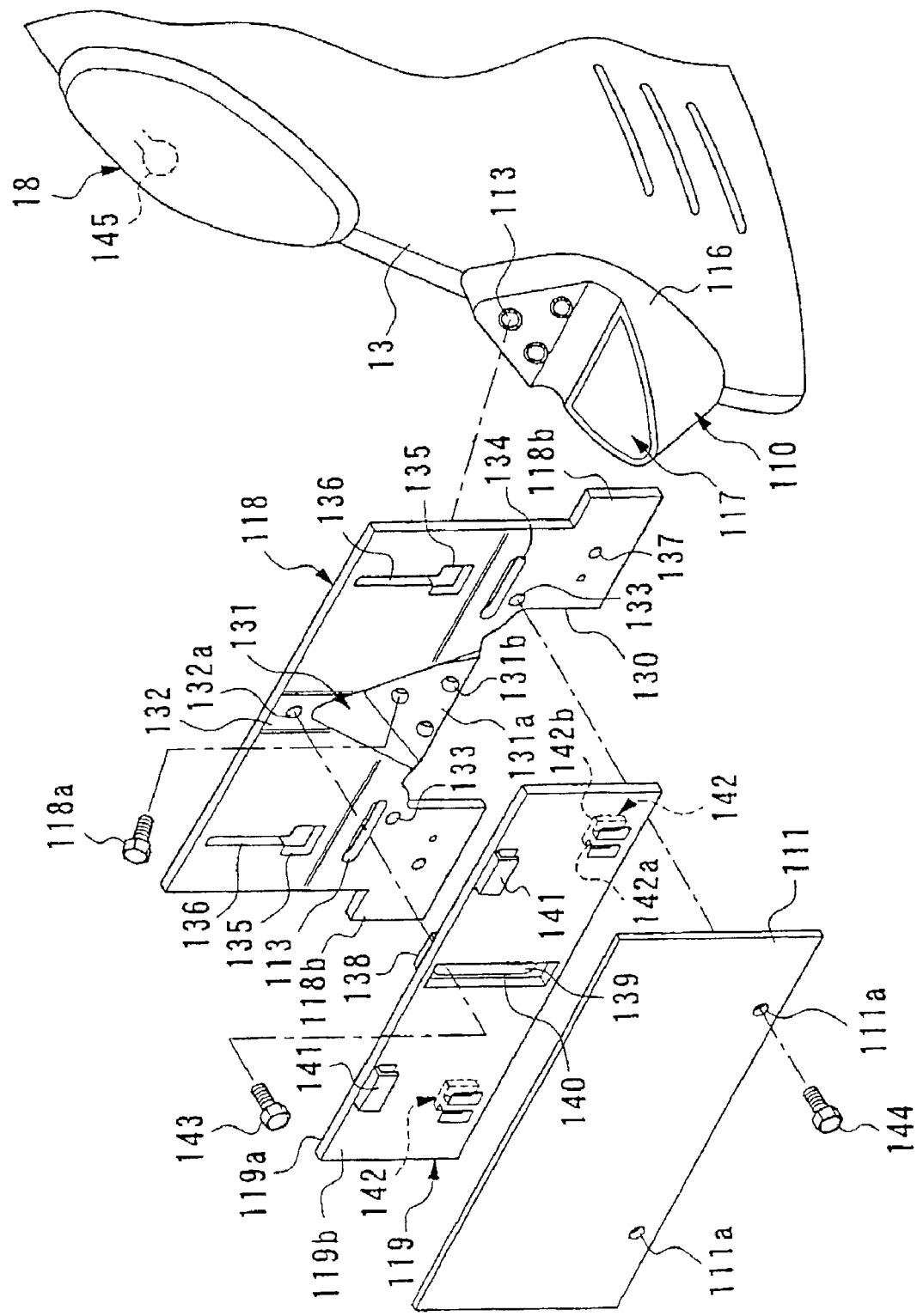
FIG. 11 is a perspective view showing license plate mounting structure of the winker of the motorcycle to which the embodiment of the invention is applied.

Next, referring to FIG. 11, the mounting place 118 for mounting the license plate 111 on the license plate fittings 19 and a supporting plate 119 will be described. The mounting plate 118 is formed by a substantially rectangular plate having protruded parts 118*b*, 118*b* slightly longer sideways and protruded on the right and the left on the side of the lower end, the center is cut 130 substantially in the shape of a rectangle longer sideways in a lower part, a concave portion 131 in the shape of a triangular pyramid is provided over the cut part 130 and further, a bolt hole 132*a* is made in a flat concave portion 132 provided over the concave portion 131.

A triangular mounting plate 131*a* equivalent to the bottom of the triangular pyramid of the concave portion 131 is tilted so that the front side of the vehicle body is higher, three bolt holes 131*b* are made close to a position equivalent to each top of the triangle and the mounting plate 118 is attached to the license plate fittings 19 by fitting and tightening the bolt 118*a* inserted into the bolt hole 131*b* into the female screw member 113 fixed to the mounting plate 114 shown in FIG. 8 of the license plate fittings 19 in a state in which the surface of the plate is vertical ahead of and above the body of the light 117 of the license light 110.

Further, bolt holes 133, 133 for mounting the license plate and long holes 134, 134 longer sideways located over the bolt holes are provided on the mounting plate 118 in symmetrical positions on both sides near to the upper end of the cut part 130, sliding holes 136, 136 longer longitudinally which are located over the long holes 134, 134, the respective lower parts of which are square holes 135, 135 and the respective upper parts of which communicate with the square holes 135, 135 and are extended upward near to the upper end of the mounting plate 118 are provided and holes for mounting a reflector 137, 137 are provided below the bolt holes 133 on both sides of the cut part 130.

The supporting plate 119 is formed by a rectangular plate longer sideways having the same width as the width of an upper half of the mounting plate 118, in the center, a seat 138 touched to the back of the concave portion 132 of the mounting plate 118 is protruded from the front 119a, a bolt hole 139 longer longitudinally that pierces the seat 138 is made, further, the periphery of the bolt hole 139 is made a concave portion and a bearing surface 140 is formed on the back 119b.

Hook pieces 141, 141 protruded on the side of the back in symmetrical positions on both side at the upper end and bent downward are provided on the back 119b of the supporting plate 119, and fitting parts 142, 142 which are protruded on the side of the front 119a in symmetrical positions on both sides near to the lower end and each cross section of which is in the shape of T are provided. The fitting parts 142, 142 can pass the square holes 135, 135 of the mounting plate 118, are square when they are viewed from the front, and the T-type longitudinal side 142a of the fitting part 142 is inserted into the sliding hole 136 of the mounting plate 118 so that the T-type lateral side 142b can be fitted to the front of the mounting plate 118.

When the supporting plate 119 is slid upward on the mounting plate 118 after the fitting parts 142, 142 of the supporting plate 119 are inserted into the square holes 135, 135 of the mounting plate 118 and both plates are touched back to back, each longitudinal side 142a of the fitting parts 142, 142 of the supporting plate 119 is inserted into the sliding holes 136, 136 of the mounting plate 118 and the lateral side 142b is fitted to the mounting plate 118, the mounting plate 118 and the supporting plate 119 are relatively fixed before and after. In this state, after the position of the supporting plate 119 on the mounting plate 118 is determined, a mounting bolt 143 is inserted into the bolt hole 139 and the bolt hole 132a of the mounting plate 118 from the back side of the supporting plate 119, a nut is fitted on the front side of the mounting plate 118, is temporarily tightened and the supporting plate 119 is supported on the mounting plate 118.

Next, the license plate 111 is matched with the back of the supporting plate 119 so that the upper edge is touched to the inside of the hook pieces 141, 141 of the supporting plate 119, and after bolt holes 111a, 111a provided on both sides at the lower end are positioned with the bolt holes 133, 133 or the long holes 134, 134 of the mounting plate 118, the license plate 111 is fixed to the mounting plate 118 by inserting a mounting bolt 144 into them from the back side of the license plate 111 and fitting and tightening a nut on the front side of the mounting plate 118.

When the bolt holes 111a, 111a of the license plate 111 and the bolt holes 133, 1333 or the long holes 134, 134 of the mounting plate 118 are positioned, the supporting plate 119 is moved longitudinally on the mounting plate 118 via fitting between the sliding holes 136, 136 and the fitting parts 142, 142 to adjust the position of the supporting plate. When both are positioned, the mounting bolt 143, which has been inserted into the bolt hole 139 of the supporting plate 119 and the bolt hole 132a of the mounting plate 118 and temporarily tightened, is fully tightened, wherein the supporting plate 119 is securely fixed to the mounting plate 118.

The mounting plate 118 and the supporting plate 119 are made black by using a black plate or applying black paint, a mounting face for the license plate formed by combining the mounting plate 118 and the supporting plate 119 is set so that it has the width and the height large enough to correspond to the license plate 111 of different specifications depending upon the destination of the shipment of the motorcycle, and the back of the license plate 111 is prevented from being directly illuminated by a tail light 145 in the brake lamp unit 18 attached to the rear fender 13 ahead of the mounting plate 118 and the supporting plate 119.

Figure 12:
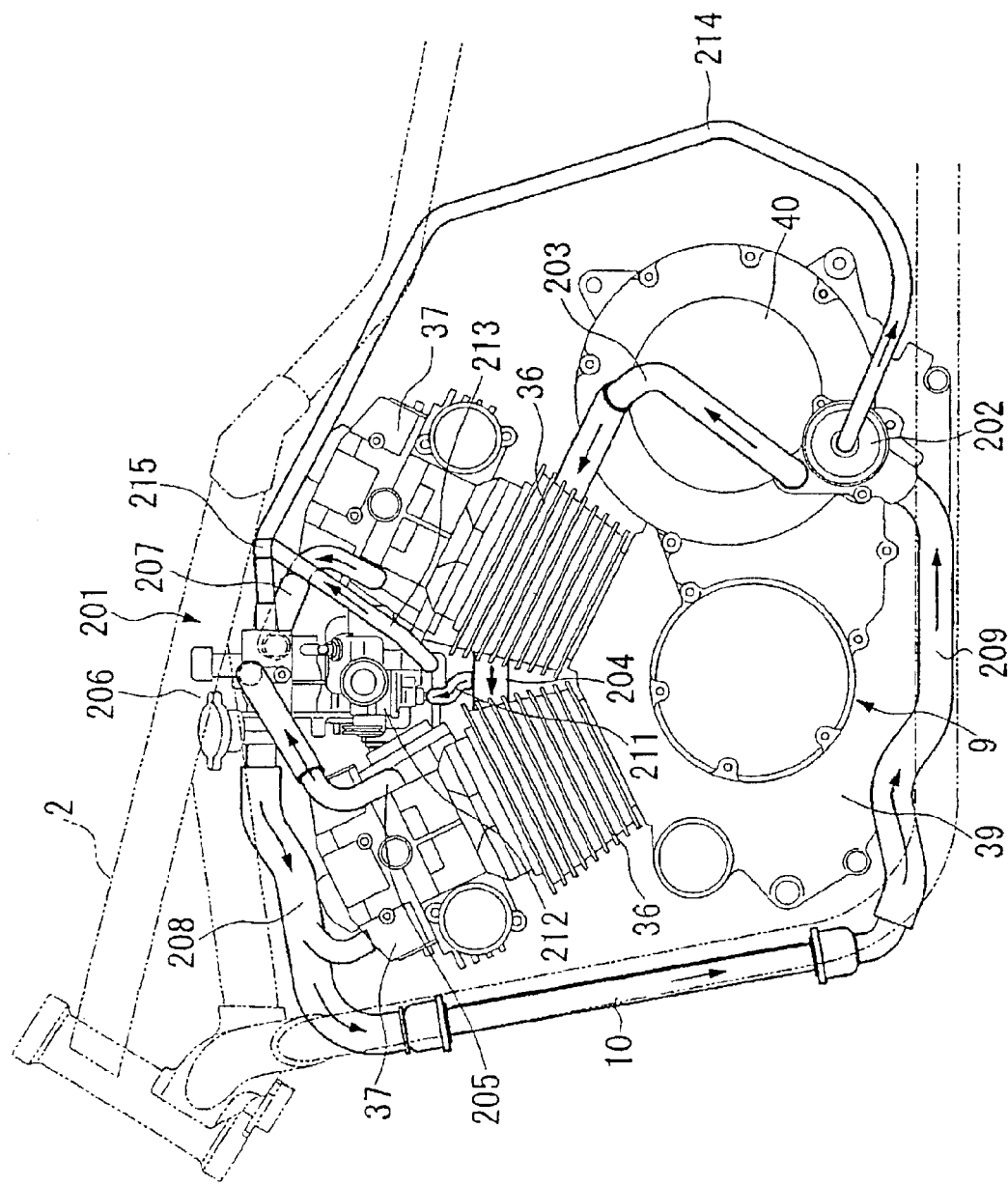
FIG. 12 is an enlarged side view showing a state in which a side cover in the center of the motorcycle to which the embodiment of the invention is applied is removed.

FIG. 12 provides an explanation of cooling the engine by the radiator 10 and a heating device 201 of a carburetor. A cooling water pump 202 is arranged on the side of the transmission 40 of the engine 9, and the discharge port of the cooling water pump 202 is connected to an inflow port for engine cooling water of a right cylinder part 36 shown in FIG. 12 of the engine 9 via engine cooling water piping 203. Engine cooling water that flows into the right cylinder part 36 is branched in two directions after the engine cooling water passes a water jacket not shown and formed on the wall of the cylinder part 36, one reaches an outlet for engine cooling water formed on the reverse side to the inflow port for engine cooling water of the cylinder part 36, and the other reaches an outlet for engine cooling water formed on the upper surface of a right cylinder head 37 over the right cylinder part.

The outlet for engine cooling water of the right cylinder part 36 is connected to an inflow port for engine cooling water of a left cylinder part 36 via an engine cooling water communicating tube 204. Engine cooling water that flows into the left cylinder part 36 reaches an outlet for engine cooling water formed on the upper surface of a left cylinder head 37 over the left cylinder part after the engine cooling water passes a water jacket not shown and formed on the wall of the cylinder part 36. The outlet for engine cooling water of the left cylinder head 37 is connected to an inflow port of a case of a thermostat valve 206 arranged under the main pipe 22 via engine cooling water piping 205. In the meantime, an outlet for engine cooling water of the right cylinder head 37 is connected to the inflow port of the case of the thermostat valve 206 via engine cooling water piping 207.

The outlet of the thermostat valve 206 is connected to an upstream inlet of the radiator 10 via engine cooling water piping 208 and the downstream outlet of the radiator 10 is connected to a suction opening of the cooling water pump 202 via engine cooling water piping 209.

Carburetor heating piping 211 is branched from the engine cooling water communicating tube 204 connecting the right and left cylinder parts 36, 36 and the end of the carburetor heating piping 211 is connected to an inflow port for engine cooling water formed in a carburetor 212. Carburetor heating piping 213 is extended from an outlet for engine cooling water provided on the carburetor 212 and the carburetor heating piping 213 on the downstream side is connected to bypass piping 214 connecting the outlet of the case of the thermostat valve 206 and the suction opening of the cooling water pump 202 via a confluence 215.

The engine cooling water piping 203, the engine cooling water communicating tube 204 and the engine cooling water piping 205, 207, 208 and 209 compose radiator piping which is a circulatory path connecting the engine 9 and the radiator 10. The inside diameter of the engine cooling water piping 208, 209 in the radiator piping is set so that the inside diameter is larger than the inside diameter of the bypass piping 214.

The thermostat valve 206 is opened or closed depending upon the temperature of engine cooling water flowing inside, for example, when the valve is closed, the engine cooling water piping 205, 207 communicate with only the bypass piping 214 without communicating with the engine cooling water piping 208 and when the valve is open, the engine cooling water piping 205, 207 communicate with both the engine cooling water piping 208 and the bypass piping 214.

The cooling water pump 202 is started when the engine 9 is started, however, when the temperature of engine cooling water does not reach predetermined temperature, the thermostat valve 206 is kept closed and engine cooling water circulates on a path from the cooling water pump 202 to the cooling water pump 202 again via the engine cooling water piping 203, the right and left cylinder parts 36, the engine cooling water piping 205, 207, the case of the thermostat valve 206 and the bypass piping 214.

At this time, when engine cooling water suitably heated after it passes the right cylinder part 36 passes the engine cooling water communicating tube 204, a part is branched, is led to the carburetor 212 via the carburetor heating piping 211 and heats the carburetor 212. The engine cooling water after it is heated is returned to the cooling water pump 202 again via the carburetor heating piping 213 and the bypass piping 214.

Afterward, when the temperature of the engine cooling water rises and exceeds the predetermined temperature, the thermostat valve 206 is opened. Then, a path from the engine cooling water piping 205, 207 to the radiator 10 via the engine cooling water piping 208 and then, to the cooling water pump 202 again via the engine cooling water piping 209 is opened and engine cooling water also circulates on the path. That is, the cooling of the engine using the radiator 10 is started.

At this time, the flow rate of engine cooling water flowing in the bypass piping 214 decreases because of the resistance of piping and the flow rate of engine cooling water flowing on the path passing the radiator 10 (a radiator piping system) increases. Therefore, the flow rate of engine cooling water flowing in the carburetor 212 necessarily decreases and the carburetor 212 is never heated more than required quantity.

Figure 13:
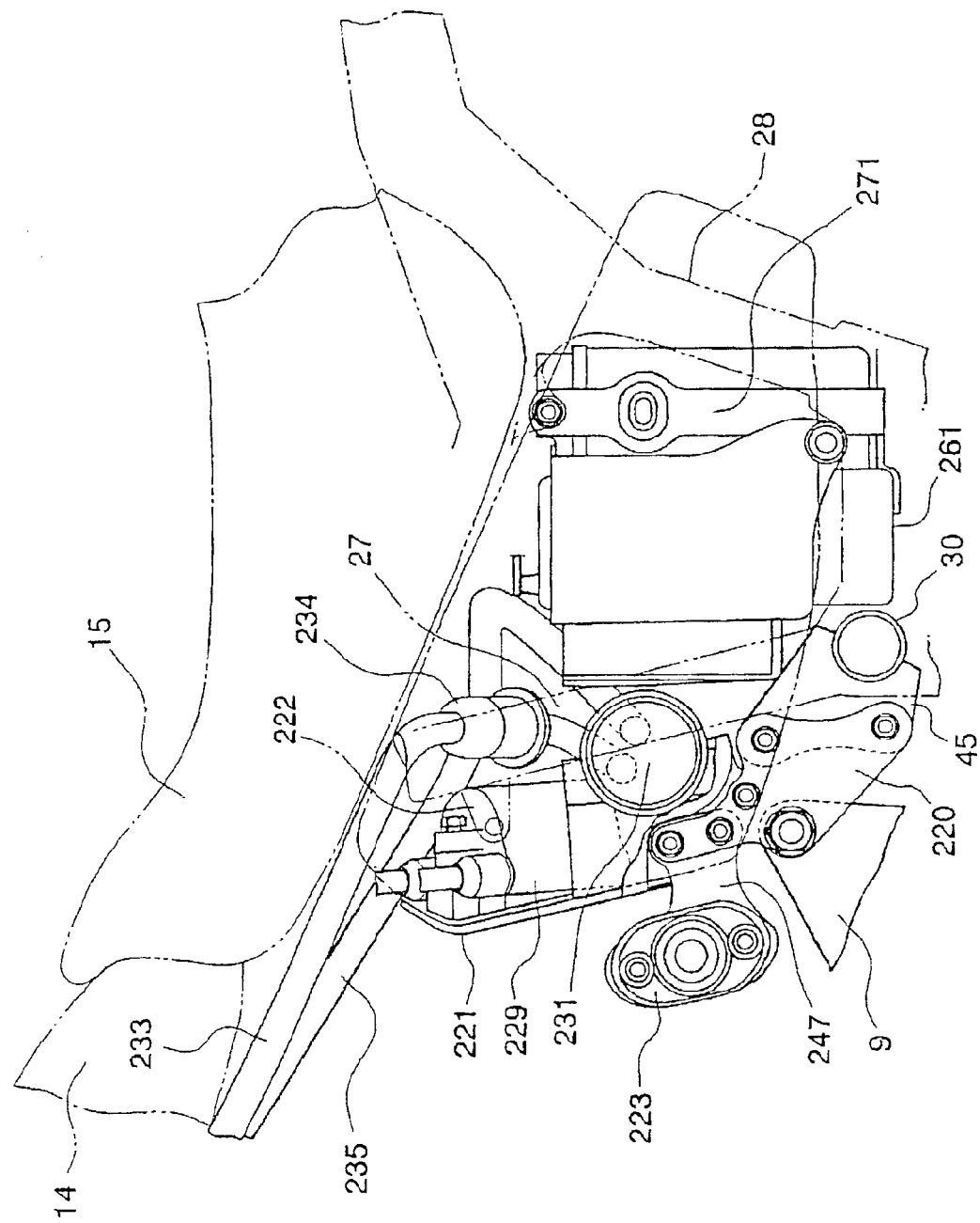
FIG. 13 is an enlarged side view showing a state in which the side cover in the center of the motorcycle to which the embodiment of the invention is applied is removed.

FIG. 13 provides an explanation of the arrangement structure of engine accessories substantially in the center of the vehicle body and the mounting structure of an ignition switch. An engine hanger 220 for supporting the engine 9 is attached to the bracket 45 attached to the cross pipe 30 of the body frame 2 across a pair of right and left pipes 24 and 27 of the body frame 2. A center cover 221 is supported and attached by/to a bracket 222 attached to the engine hanger 220 and the center pipe 27 on the front side of the right and left center pipes 30 as shown in FIG. 17.

The engine hanger 220 also has a function for supporting the ignition switch 223 in addition to a function for supporting the engine 9 and the center cover 221. The function will be described in detail later.

Figure 15:
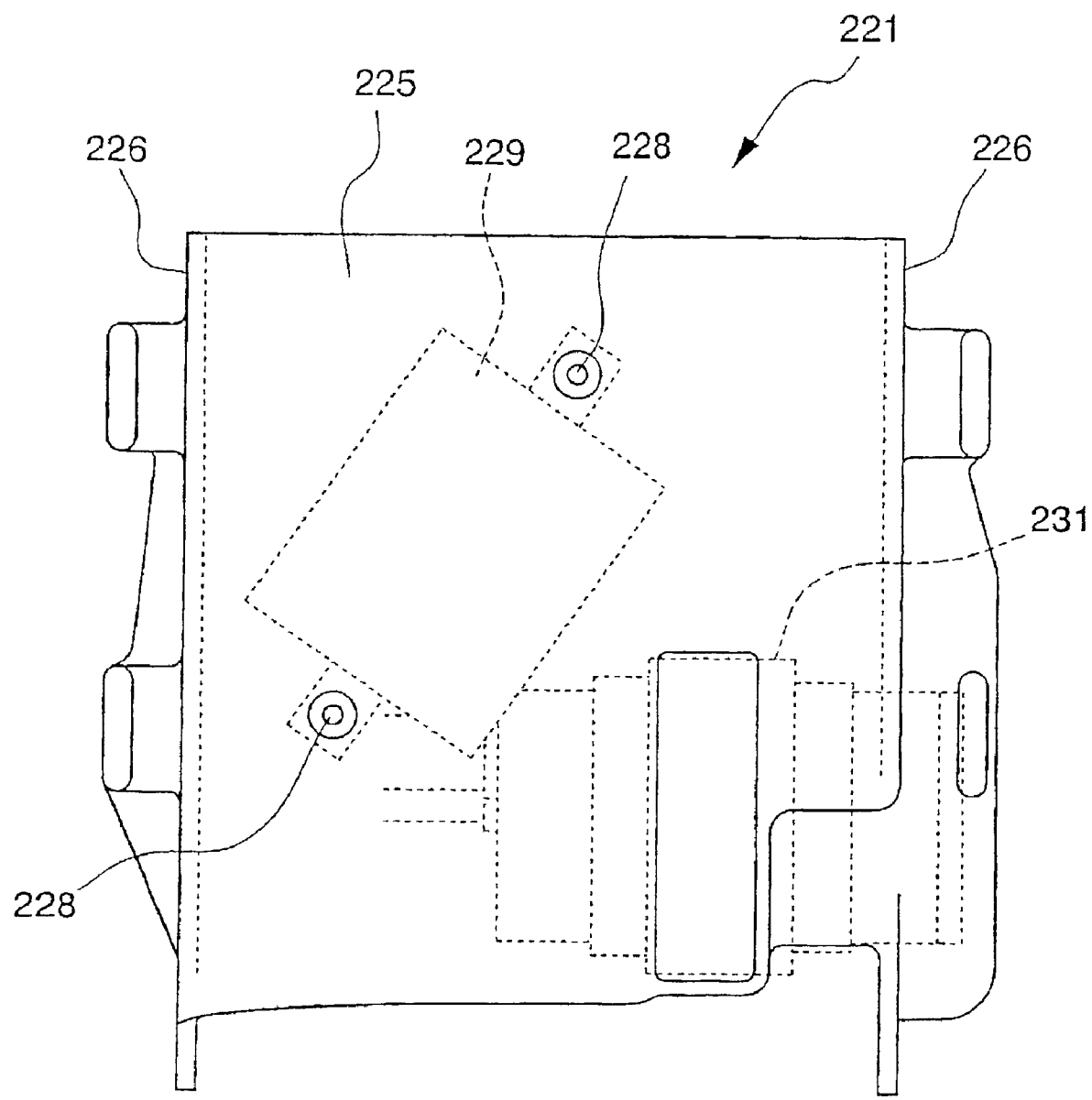
FIG. 15 is a front view showing a center cover of the motorcycle to which the embodiment of the invention is applied.
Figure 16:
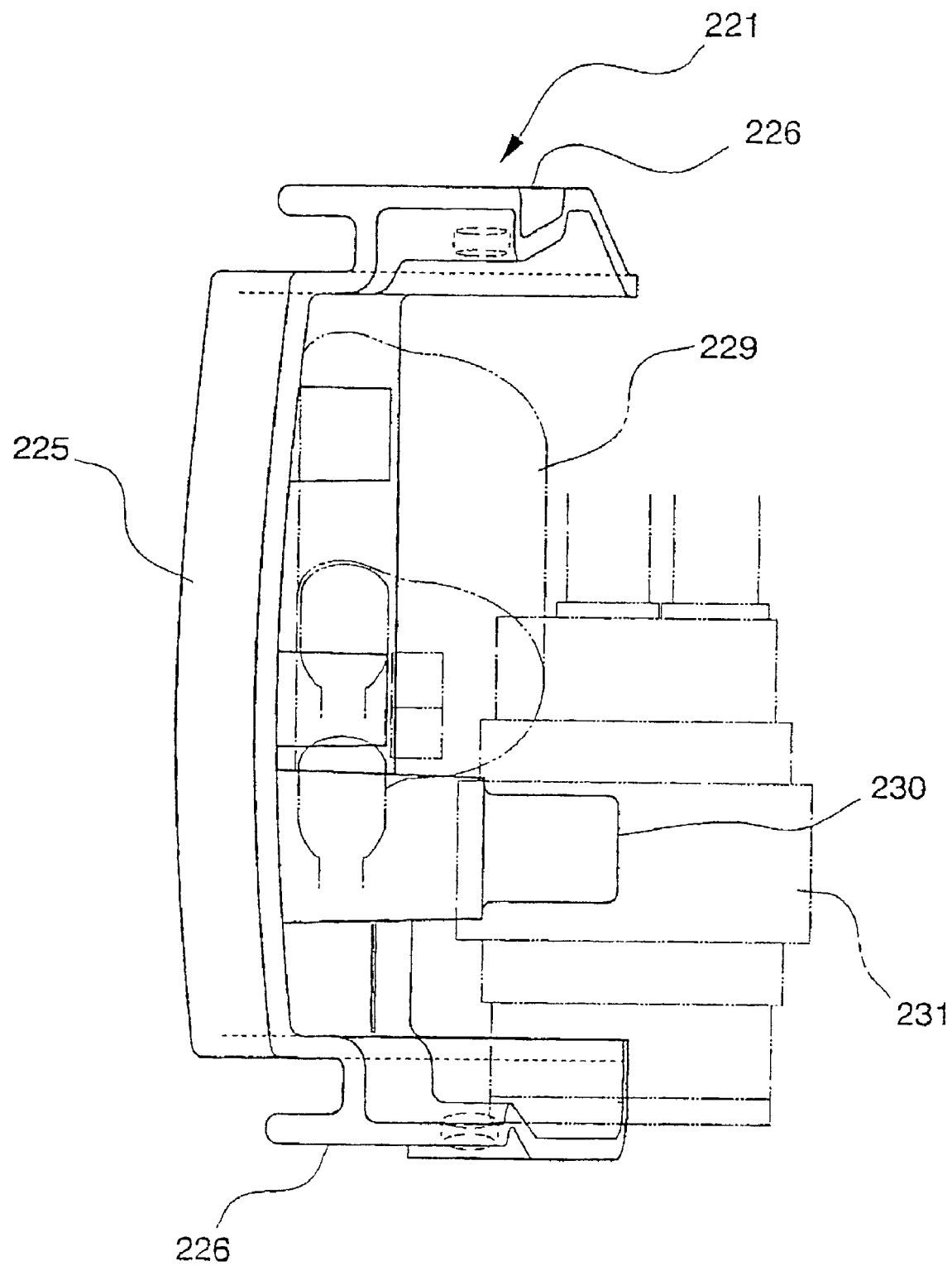
FIG. 16 is a plan showing the center cover of the motorcycle to which the embodiment of the invention is applied.
Figure 17:
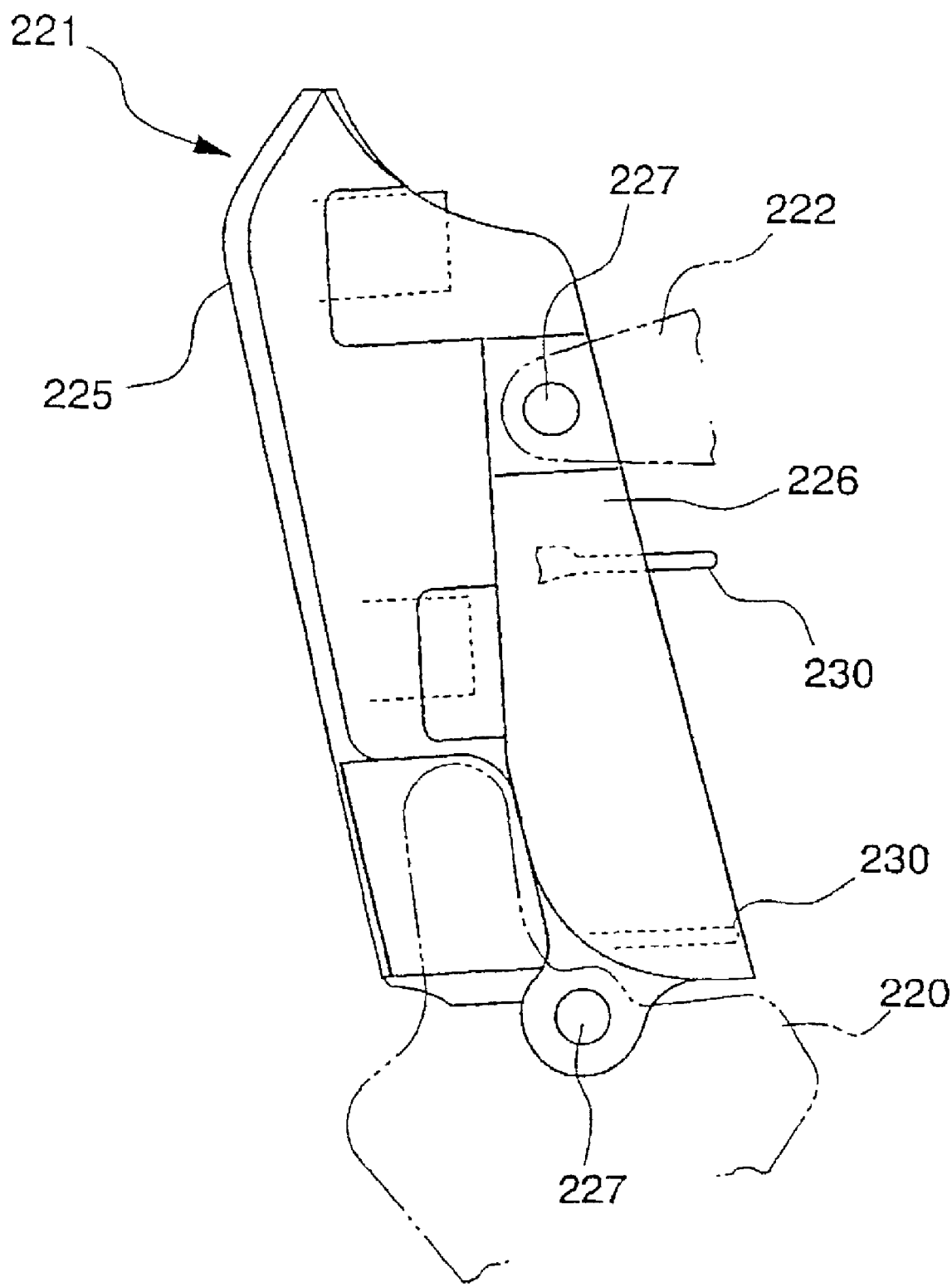
FIG. 17 is a side view showing the center cover of the motorcycle to which the embodiment of the invention is applied.

The center cover 221 is made of resin and is provided with a substantially rectangular plate part 225 and a standing part 266 provided on the right and left sides of the plate part 225 so that the standing part is extended backward in the vehicle body when the center cover 221 is assembled in the body frame as shown in FIGS. 15 to 18. A fitted hole 227 is provided on the right and left standing parts 226 in upper and lower parts as shown in FIG. 17, the center cover is fixed by suitably fixing means such as a bolt in a state in which these fitted holes 227 are matched with fitting holes formed on the engine hanger 220 and the bracket 222 and hereby, the center cover 221 is fixed to the body frame 2.

The material of the center cover 221 is not limited to resin and the center cover may be also made of metal such as an aluminum alloy.

Figure 18:
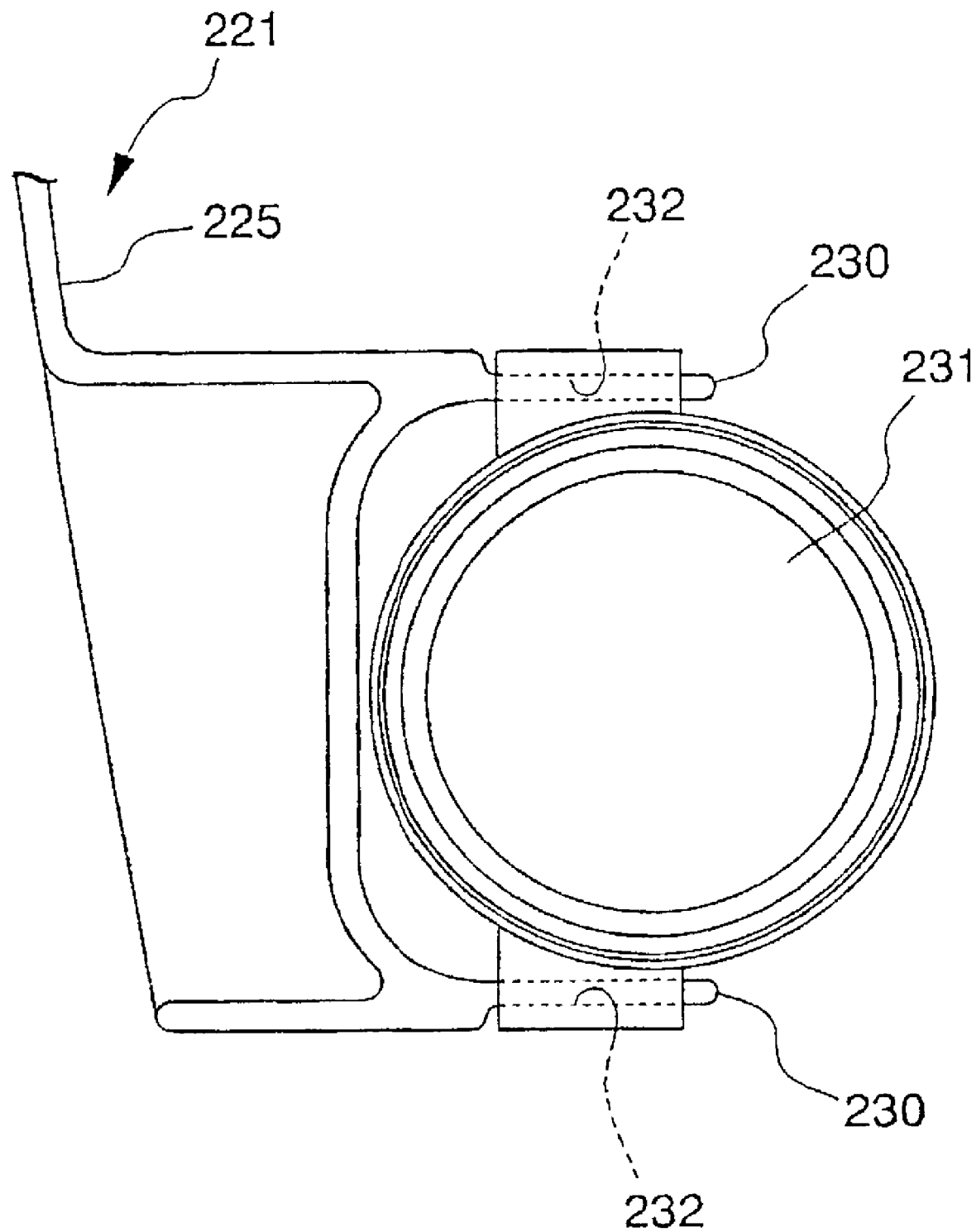
FIG. 18 is a side view showing a state in which a fuel pump is attached to the center cover of the motorcycle to which the embodiment of the invention is applied.

As shown in FIG. 15, two part mounting holes 228 are made at a suitable interval in an upper part of the plate part 225 of the center cover 221 and an ignition coil 229 is attached to the part mounting hole 228 via fixing means such as a bolt. As shown in FIGS. 16 to 18, tonguelike fitting parts 230 extended backward in the vehicle body are provided above and below at a suitable interval in a lower part of the plate part 225 and a fuel pump 231 is attached to the center cover 221 crosswise by inserting the tonguelike fitting part 230 into a fitting hole 232 formed on the side of the fuel pump 231.

A reference number 233 in FIG. 13 denotes a pipe for supplying fuel from a fuel tank 14 to the fuel pump 231 via a filter 234 and 235 denotes a pipe for supplying fuel from the fuel pump 231 to the carburetor 212.

Figure 19:
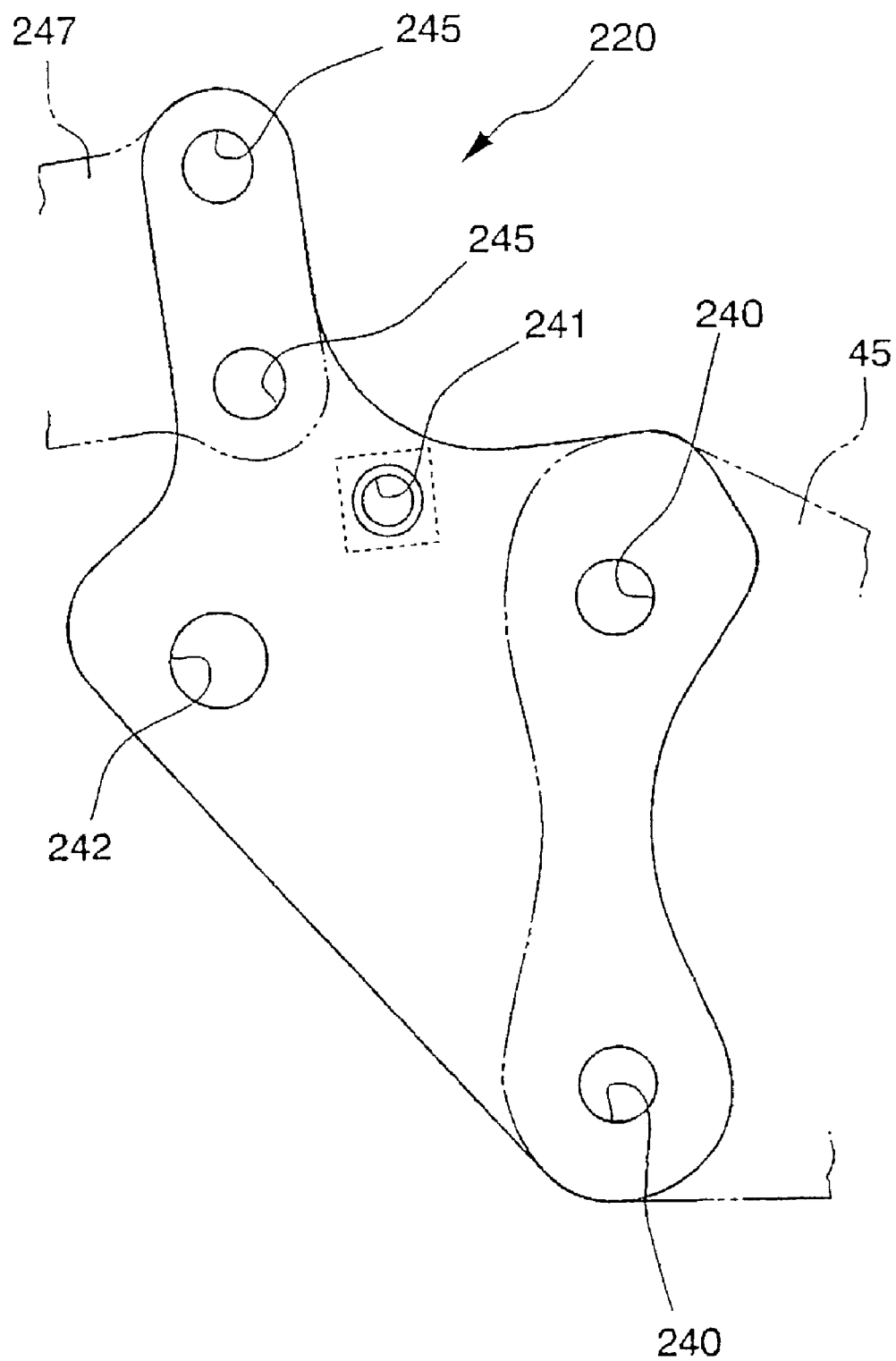
FIG. 19 is a front view showing an engine hanger of the motorcycle to which the embodiment of the invention is applied.

The engine hanger 220 is formed substantially in the shape of a diamond as shown in FIG. 19, fitted holes 240 are formed above and below at a predetermined interval in the vicinity of the end on the right side (in the rear of the vehicle body in assembly) in FIG. 19, a fitting hole 241 is formed in the center of an upper part and further, a fitting hole 242 is formed in the vicinity of the end on the left side. The fitted hole 240 is a part fixed by fixing means such as a bolt in a state in which the fitted hole is matched with a fitting hole of the bracket 45 attached to the cross pipe 30 of the body frame 2, the fitting hole 241 is a part for fitting the lower part of the center cover 221 by suitably fixing means such as a bolt and the fitting hole 242 is a part for fitting the engine 9 by fixing means such as a bolt.

An extended part 244 extended in a direction (upward in FIG. 19) different from a direction in which the engine is suspended is provided on the engine hanger 220 and two fitting holes 245 are formed at an interval in a direction in which the extended part 244 is extended. The ignition switch 223 is attached to these fitting holes 245 via a stay 247 as shown in FIG. 13.

Figure 20A:
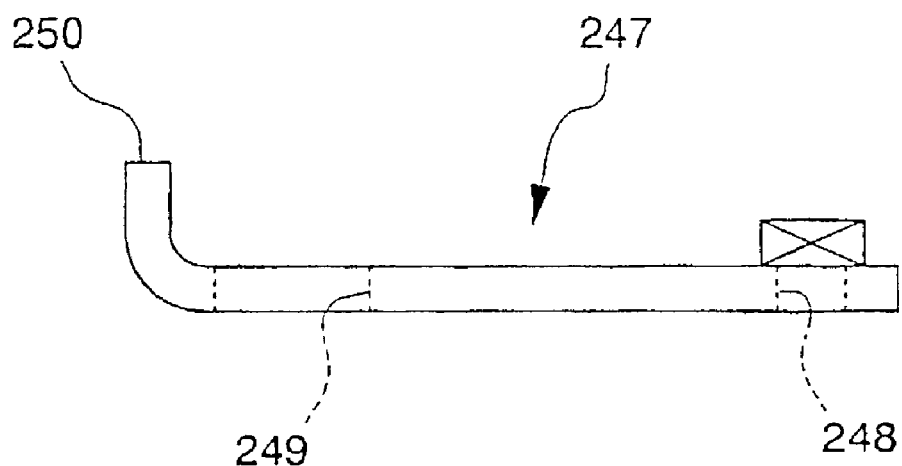
FIGS. 20(a) and (b) are a plan and a side view showing a stay that supports an ignition switch of the motorcycle to which the embodiment of the invention is applied.
Figure 20B:
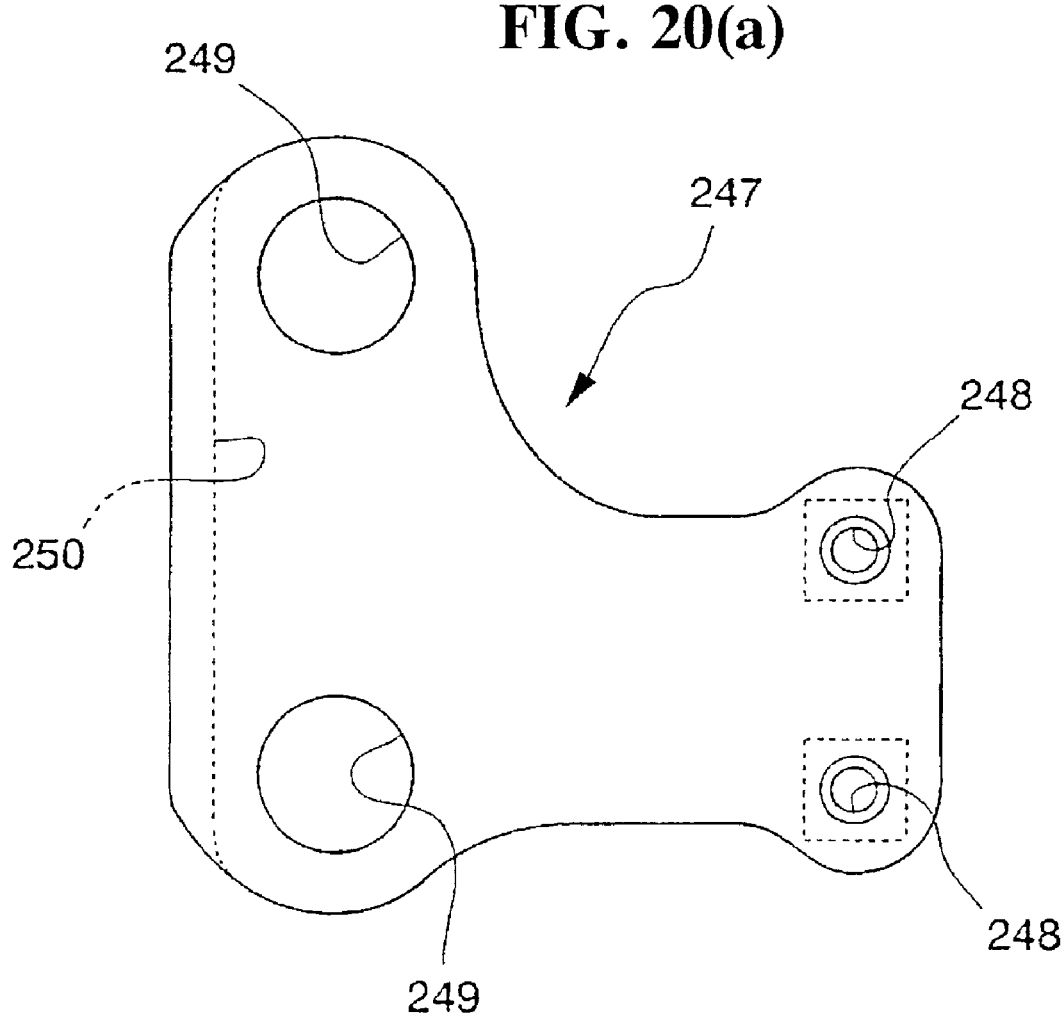

Fitted holes 248 fixed to the engine hanger 220 are formed above and below at an interval in the vicinity of the end on the right side (in the rear in assembly) in the stay 247 as shown in FIGS. 20(a) and (c) a fitting hole 249 matched with the fitting hole of the ignition switch 229 is formed in the vicinity of the end on the left side and further, a reinforcement 250 is formed at the edge on the left side by bending so that it stands inside in the assembly of the vehicle body.

The fitted hole 248 of the stay 247 corresponds to the fitting hole 245 of the engine hanger 220.

Figure 14:
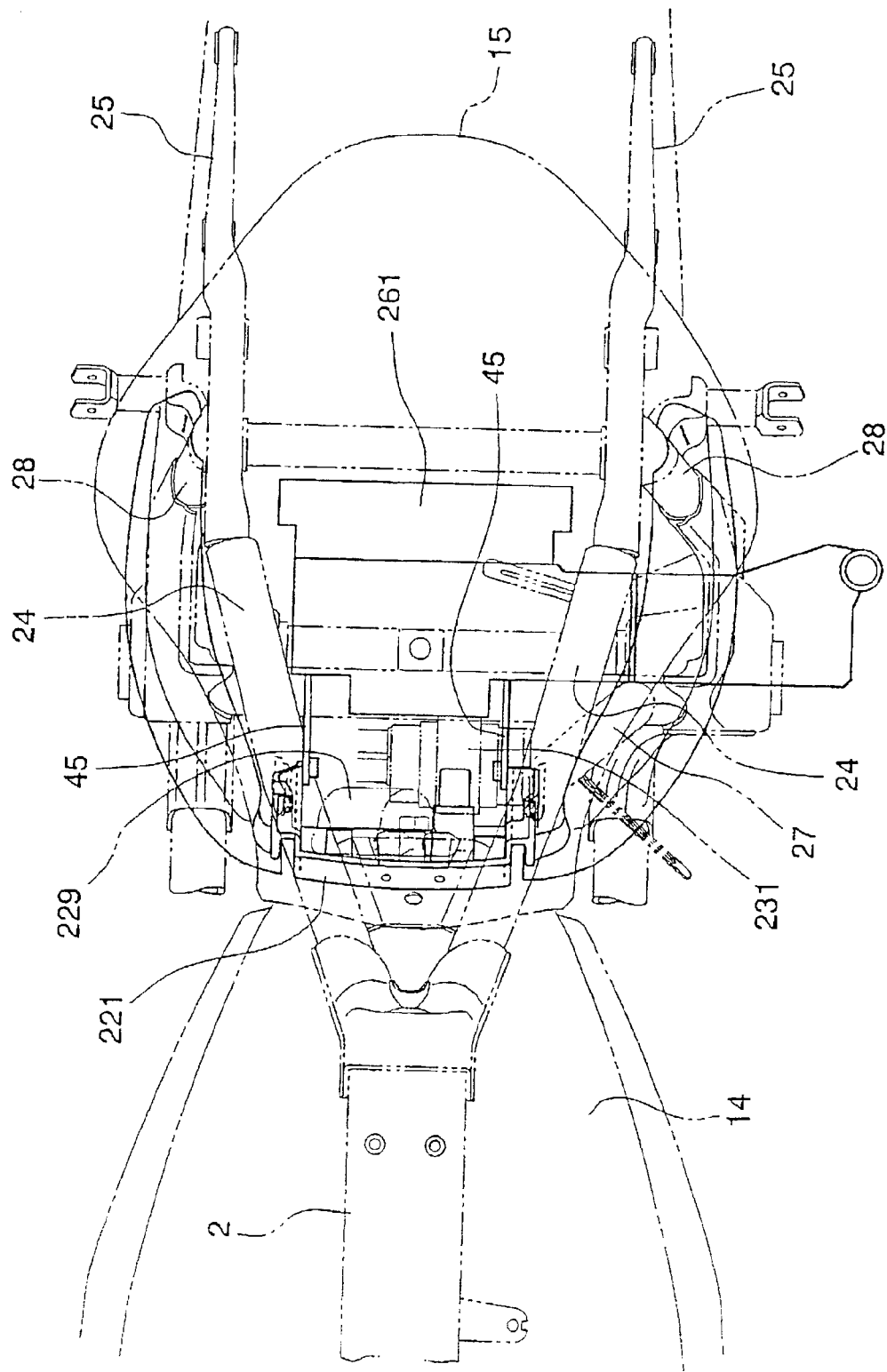
FIG. 14 is an enlarged plan showing a state in which a seat in the center of the motorcycle to which the embodiment of the invention is applied is removed.

FIGS. 13 and 14 provide an explanation of a housing of a document and a tool. A battery case 261 is arranged in a part at the back of the center cover 221 and surrounded by the center pipe 27 of the body frame 2, the rear pipe 28 and further, the main seat 15.

Figure 21:
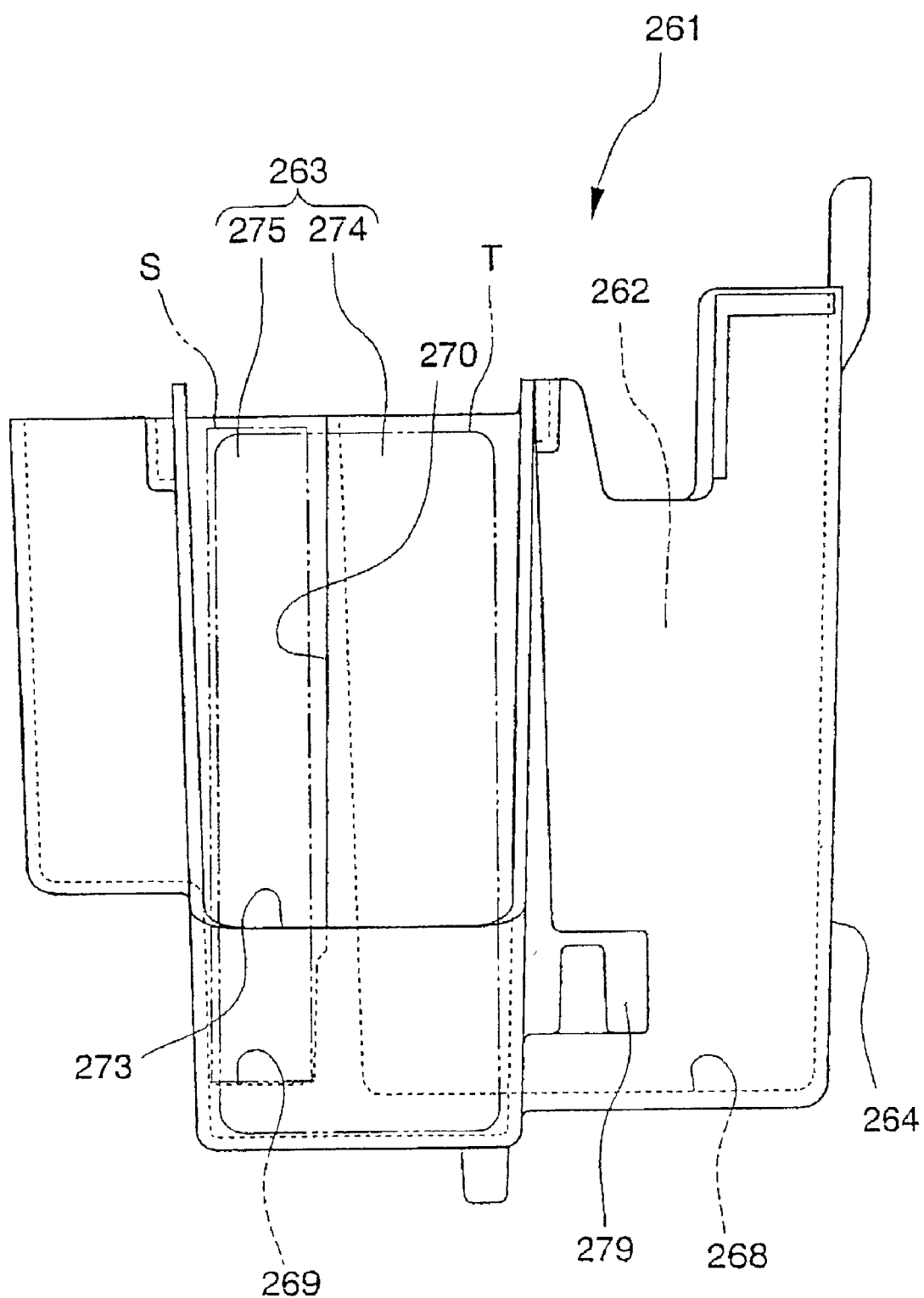
FIG. 21 is a front view showing a battery case of the motorcycle to which the embodiment of the invention is applied.
Figure 22:
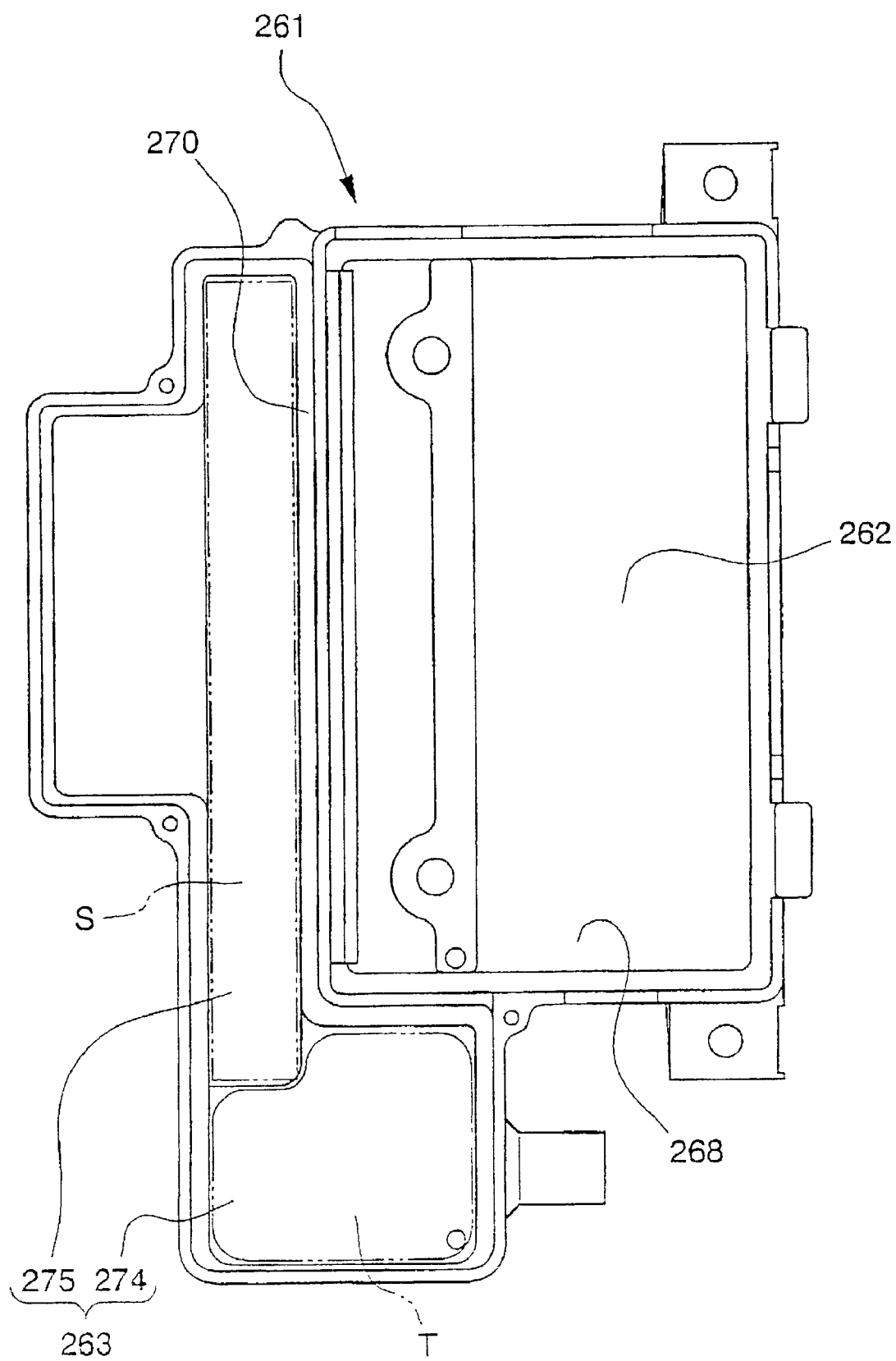
FIG. 22 is a plan showing the battery case of the motorcycle to which the embodiment of the invention is applied.
Figure 23:
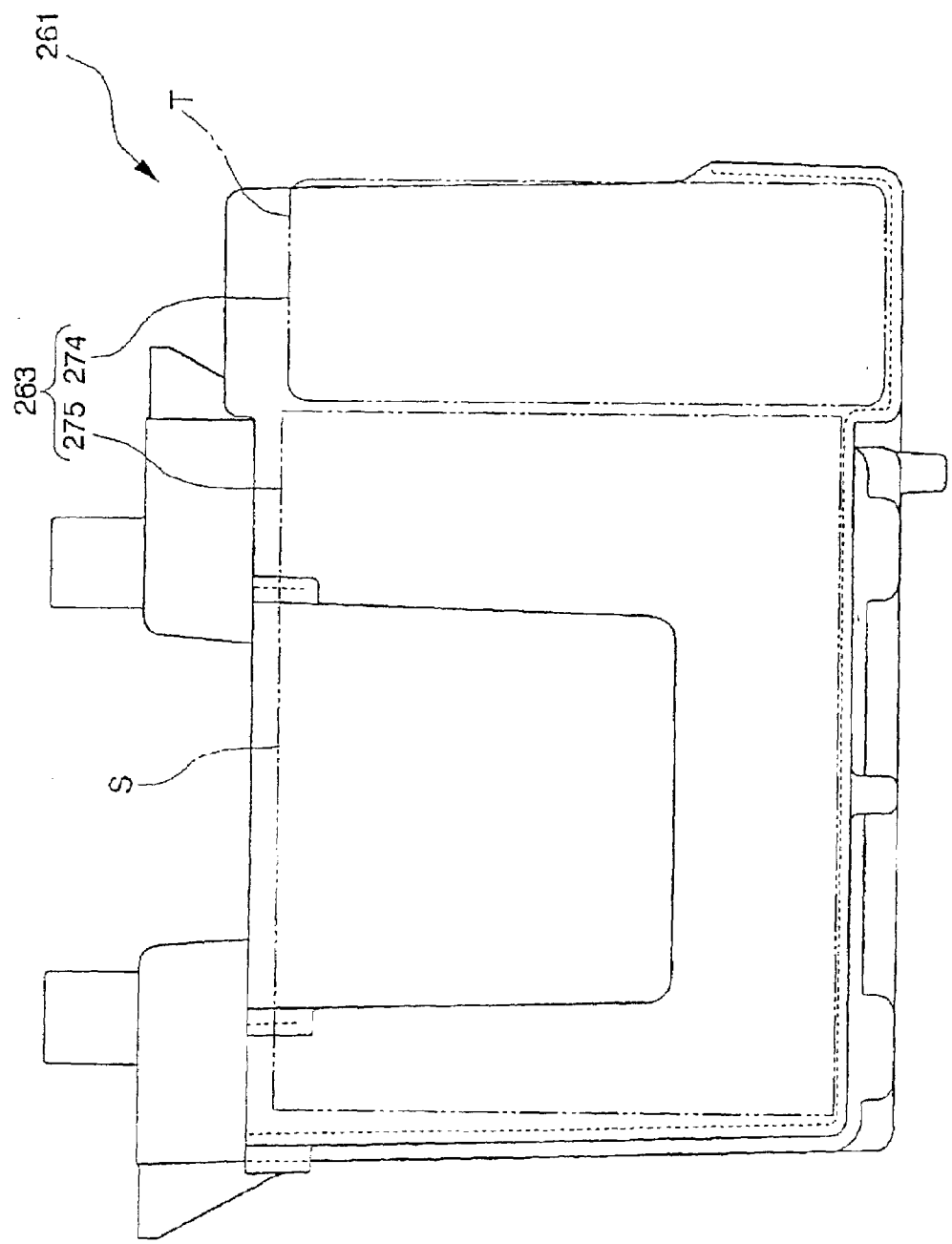
FIG. 23 is a side view showing the battery case of the motorcycle to which the embodiment of the invention is applied.

As shown in FIGS. 21 to 24, a battery housing 262 for housing a battery and a document/tool housing 263 for housing a document and a tool are integrated. That is, as is shown in FIGS. 21 and 22, the right part (the rear part in the assembly of the vehicle body) the battery housing 262 and the front side is the document/tool housing 263.

Figures 24A, 24B, 24C:
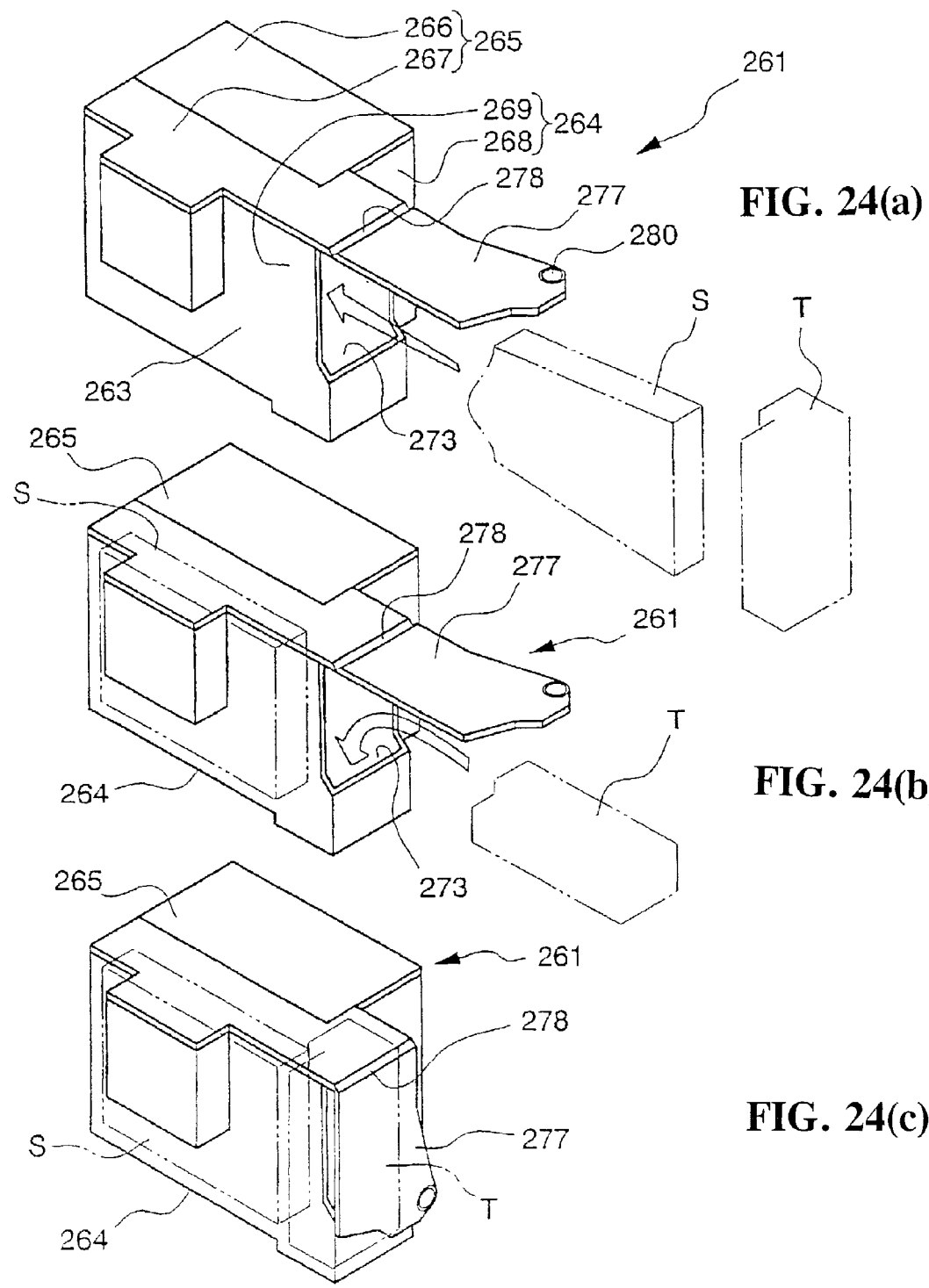
FIGS. 24(a), (b), and (c) are perspective views for explaining the action of the battery case of the motorcycle to which the embodiment of the invention is applied.

The battery case 261 is also divided into a lower case 264 and a lid 265 fixed to the body of the case 264 by suitably fixing means so that the lid covers the open upside of the body of the case 264 as shown in FIGS. 24(a), (b), and (c). Further, the lid 265 is divided into a first lid 266 covering the upside of the battery housing 262 and a second lid 267 covering the upside of the document/tool housing 263. The body of the case 264, the first lid 266 and the second lid 267 are made of resin by blow molding.

The body of the case 264 is composed of a first box part 268 for partitioning the battery housing 262 and a second box part 269 formed on the left side in FIGS. 21 and 22 of the box part 268 for partitioning the document/tool housing 263. A partition wall 270 for partitioning both is provided between the first box member 268 and the second box member 269. The body of the case 264 is fixed to the side of the body frame 2 by a support stay 271 attached to the outside as shown in FIG. 13.

As shown in FIGS. 21 and 24, an opening 273 for housing or extracting a document S and a tool T is provided on the side of the second box member 269 for partitioning the document/tool housing. The document/tool housing 263 is divided into two of the side close to the opening 273 and the side apart from the opening 273, the side close to the opening is a tool housing 274 and the side apart from the opening is a document housing 275.

As shown in FIGS. 24(a), (b), and (c), an opening lid 277 formed on a lower side wall of the tool housing 274 for closing the opening 273 is also integrated with the second lid 267. A part of the opening lid 277 opposite to the corner of an outside wall of the tool housing 263 when the opening lid is assembled in the body of the case 264 is formed thinly to be a thin part 278 and the opening lid is bent outside based upon the thin part 278. A locking part 280 fitted to a fitting part 279 of the body of the case 264 is provided on the opening lid 277 and a state in which the opening 273 is closed can be maintained via the locking part 280. FIG. 24 shows a procedure for opening the opening 273 and housing a document S and a tool T in the document/tool housing 263.

The position of the opening 273 for housing or extracting a document is set so that the opening is exposed outside from an opening between the center pipe 27 and the rear pipe 28 when the battery case 261 is assembled in the body frame 2.

Figure 25:
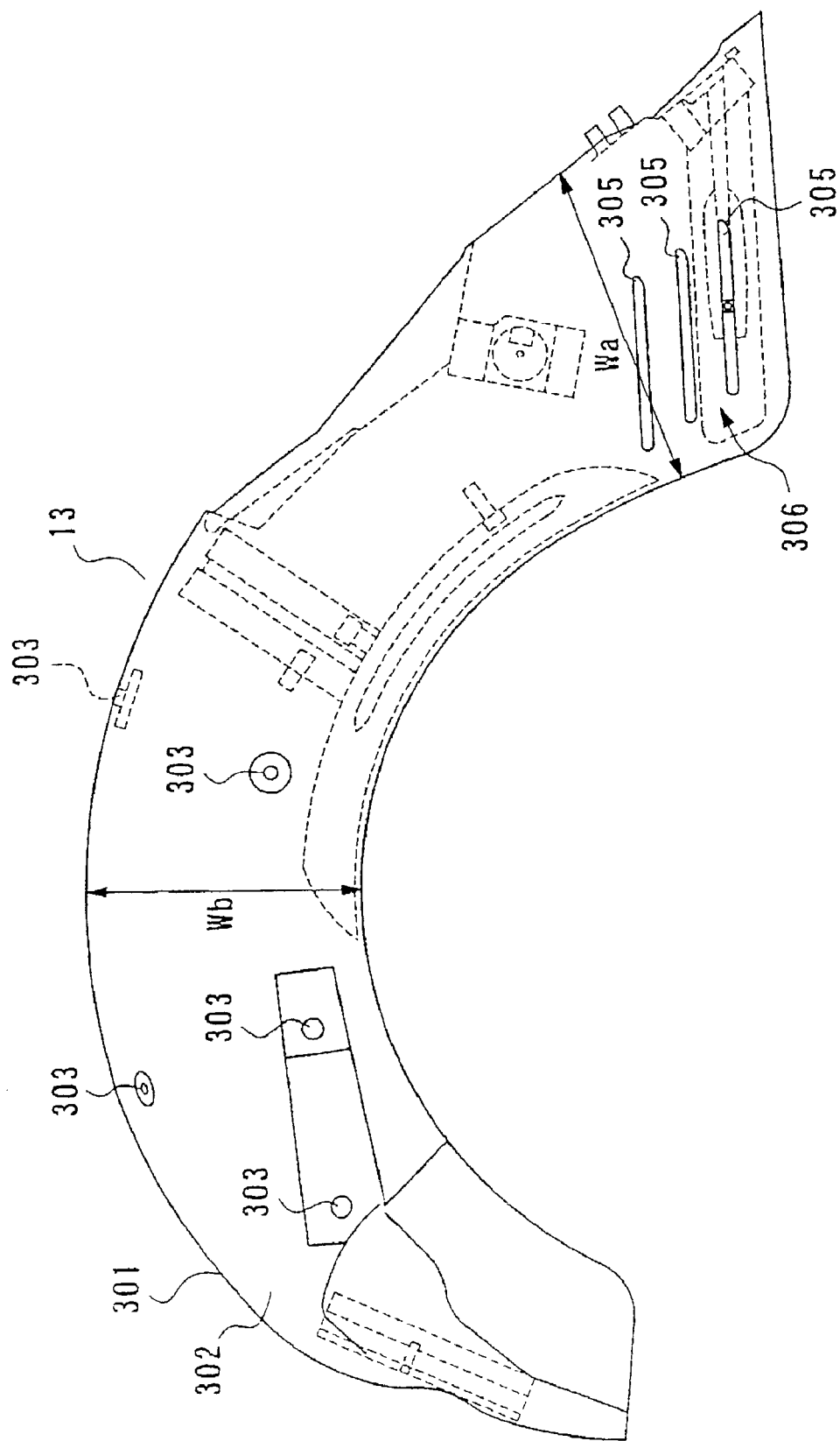
FIG. 25 is a side view showing a rear fender of the motorcycle to which the embodiment of the invention is applied.

FIG. 25 is an explanation the rear fender 31, the rear fender 13 is formed by the press molding of a thin plate such as an iron plate so that the section is U-shaped. The rear fender 31 is provided with an arc-shaped part 301 arranged at a suitable interval along the periphery of the rear wheel 12 and right and left sides 302 formed substantially in the shape of a fan and extended to the side of the axis of the rear wheel from the right and left margins of the arc-shaped part 301.

A fitting hole 303 to be a fitted part is provided at required locations of the arc-shaped part 301 and the right and left sides 302 on the rear fender 13 and the rear fender 13 is attached to the body frame 2 by inserting a bolt for example into the fitting hole 303 and tightening the bolt by a nut. The fitting hole 303 is formed substantially in the center of the rear fender 13.

A wide part 304 is formed at the rear end apart from a part in which the fitting hole 303 to be the fitted part is formed on the side 302 of the rear fender 13. The dimension Wa of the width of the wide part 304 is increased, compared with the dimension Wb of the width of the other side 302. Three concave portions 305 are formed at a suitable interval in the longitudinal direction of the vehicle body in the wide part 304. A reinforcement 306 including these concave portions 305 is formed in an inside position on the side of the open edge of the side, compared with the center in a direction of the width of the side 302 of the rear fender.

These concave portions 305 are formed together in the press working of the rear fender 13.

Figure 26:
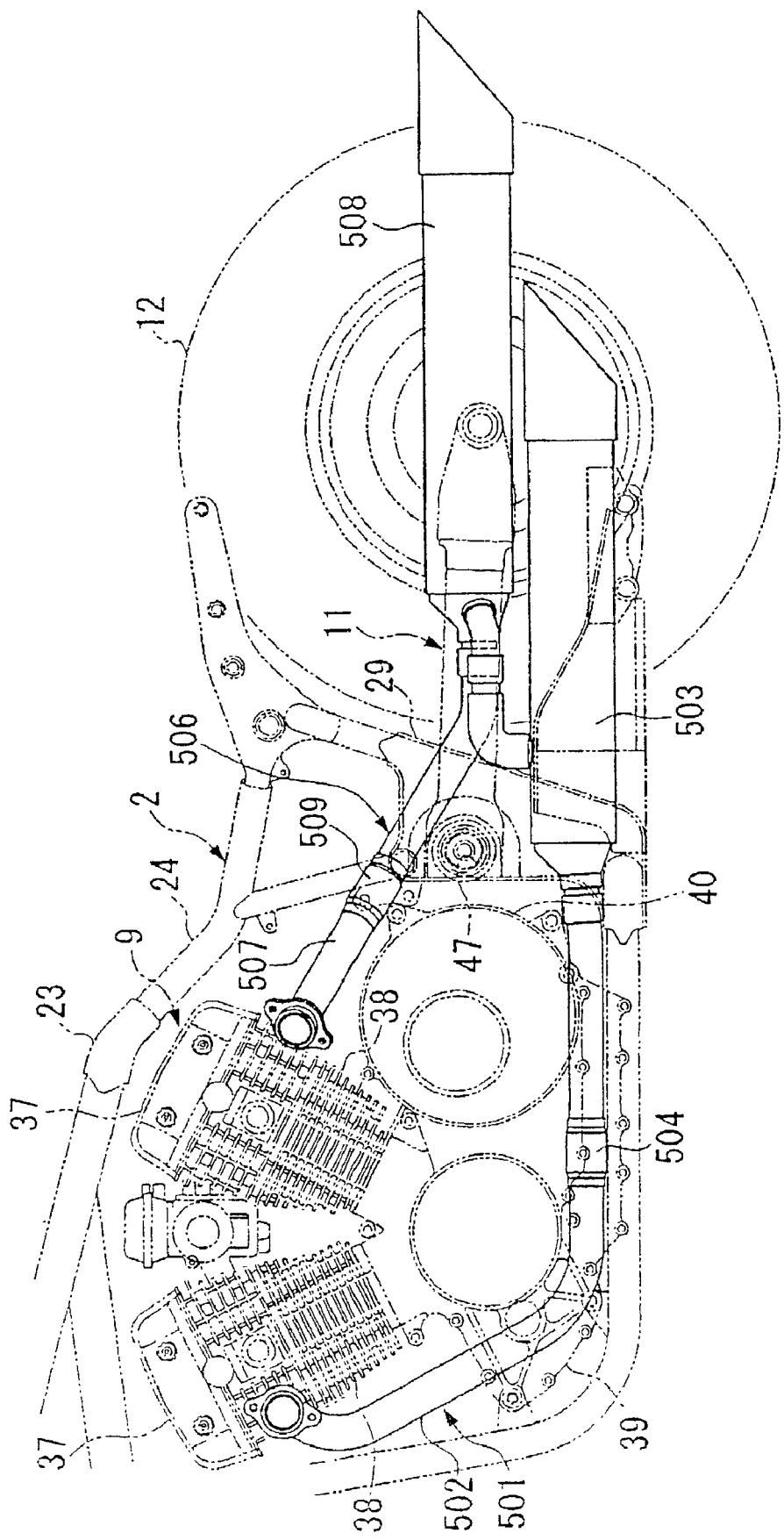
FIG. 26 is a side view showing muffler arrangement structure of the motorcycle to which the embodiment of the invention is applied.
Figure 27:
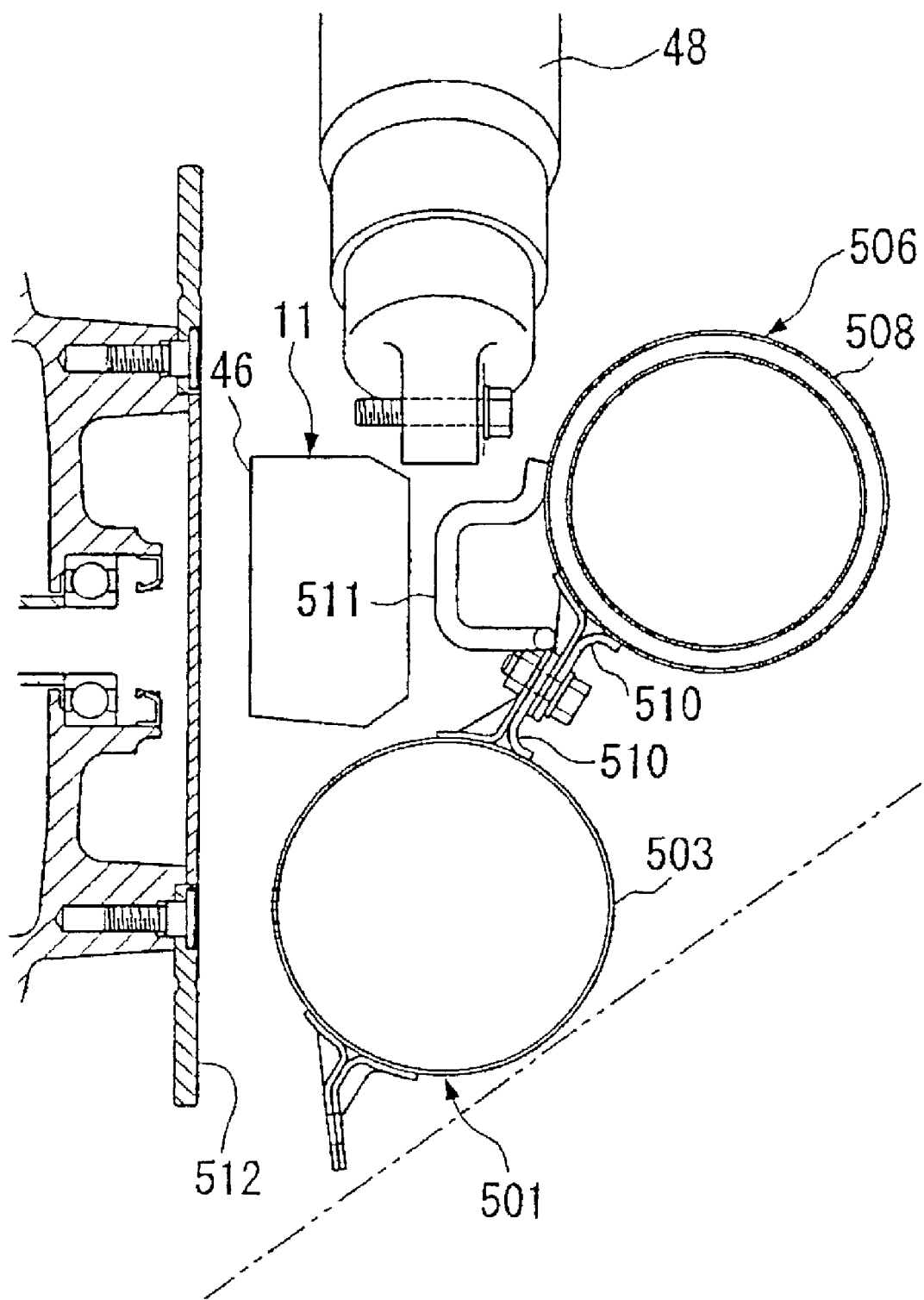
FIG. 27 is a back view showing the muffler arrangement structure of the motorcycle to which the embodiment of the invention is applied.

As shown in FIGS. 26 and 27, a muffler for muffling the exhaust noise of the engine 9 is connected to the cylinder head 37 of each cylinder block. A muffler 501 coupled to the cylinder head 37 of the cylinder block 38 on the front side is provided with an exhaust pipe 502 coupled to the cylinder head 37 and a silencer 503 having a larger diameter than the diameter of the exhaust pipe 502 for muffling noise. For the muffler 501, the exhaust pipe 502 is extended downward from the end coupled to the cylinder block 38, is bent under the engine 9, is horizontally extended backward along the crankcase 39 and a lower part of the transmission 40 and is connected to the silencer 503 on the rear side of the transmission 40. The silencer 503 is arranged on the right side of the vehicle body. In the muffler 501, a three-way catalyst not shown is arranged in a catalyst support 504 produced separately from the exhaust pipe 502 and assembled in an intermediate part of the exhaust pipe 502. The performance of the catalyst in starting is enhanced by the reduction of time prior to activation.

A muffler 506 coupled to the cylinder head 37 of the cylinder block 38 on the rear side is also provided with an exhaust pipe 507 coupled to the cylinder head 37 and a silencer 508 having a larger diameter than the diameter of the exhaust pipe 507 for muffling noise. For the muffler 506, after the exhaust pipe 507 is extended backward from the end coupled to the cylinder block 38 and is extended backward and diagonally downward along an upper part of the transmission 40, it is horizontally extended backward and is connected to the silencer 508. The silencer 508 is arranged on the right side of the vehicle body, in other words, the same side on which the silencer 503 is arranged. In the muffler 506, a three-way catalyst not shown is also arranged in a catalyst support 509 produced separately from the exhaust pipe 507 and assembled in an intermediate part of the exhaust pipe 507. The performance of the catalyst in starting is enhanced by the reduction of time prior to activation.

For the two mufflers 501 and 506, the silencer 503 and the silencer 508 are horizontally arranged apart above and below. The lower silencer 503 is horizontally extended to a position in which the rear end is close to the axis of the rear wheel 12 and the upper silencer 508 is horizontally extended to the further rear side, compared with the silencer 503.

The silencer 503 of the lower muffler 501 is arranged under the fork part 46 on the right side of the rear swing arm 11, as shown in FIG. 27. That is, the silencer 503 is vertically displaced below the fork part 46 on the right side of the rear swing arm 11 and in a direction of the width, a part is overlapped with the fork part 46 on the right side of the rear swing arm 11.

The silencer 508 of the upper muffler 506 is arranged outside the lower silencer 503 in a direction of the width of the vehicle body and is arranged outside on the right side of the fork part 46 of the rear swing arm 11. That is, a part of the silencer 508 is vertically overlapped with the fork part 46 on the right side of the rear swing arm 11 and in the direction of the width, the silencer 508 is displaced outside the fork part 46 on the right side of the rear swing arm 11.

The lower silencer 503 and the upper silencer 508 are coupled and fixed by bolting coupling members 510 fixed to the respective.

Further, a stopper member 511 is fixed to the upper silencer 508 on the side of the rear swing arm 11. The stopper member 511 is touched to the rear swing arm 11 when the upper and lower mufflers 501, 506 are deformed on the side of the vehicle body in the direction of the width in falling, the more deformation on the side of the vehicle body in the direction of the width of the upper muffler 506 is regulated, as a result, the more deformation on the side of the vehicle body in the direction of the width of the lower muffler 501 coupled to the upper muffler 506 is regulated and the silencer 503 of the lower muffler 501 is prevented from coming in contact with a disc 512 of a disc brake of the rear wheel 12.

Figure 28:
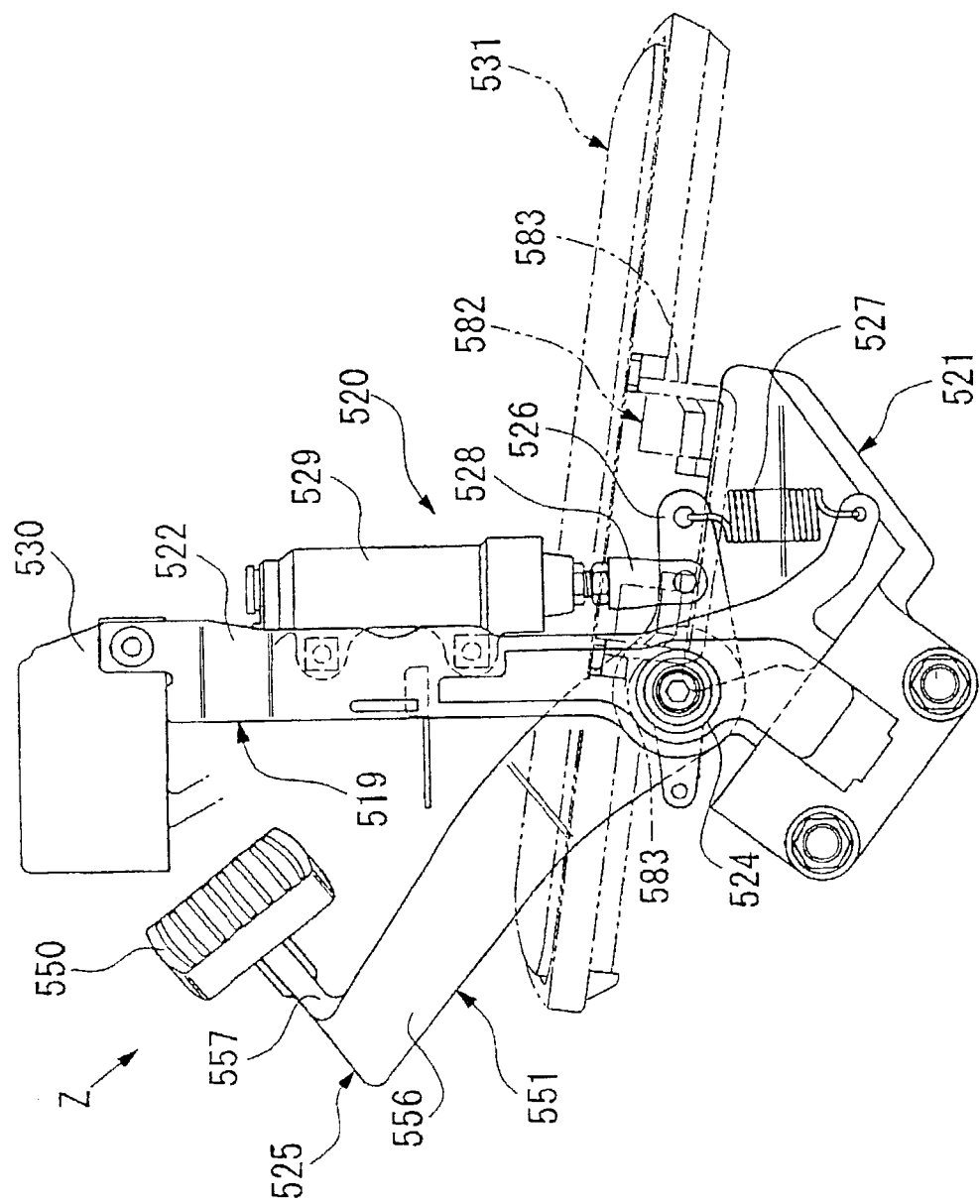
FIG. 28 is a side view showing a braking device of the motorcycle to which the embodiment of the invention is applied.
Figure 29:
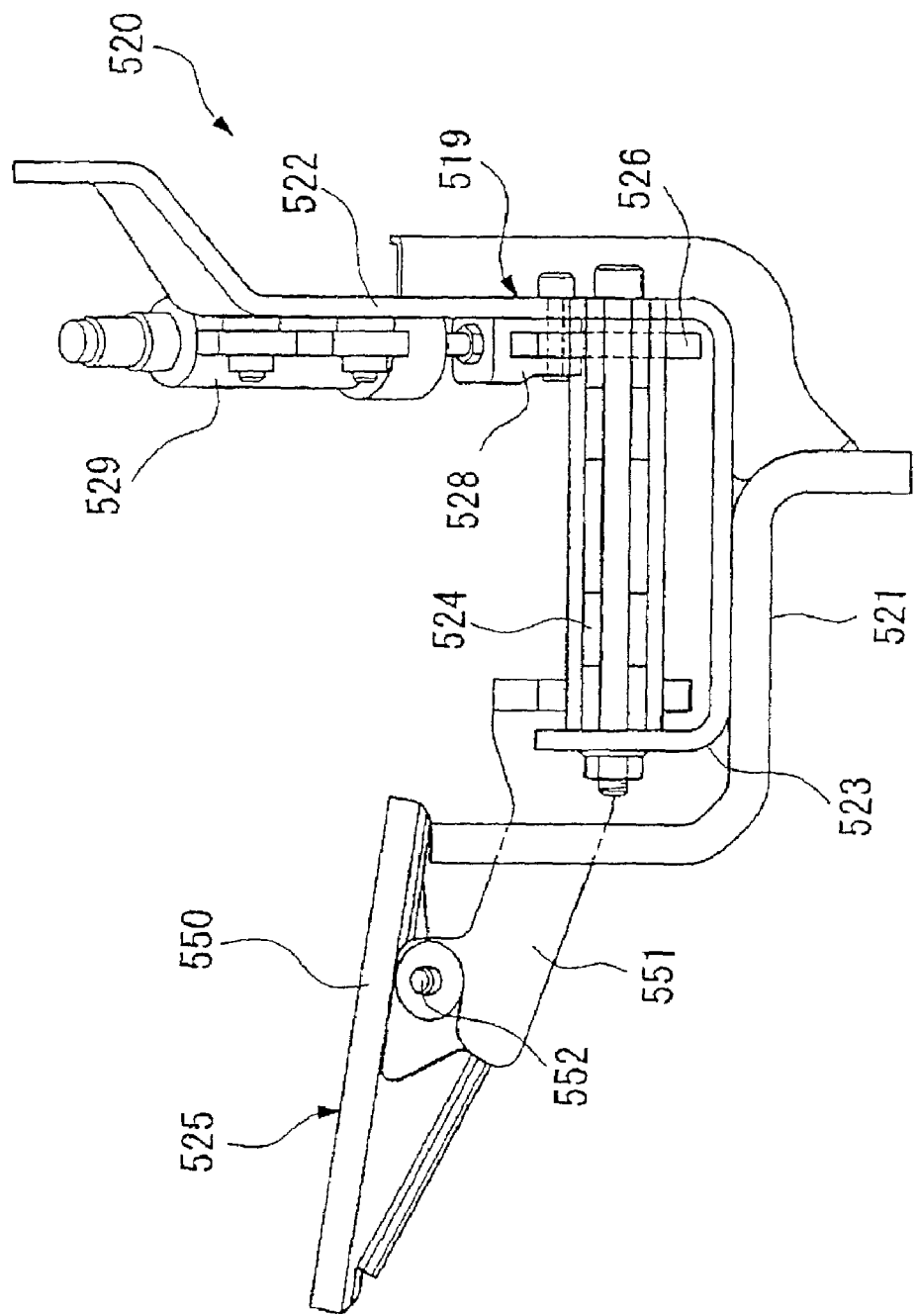
FIG. 29 is a view viewed along an arrow X in FIG. 28 showing the braking device of the motorcycle to which the embodiment of the invention is applied.
Figure 30:
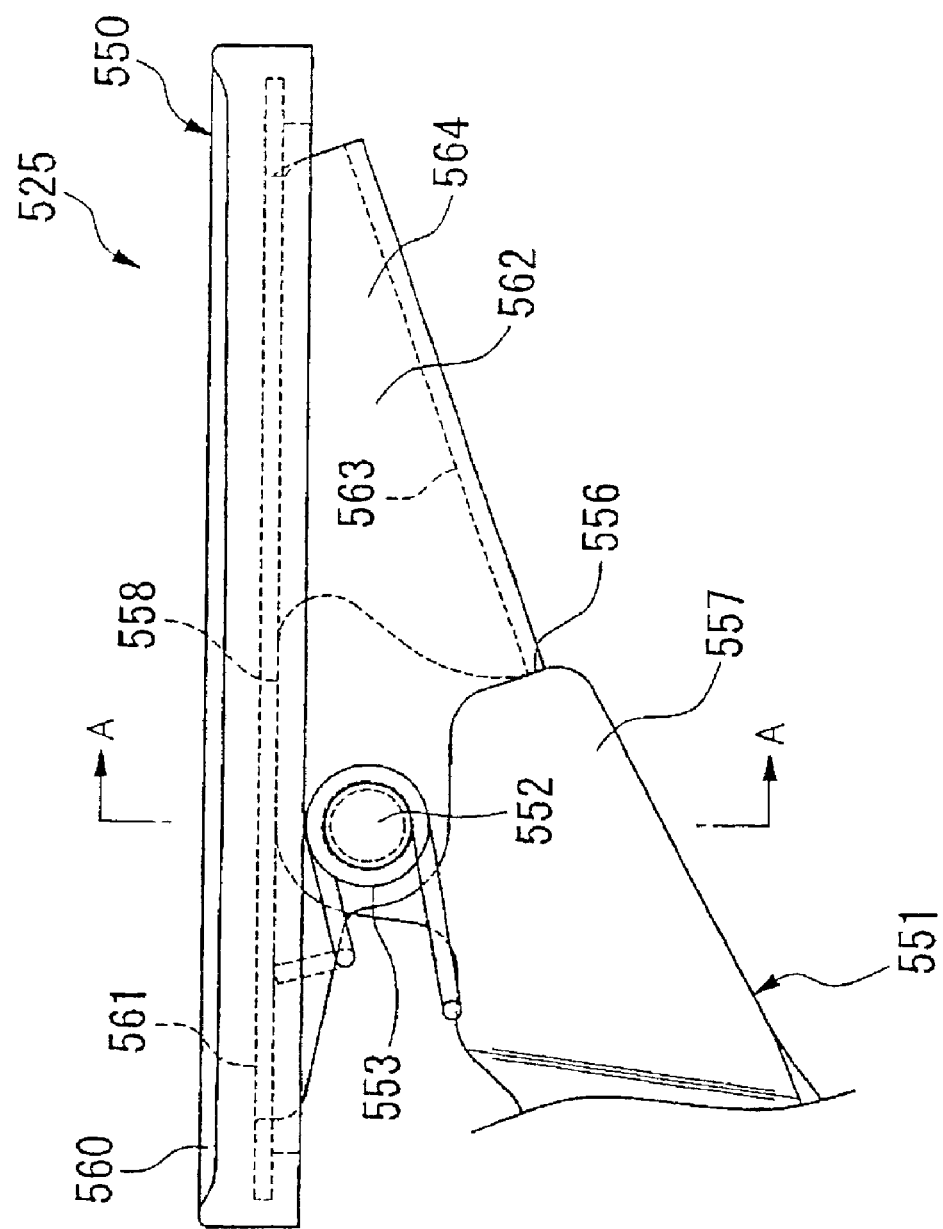
FIG. 30 is a front view showing a brake pedal of the motorcycle to which the embodiment of the invention is applied.
Figure 31:
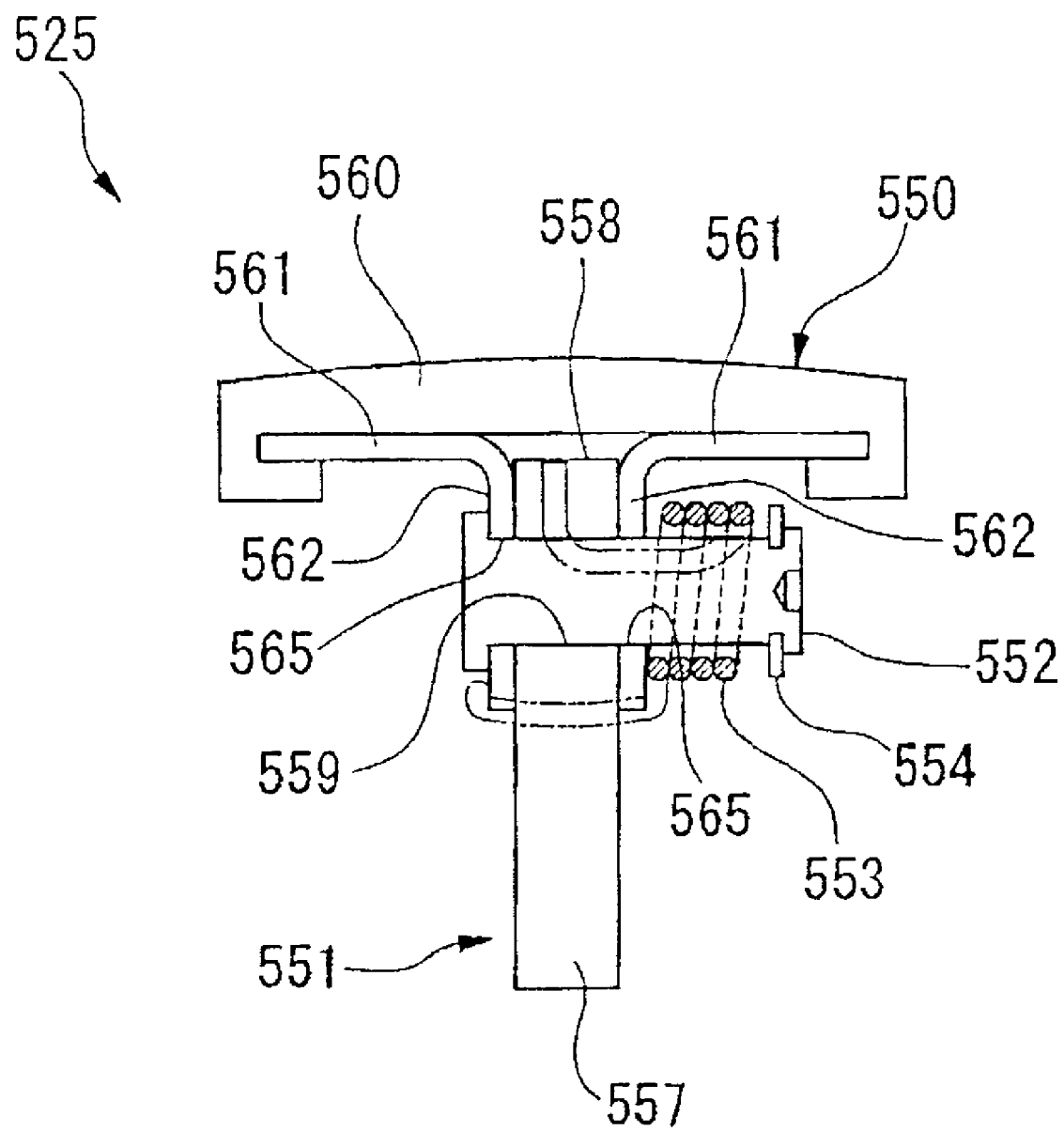
FIG. 31 is a sectional view viewed along a line A—A in FIG. 30 showing the brake pedal of the motorcycle to which the embodiment of the invention is applied.
Figure 32:
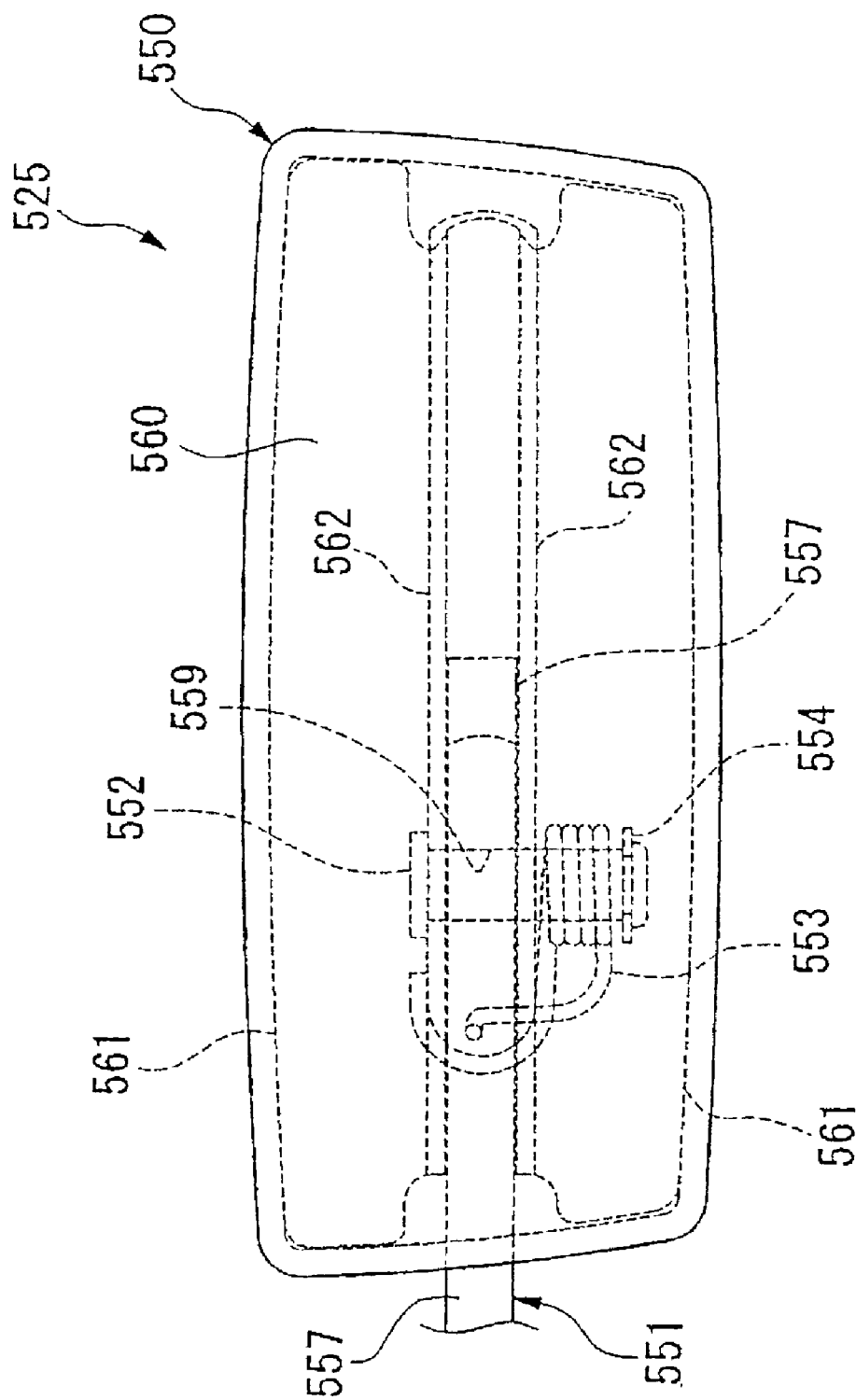
FIG. 32 is a plan showing the brake pedal of the motorcycle to which the embodiment of the invention is applied.

FIGS. 28 and 29 shows a braking device 520 attached to the front end in a lower part of the down pipe 33 on the right side of the body frame 2.

The braking device 520 is provided with a step bracket 521 bolted on the down pipe 33 and an integrating stay 519 fixed to the step bracket 521 by welding, and the integrating stay 519 includes a master cylinder stay part 522 extended upward and a brake pivot holder part 523.

The braking device 520 is also provided with a brake pivot shaft (a supporting shaft) 524 both ends of which are supported along the brake pivot holder part 523 in the direction of the width so that the brake pivot shaft can be turned, a brake pedal 525 fixed to one end on the right side of the vehicle body of the brake pivot shaft 524 and a brake arm (an operating member) 526 coupled to the other end on the side of the vehicle body of the brake pivot shaft 524 so that the brake arm can fluctuate. As a result of such arrangement, the brake pedal 525 is arranged outside on the right side of the vehicle body relatively apart from the vehicle body.

The brake pedal 525 is provided with a pedal pad 550 to which pedal effort is applied by a rider, a pedal lever 551 the side of the base of which is supported so that the pedal lever can be turned on the side of the vehicle body, which is extended ahead and diagonally upward from the side of the base and further, which supports the pedal pad 550 at the end so that the pedal pad can fluctuate and a pin 552 for supporting the pedal pad 550 on the pedal lever 551.

The braking device 520 is also provided with a return spring 527 inserted between the brake arm 526 and the integrating stay 519, a master cylinder (an operating part) 529 which is attached to the rear side of the master cylinder stay part 522 and an input part 528 of which is coupled to the brake arm 526 and a reservoir tank 530 attached to the upper end of the master cylinder stay part 522 for supplying and exhausting brake fluid to/from the master cylinder 529. Though the master cylinder 529 is not shown, it is arranged inside the outside end in the direction of the width of the down pipe 33 of the body frame 2 (inside the vehicle body).

In the meantime, the step bracket 521 supports a step plate (a step member) 531 for a rider to put his/her foot in a state in which the brake pedal 525 is arranged in the vicinity. On the left side of the vehicle body on which no braking device 520 is provided, the step bracket 521 is also provided and supports the step plate 531 for the rider to put his/her foot.

In the braking device 520, when the rider steps on the brake pedal 525, the brake pedal 525 is turned integrally with the brake pivot shaft 524 to one end of which the brake pedal 525 is coupled and integrally turns the brake arm 526 coupled to the other end of the brake pivot shaft 524 apart from the brake pedal 525. Hereby, the brake arm 526 presses the input part 528 of the master cylinder 529 upward and generates brake fluid pressure in the master cylinder 529.

As shown in FIGS. 28 and 29, the brake pedal 525 is provided with the pedal pad 550 to which pedal effort is applied by a rider, and the pedal lever 551 the side of the base of which is supported by the side of the vehicle body so that the pedal lever can be turned, which is extended ahead and diagonally upward from the side of the base and further, which supports the pedal pad 550 at the end so that the pedal pad can fluctuate. The brake pedal 525 is also provided with a pin 552 for supporting the pedal pad 550 on the pedal lever 551, a spring 553 for inserting the pin 552 inside and pressing the pedal pad 550 on one side in a direction of fluctuation and a washer 554 for preventing the pin 552 from falling.

The pedal lever 551 is provided with an extended part 556 supported so that the extended part can be turned on the side of the vehicle body as a result of it that the side of the base is fixed to the outside end in the vehicle body of the brake pivot shaft 524 arranged in the direction of the width. The extended part 556 is made of a plate and the side of the base is coupled to the brake pivot shaft 524 in a state in which a direction of the thickness is equivalent to the direction of the width and the extended part is extended ahead and diagonally upward from the side of the base.

The pedal lever 551 is provided with a support 557 that supports the pedal pad 550 provided on the side of the end of the extended part 556 in a direction which crosses the extended part 556 so that the pedal pad can fluctuate. The support 557 is made of a plate, is extended right from the end of the extended part 556 in a state in which a direction of the thickness is equivalent to a direction of the length of the extended part 556 and is further protruded upward from the end of the extended part. The extended part 556 and the support 557 are integrated and in the concrete, is formed by bending a planar member.

A hole 559 that pierces a protruded part in a direction of the thickness is formed in the protruded part 588 protruded upward on the side of the end of the support 557.

The pedal pad 550 is provided with a pair of tread formers 561 the side of the surface of each of which is treaded by a rider and which is covered with rubber and others 560, a pair of fittings 562 extended in a direction reverse to the cover 560 from the tread former 561 and attached to the support 557 in a state in which the fittings are arranged on both sides of the support 557 of the pedal lever 551 so that the fittings can be swung and a coupling part 563 for coupling a pair of fittings 562 on the side reverse to the tread former 561.

A pair of tread formers 561 are rectangular and are extended in reverse directions on the same plane from the edge on the side reverse to the coupling part 563 of each fitting 562. Each tread former 561 is extended in the same width.

A pair of fittings 562 have a slant part 564 in which quantity extended from the tread former 561 decreases on one side in a direction of the length of the tread former 561 and the coupling part 563 is formed in only the slant part 564. A hole 565 that pierces both fittings 562 is formed in a part in which no coupling part 563 is formed of the fitting 562.

A pair of tread formers 561, a pair of fittings 562 and one coupling part 563 are integrated. To be specific, they are formed by bending a planar member.

The pin 552 is inserted into the hole 565 of the fitting 562 and the hole 559 of the support 557 in a state in which a pair of fittings 562 of the pedal pad 550 are arranged on both sides of the support 557 of the pedal lever 551. Further, the spring 553 is provided with the pin 552 inside and the pedal pad 550 is supported by the pedal lever 551 by fitting the washer 554 to the pin 552.

At this time, one limit of the fluctuation of the pedal pad 550 for the pedal lever 551 is determined by touching the coupling part 563 of the pedal pad 550 to a contact part 566 on the side reverse to the extended part 556 of the support 557 in the pedal lever 551. In addition, the pedal pad 550 is pressed in a direction in which the coupling part 563 is touched to the contact part 566 by the pressure of the spring 553. That is, time when the pedal pad is located at the limit of the fluctuation is a normal state of the pedal pad 550 and in the normal state, the pedal pad 550 is located in the direction of the width of the vehicle body. In case any force is applied to the pedal pad 550 from the downside, the pedal pad 550 is turned so that the side of the right end is moved upward.

Figure 33:
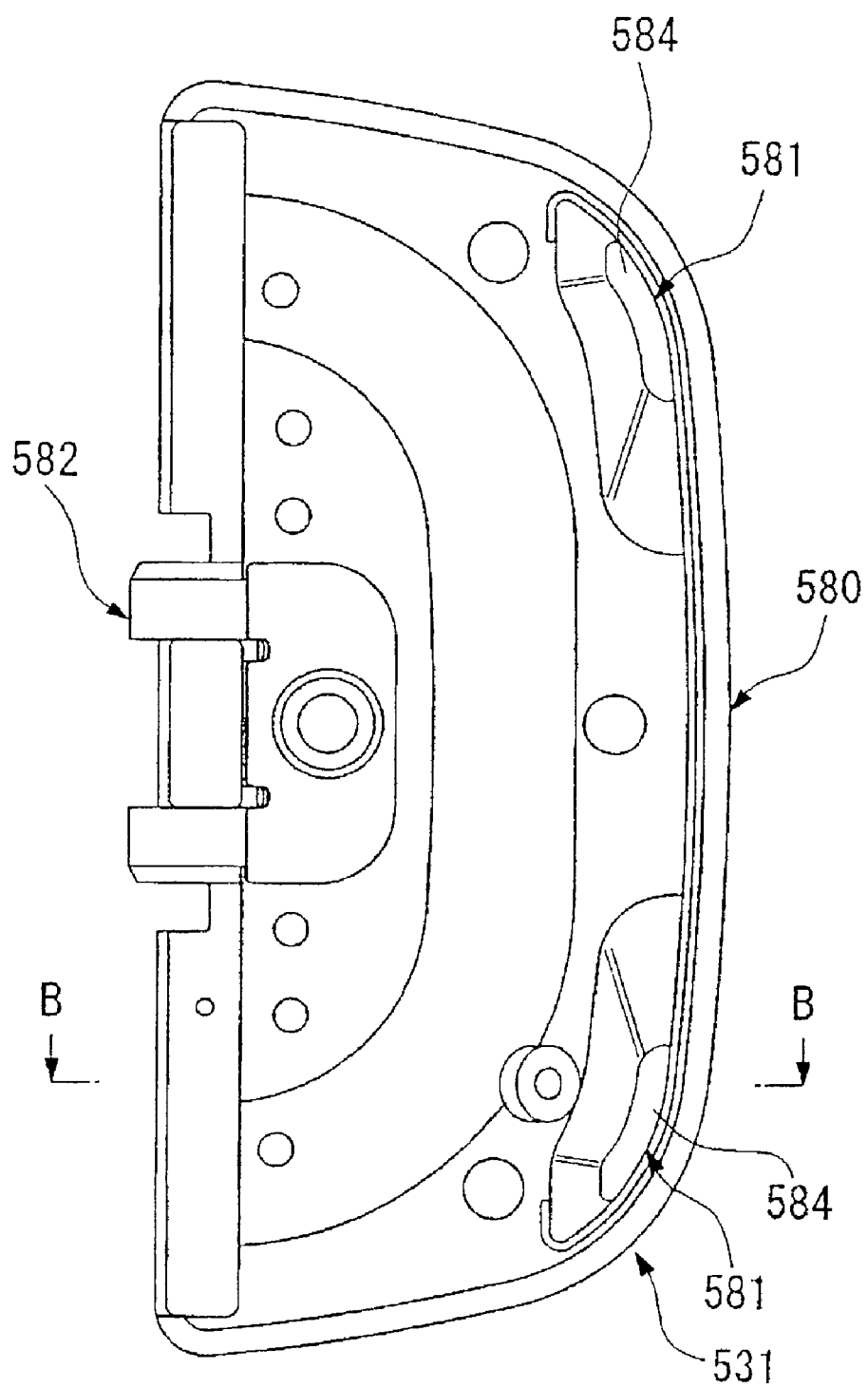
FIG. 33 is a bottom view showing a step plate of the motorcycle to which the embodiment of the invention is applied.
Figure 34:
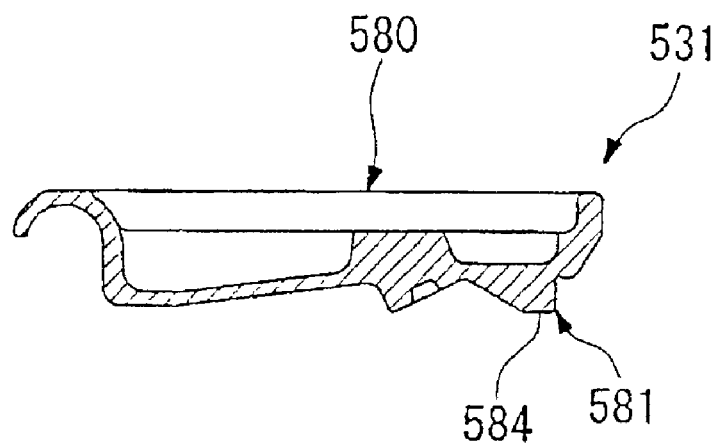
FIG. 34 is a sectional view viewed along a line B—B in FIG. 33 showing the step plate of the motorcycle to which the embodiment of the invention is applied.

The step plate (the step member) 531 is provided for a rider to put his/her foot. As shown in FIGS. 33 and 34, the step plate 531 is provided with a putting part 580 for a rider to put his/her foot, and a bank sensor 581 protruding downward from the putting part 580 and reaching the ground when the vehicle body tilts.

The putting part 580 is made of a substantially planar plate both corners on the side of one edge parallel longitudinally of which are curved and at the other edge parallel longitudinally, a fitting 582 supported by the step bracket 521 so that the fitting can be turned is formed. As shown in FIG. 28, a pair of supports 583 arranged before and after substantially perpendicularly are formed in the step bracket 521 and the fittings 582 of the step plate 531 are attached to these supports 583 so that the fitting can be turned. The longitudinal direction of the step plate 531 attached to the step bracket 521 is equivalent to the longitudinal direction of the vehicle body, the step plate is protruded outside in the direction of the width from the vehicle body and can fluctuate in a direction in which the protruded end is located above from this state.

On the side of the lower surface of the putting part 580 and on the side reverse to the fitting 582, the bank sensor 581 is formed on both sides in the longitudinal direction of the vehicle body so that it is protruded downward from the putting part 580. Each bank sensor 581 is longer in the longitudinal direction of the vehicle body, in addition, is slightly curved along the corner of the putting part 580 and is mutually symmetrical. A grounded part 584 on the lower surface grounded when the vehicle body tilts of the bank sensor 581 is substantially planar.

In the step plate 531, the putting part 580 and the two bank sensors 581 are integrated. That is, the step plate 531 is a die-casting made of an aluminum alloy for example and in die-casting, the putting part 580 and the two bank sensors 581 are integrated.

The structure of the supports 583 of the right and left step brackets 521 in the vehicle body is the same and therefore, the step plates 531 in the same shape are attached to the right and left step brackets 521.

Figure 35:
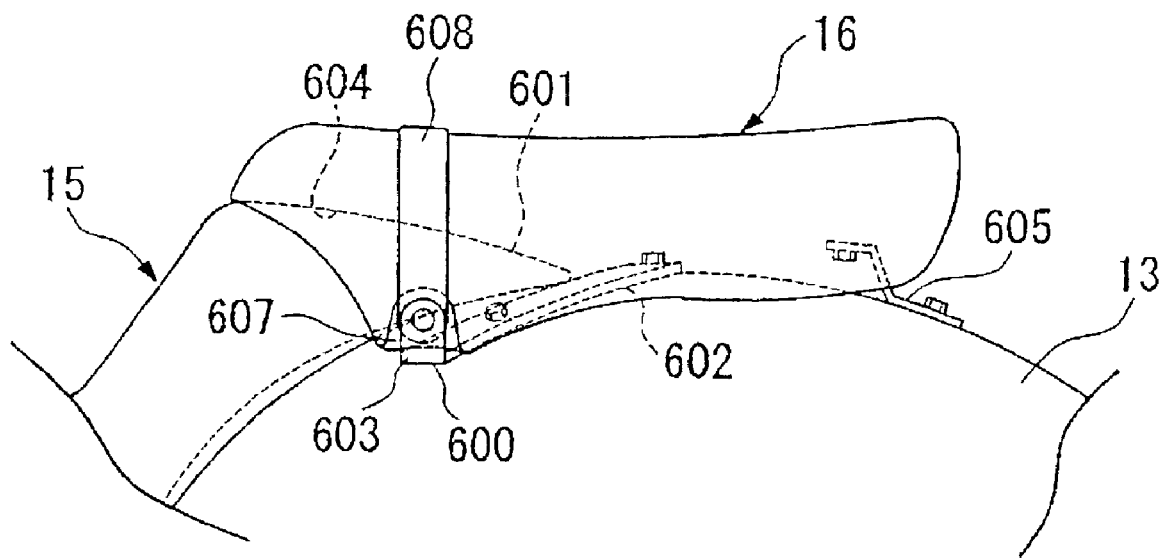
FIG. 35 is a side view showing seat attachment structure of the motorcycle to which the embodiment of the invention is applied.
Figure 36:
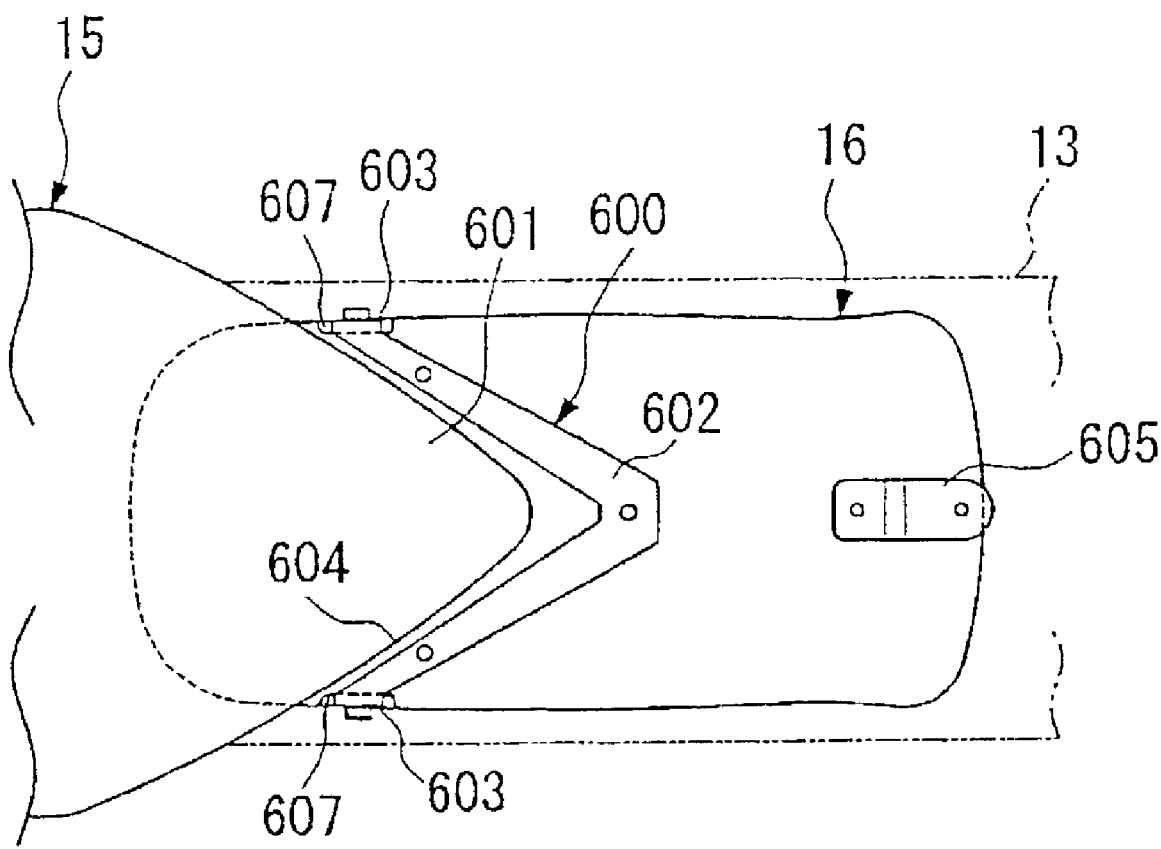
FIG. 36 is a bottom view showing the seat attachment structure of the motorcycle to which the embodiment of the invention is applied.

FIGS. 35 and 36 provide an explanation of the seat attachment structure in which the front of the pillion seat 16 is attached to the rear fender 13 on the far rear side of the main seat 15. An installation stay 600 is attached to the rear fender 13. The right and left sides of the pillion seat 16 are supported by the installation stay 600.

On the rear side of the main seat 15, a convex portion 601 which is V-shaped when viewed from the top and is also V-shaped when viewed from the side is formed (the main seat is a so-called gunfighter type), the front is put on the body frame 2 and the rear is put on the rear fender 13. In this state, the front of the main seat 15 is bolted on the body frame 2 in the vicinity of the fuel tank 14 though it is not shown in detail and the rear is also bolted on a stay and others installed on the body frame 2.

The installation stay 600 for attaching the pillion seat 16 has an intermediate part 602 which is V-shaped when viewed from the top according to the shape when viewed from the top of the convex portion 601 of the main seat 15. The installation stay 600 is provided with supports 603 bent in the same direction from both ends of the intermediate part 602. The installation stay 600 is bolted on the rear fender 13 in the intermediate part 602 in a state in which the intermediate part 602 is located outside the convex portion 601 of the main seat 15. In other words, the supports 603 are arranged on the front side of the intermediate part 602. At this time, a direction of the thickness of both supports 603 of the installation stay 600 is equivalent to the direction of the width in the vehicle body. The supports 603 protrude perpendicularly upward from the rear fender 13, and in addition, are overlapped with the convex portion 601 of the main seat 15 in the longitudinal direction.

A concave portion 604 is formed in the front of the pillion seat 16 so that the convex portion 601 of the main seat 15 fixed to the rear fender 13 can be inserted and a rear installation stay 605 is attached on the lower surface of the rear. Further, a fitting 607 is provided on the right and left sides of the front of the pillion seat 16. The fittings 607 on the right and left sides of the pillion seat 16 are screwed on the supports 603 on the right and left sides of the installation stay 600 in a state in which the convex portion 601 of the main seat 15 is fitted into the concave portion 604 and is put on the rear fender 13. In the meantime, the rear of the pillion seat is attached to the rear fender 13 via the rear installation stay 605. When the fittings 607 on the right and left sides of the pillion seat 16 are attached to the supports 603 on the right and left sides of the installation stay 600, both ends of a seat belt 608 stretched on the surface of the pillion seat 16 are also jointly fastened to the supports 603. That is, the installation stay 600 also supports the seat belt 608. The front in which the concave portion 604 is formed of the pillion seat 16 is thin because of the concave portion 604. However, the thickness of the front is substantially equivalent to thickness to which the thickness of the convex portion 601 of the main seat 15 is added because the convex portion 601 of the main seat 15 is overlapped.

Figure 37:
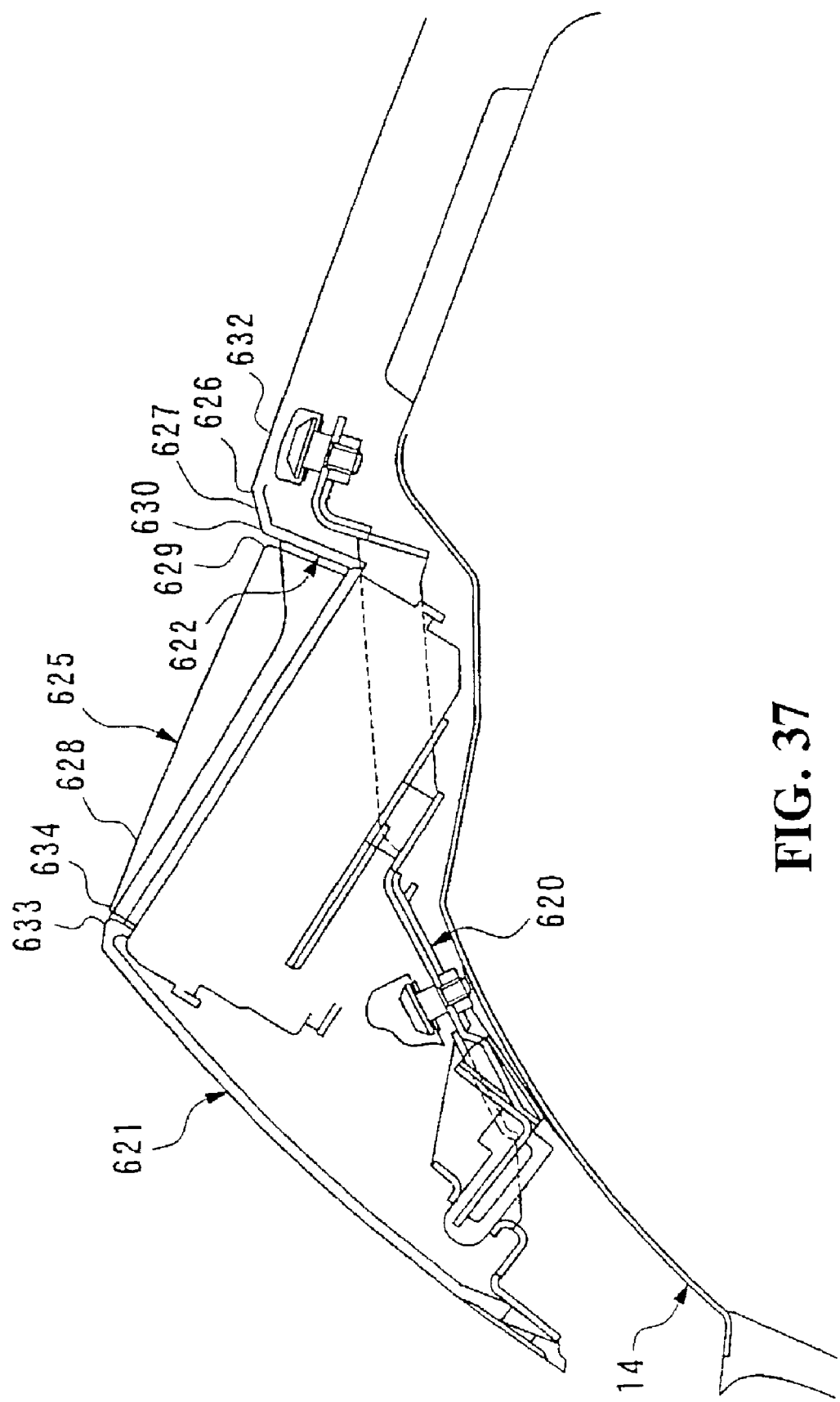
FIG. 37 is a side sectional view showing a meter cover of the motorcycle to which the embodiment of the invention is applied.
Figure 38:
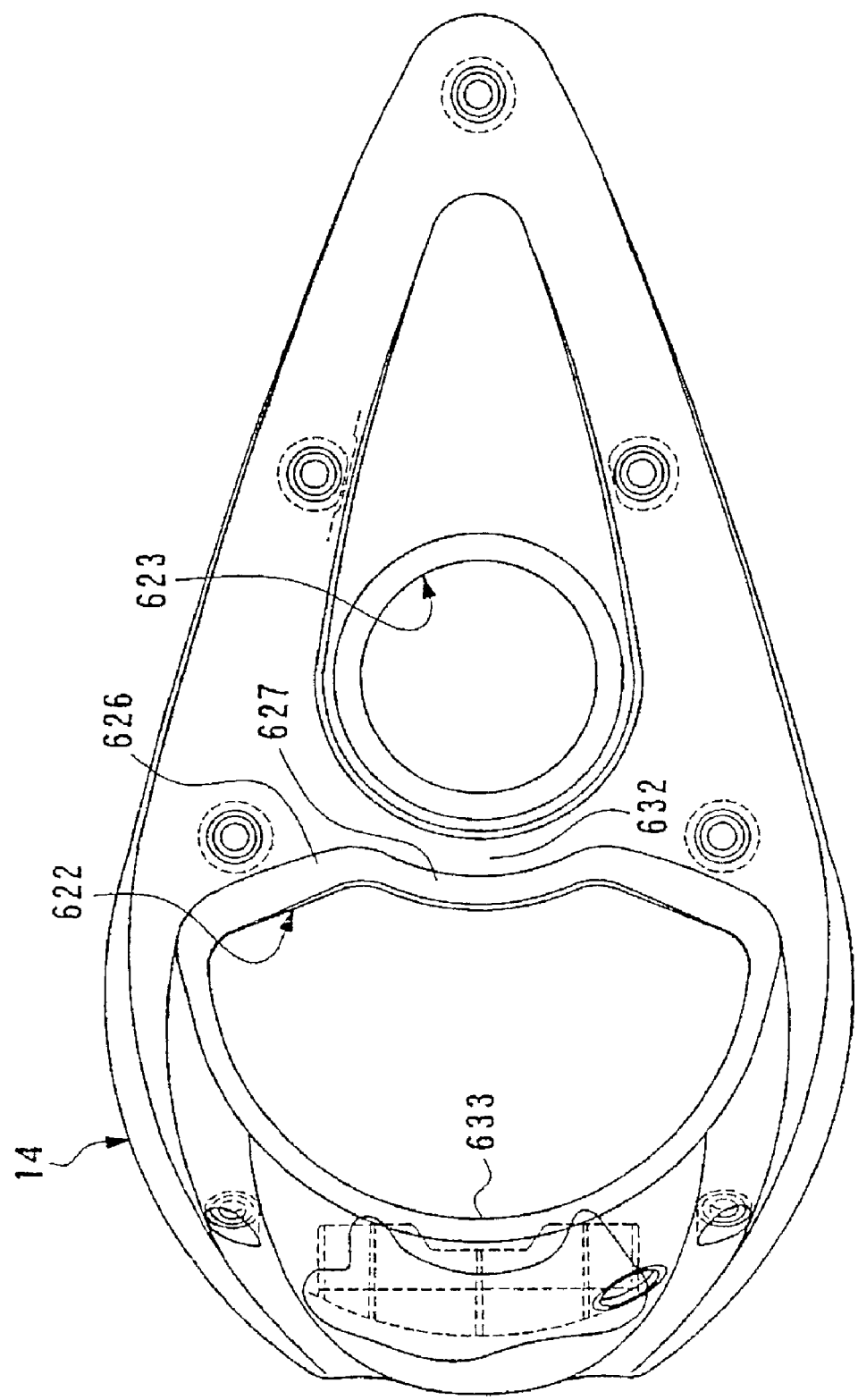
FIG. 38 is a plan showing the meter cover of the motorcycle to which the embodiment of the invention is applied.

As shown in FIG. 37, a supporting member 620 is attached on the upper surface of the fuel tank 14. A meter cover 621, on the surface of which a plated layer is formed, is attached via the supporting member 620 and others. As shown in FIG. 38, openings 622, 623 are provided on the meter cover 621 before and after. The opening 623 on the rear side is circular and the opening 622 on the front side has a shape acquired by removing a small fan in the center from a fan. A meter is arranged inside these openings 622, 623. (Only a meter 625 arranged in the front opening 622 is shown in FIG. 37.)

A chamfered part 627 the sectional shape (the longitudinal and perpendicular sectional shape) tilted so that the chamfered part becomes lower ahead of which is linear is formed at the edge 626 on the rear side of the front opening 622 of the meter cover 621. Further, the height of the edge 629 on the rear side of the upper surface 628 of the meter 625 arranged in the opening 622 is set so that it is equal or lower to/than the height of the lower end 630 of the chamfered part 627.

The edge 633 on the front side of the opening 622 is arranged on a line extended ahead of the upper surface 632 ranging to the rear of the chamfered part 627 of the meter cover 621. Further, the height of the edge 634 on the rear side of the upper surface 628 of the meter 625 is substantially matched with the height of the edge 633 on the front side of the opening 622.

As a result, an angle of the upper surface 628 of the meter 625 is different from an angle of the chamfered part 627 of the meter cover 621 and an angle of the upper surface 632 ranging to the rear of the chamfered part 627. To be specific, the upper surface 632 ranging to the rear of the chamfered part 627 is tilted by a predetermined angle so that the front is located above, the chamfered part 627 is tilted by a predetermined angle so that the front is located below, and the upper surface 628 of the meter 625 is tilted by a more predetermined angle than the upper surface 632 ranging to the rear of the chamfered part 627 so that the front is located above.

Figure 39:
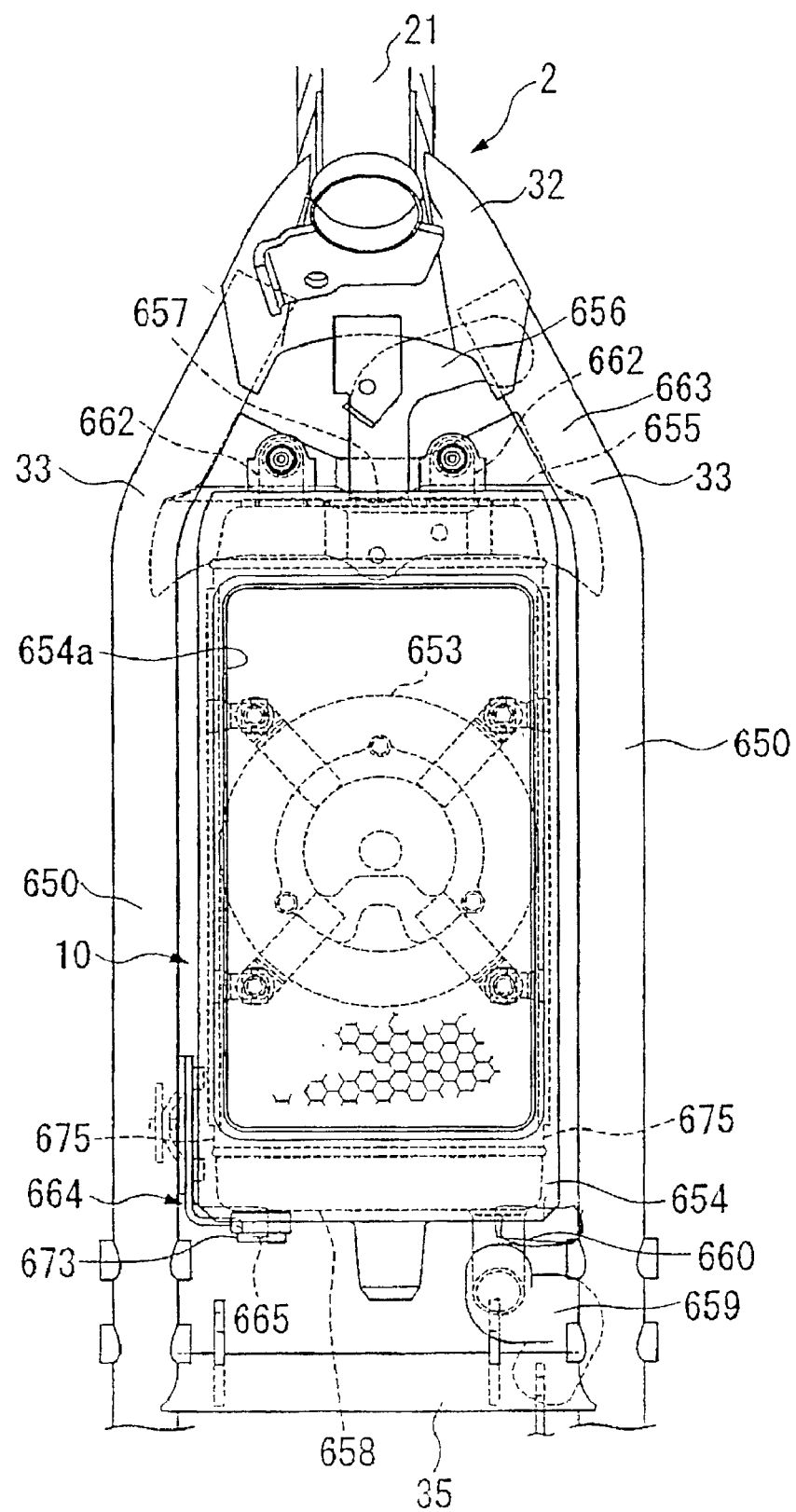
FIG. 39 is a front view showing radiator support structure of the motorcycle to which the embodiment of the invention is applied.
Figure 40:
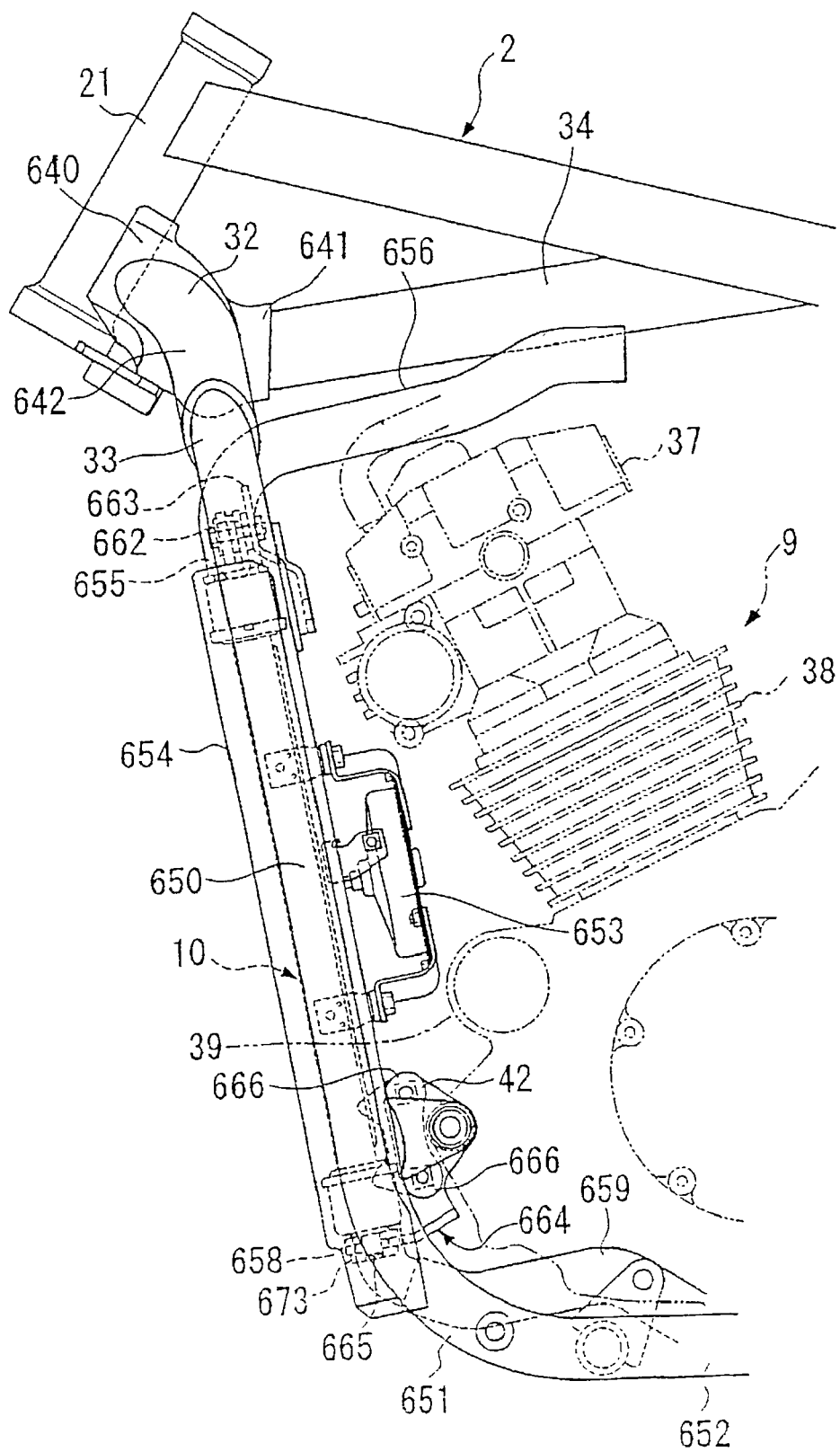
FIG. 40 is a side view showing the radiator support structure of the motorcycle to which the embodiment of the invention is applied.
Figure 41:
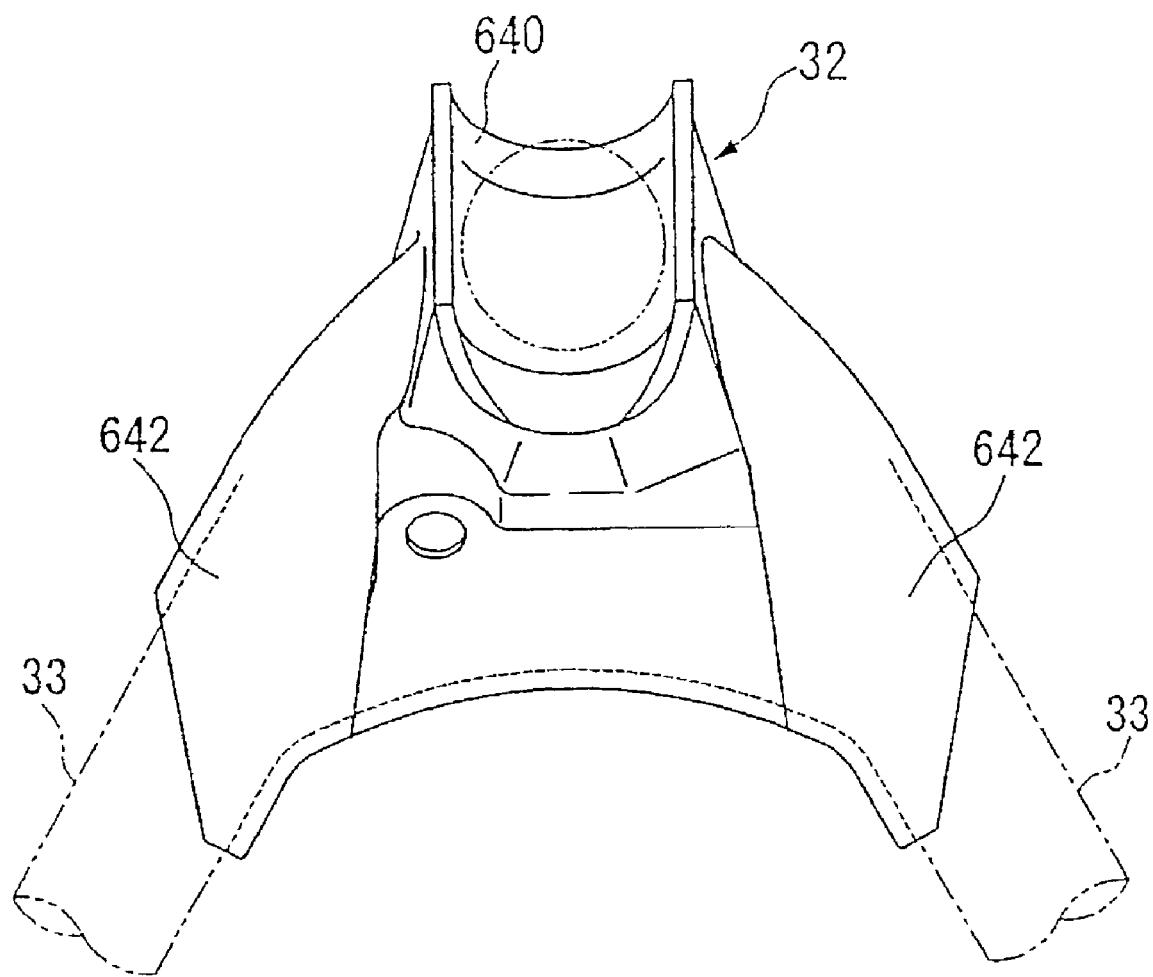
FIG. 41 is shows a gusset of the motorcycle to which the embodiment of the invention is applied.

As shown in FIGS. 39 and 40, a fitting 640 having a shape like a cylinder cut in parallel with the axis is provided on one side of the gusset 32 welded to the head pipe 21 of the body frame 2 supporting the front fork 3 is provided with a prismatic rear fitting part 641 extending in a direction reverse to the fitting 640 and a pair of cylindrical lower fitting parts 642 symmetrically extending from between the fitting 640 and the fitting part 641. The gusset 32 can be formed in a relatively free shape using a core and in addition, is an integrally molded product formed by white-heart malleable iron having sufficient weld strength owing to decarbonization.

The gusset 32 is fixed to the head pipe 21 by bonding the gusset 32 to the head pipe 21 in the fitting 640 and welding the whole periphery of the fitting 640. The subpipe 34 is fixed to the gusset 32 by fitting the prismatic subpipe 34 inside the prismatic rear fitting part 641 of the gusset 32 and welding the whole periphery of these. Further, both down pipes 33 are fixed to the gusset 32 by respectively fitting the cylindrical down pipe 33 inside each cylindrical lower fitting part 642 of the gusset 32 and welding the whole periphery of the respective. The subpipe 34 and the down pipe 33 can be welded without alignment by forming the gusset 32 by white-heart malleable iron, inserting the subpipe 34 and the down pipe 33 as described above and connecting by welding. In addition, the gusset 32 is arranged in a conspicuous part between the fuel tank 14 and the front fork 3, however, the subpipe 34 and the down pipe 33 can be connected via the gusset and the outside appearance is also satisfactory.

A pair of right and left down pipes 33 branched in two directions from the head pipe 21 of the body frame 2 supporting the front fork 3 via the gusset 32 and extended downward are respectively provided with a downward extended part 650 extended downward from the head pipe 21, a bent part 651 bent backward from a lower part of the downward extended part 650 and a backward extended part 652 extended backward from a lower part of the bent part 651. The radiator 10 is supported in a housed state between a pair of right and left downward extended parts 650.

That is, the radiator 10 is substantially rectangular and is supported by the downward extended parts 650 in a state in which the longitudinal direction is equivalent to a direction of the downward extended part 650 of the down pipe 33. Further, the whole length of the radiator 10 overlaps with the downward extended part 650 in the longitudinal direction.

On the rear side of the radiator 10, that is, on the side of the engine 9, a fan 653 is provided and a separate cover 654 having an opening 654*a* is attached to the front side of the radiator 10. An inlet 657 to which a cooling water pipe 656 for making cooling water flow is attached is provided in the center in a direction of the width of the upper surface 655 of the radiator 10 so that the inlet is protruded upward, and an exhaust port 660 to which a cooling water pipe 659 for making cooling water flow is attached is provided on one side in a direction of the width of the lower surface 658 of the radiator 10 so that the exhaust port is protruded downward. Cooling water before cooling is led into the inlet 657 from the side of the engine 9 via the cooling water pipe 656 and cooling water after cooling is exhausted toward the side of the engine 9 from the exhaust port 660 via the cooling water pipe 659.

A pair of right and left upper part supports 662 are provided on the upper surface 655 directed upward in the upper part of the radiator 10 so that the supports are protruded upward. In the meantime, an upper part installation member 663 supported by the downward extended parts 650 so that the upper part installation members connect the right and left downward extended parts 650 is provided on the upside of the radiator 10. A pair of right and left upper part supports 662 of the radiator 10 are both bolted and fixed on the upper part installation member 663. In this manner, the upper part of the radiator 10 is fixed to the downward extended parts 650.

A lower part support 665 is provided on one side in the direction of the width of the vehicle body, in the concrete, on the right side on the lower surface 658 directed downward in the lower part of the radiator 10 so that the lower part support is protruded downward and is supported by an engine hanger (the supporting member) 664 for supporting the engine 9 by the bracket 42 of the down pipe 33.

Figure 42:
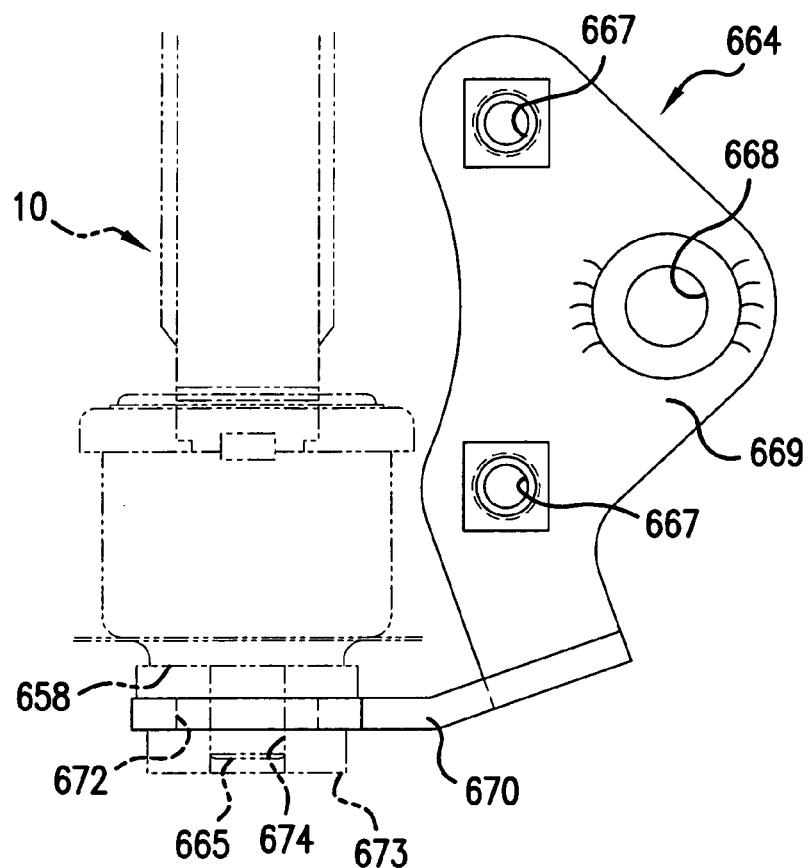
FIG. 42 is a side view showing an engine hanger of the motorcycle to which the embodiment of the invention is applied.

That is, the engine hanger (supporting member) 664 for supporting the engine 9 by the down pipe 33 has a shape shown in FIG. 42. As can be seen in FIG. 42, the engine hanger 664 is provided with a mounting hole 667 bolted on upper and lower fixing parts 666 of the bracket 42 fixed by welding on the rear side of the downward extended part 650 (shown in FIG. 40), a main plate 669 which is arranged on the rear side of the mounting hole 667 in a state in which the main plate is fixed to the bracket 42 of the down pipe 33 via the mounting holes 667 and in which a supporting hole 668 bolted at the front end of the crankcase 39 of the engine 9 is formed, and a supporting plate 670 extended forward from the main plate 669 for supporting the radiator 10.

A supporting hole 672 is formed on the side of the front end of the supporting plate 670. A grommet 673 is attached to the supporting hole 672 and the lower part support 665 of the radiator 10 is inserted into a fitting hole 674 inside the grommet 673. In this manner, the lower part of the radiator 10 is supported by the downward extended part 650.

As described above, both upper part supports 662 are bolted on the upper part installation member 663 supported by both downward extended parts 650 and the lower part support 665 is inserted into the grommet 673 of the engine hanger 664 attached to the down pipe 33 on the right side in the vehicle body. In this state, the radiator 10 is supported between the right and left downward extended parts 650 in the same longitudinal direction as that of the downward extended part 650. In this state, the radiator overlaps with the entire length of the downward extended part 650. The upper part support 662 and the lower part support 665 of the radiator 10 provide the only means by which the radiator is supported by the down pipes 33.

Therefore, when the radiator is supported as described above, no separate supporting members are provided for coupling the right and left sides 675 of the radiator 10 and each of the downward extended parts 650 of the down pipe 33. That is, the main plate 669 of the engine hanger 664 is located on the rear side of the downward extended part 650. The main plate 669 is bolted to the fixing member 666 of the down pipe 33. With this design, the engine hanger 664 is not located between the radiator 10 and the downward extended part 650.

The front winker (a luminous element) 5 and the rear winker (a luminous element) 17 may be also configured as follows.

Figure 43:
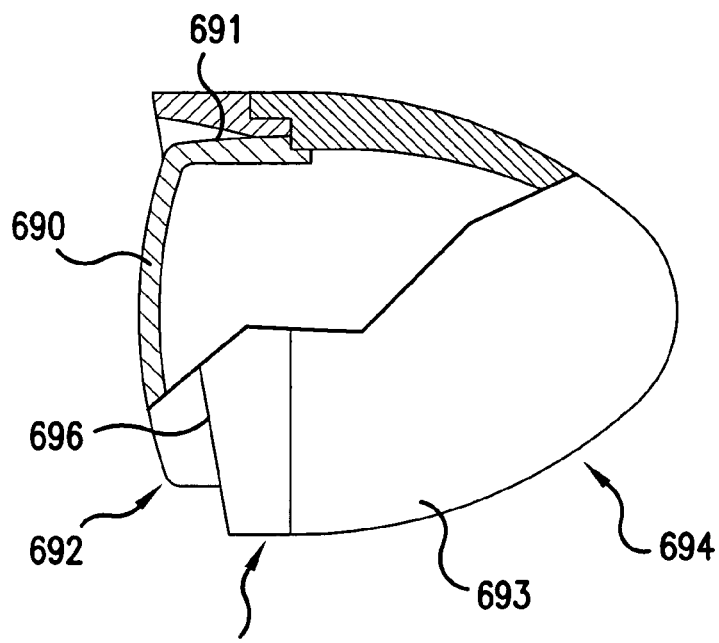
FIG. 43 is a side sectional view showing a luminous element of the motorcycle to which the embodiment of the invention is applied.
Figure 44:
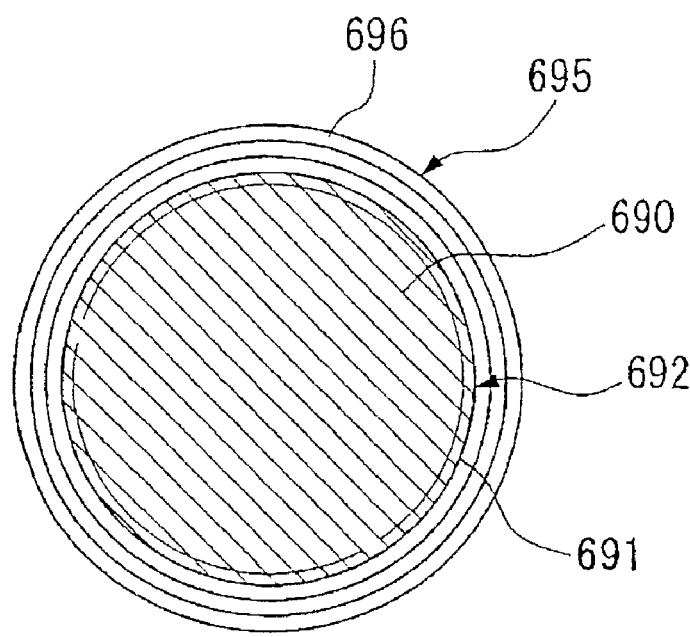
FIG. 44 is a front view showing the luminous element of the motorcycle to which the embodiment of the invention is applied.
Figure 45:
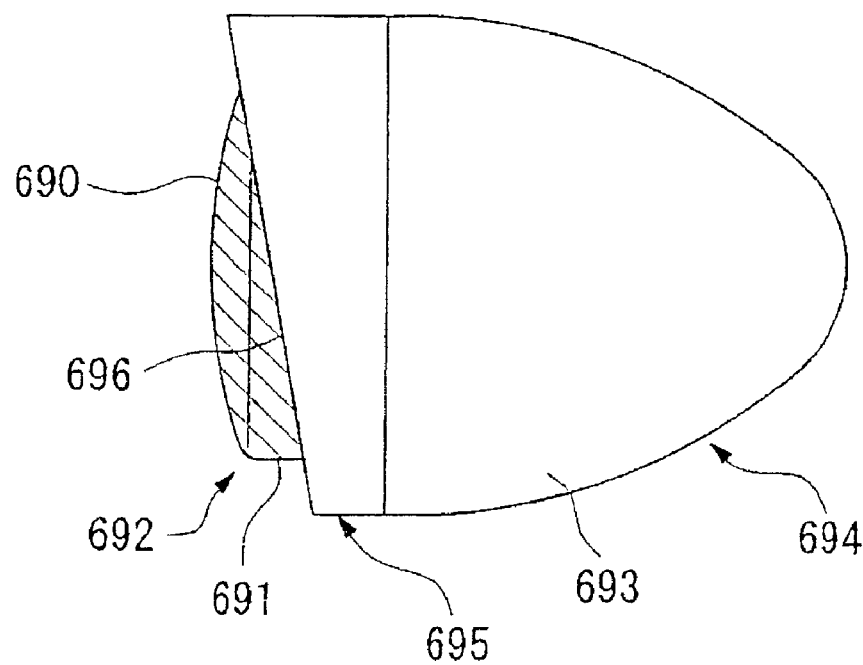
FIG. 45 is a side view showing the luminous element of the motorcycle to which the embodiment of the invention is applied.

As shown in FIGS. 43 to 45, the front winker 5 and the rear winker 17 are provided with a lens 692 made of transparent synthetic resin having a substantially disclike luminous front part 690 in which light can be transmitted and a substantially cylindrical luminous side part 691 in which light can be transmitted, the body of a luminous element 694 having an opaque housing 693 in which the lens 692 is attached to the side reverse to the luminous front part 690 of the luminous side part 691 and a light emission portion not shown such as a bulb is arranged inside and a separate opaque cover 695 covering only a part of the luminous side part 691 out of the lens 692 in the body of the luminous element 694. The luminous front part 690 and the luminous side part 691 in the respectives of which light can be transmitted transmit light by the inside light emission portion outside. "Front" of the luminous front part 690 denotes a main direction of emission, the front winker 5 is located in the front of the vehicle body and the rear winker 17 is located in the rear of the vehicle body.

The front edge 696 of the cover 695 is tilted so that the exposure when viewed from the side of the luminous side part 691 becomes larger on the downside and in other words, the front edge of the cover is tilted so that the upper part of the luminous side part 691 is covered with larger area. The cover 695 is fixed to the housing 693 together with the lens 692. A plated layer of the same color for example is formed on the surface of the cover 695 and on the surface of the housing 693.

Figure 46:
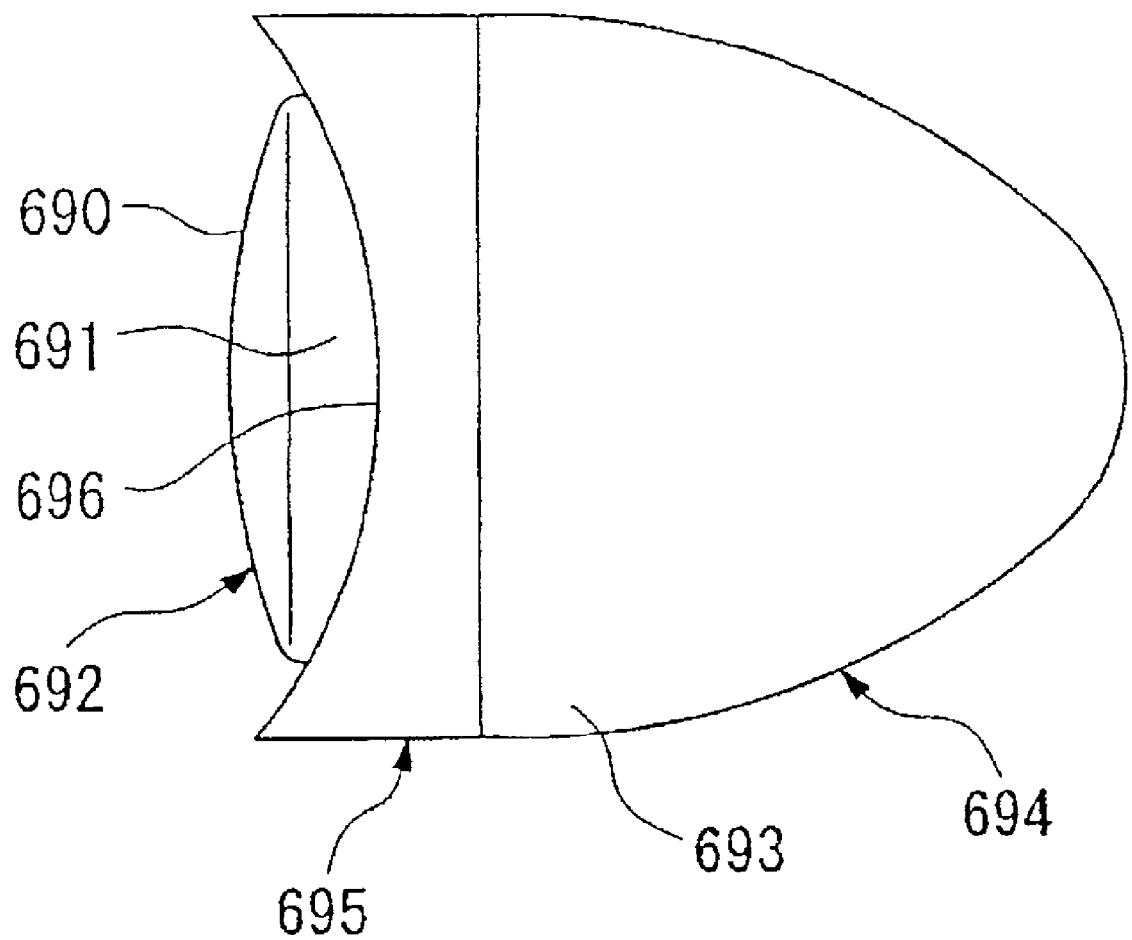
FIG. 46 is a side view showing another example of the luminous element of the motorcycle to which the embodiment of the invention is applied.

As shown in FIG. 46, the front edge 696 of the cover 695 may be also arc-shaped when viewed from the side so that the exposure when viewed from the side of the luminous side part 691 of the lens 692 is maximum in a vertical intermediate part.

According to the radiator structure in this embodiment, as the radiator 10 is supported by the down pipes 33 via the upper part support 662 provided on the upper surface 655 of the radiator 10 and the lower part support 665 provided on the lower surface 658 of the radiator 10. As a result, even though the radiator 10 is supported in the housed state between the right and left down pipes 33, no member for coupling the radiator 10 and each down pipe 33 is required to be arranged between the radiator 10 and each down pipe 33. Therefore, the width of the radiator 10 housed between both down pipes 33 can be increased.

Therefore, the area of the radiator 10 can be increased, while still securely housing the radiator 10 between the two down pipes 33.

In addition, since the lower part support 665 of the radiator 10 is supported by the engine hanger 664 that supports the engine 9 by the down pipe 33, a separate supporting member to support the lower part support 665 of the radiator is not required. Therefore, the number of parts and the cost can be reduced.

As described in detail above, according to the first aspect of the invention, the radiator is supported in a housed state between each of the two down pipes. However, since the radiator is supported by the down pipes via the upper part support provided on the upper surface of the radiator and the lower part support provided on the lower surface of the radiator, no separate part for coupling the radiator and each down pipe is required to be arranged between the radiator and each down pipe. As a result, the width of the radiator housed between the down pipes can be increased.

Therefore, with this invention, the radiator can be increased in size while providing a secure means of supporting it in the housed state between the down pipes.

According to the second aspect of the present invention, since the lower part support of the radiator is supported by the supporting member that supports the engine by the down pipe, a no separate supporting member is required for supporting to support the lower part support. Therefore, the number of parts and the cost can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A radiator support structure for a vehicle that supports a radiator in a state in which the radiator is housed between a head pipe of a body frame supporting a front fork and a down pipe which branches into two downward extending parts, comprising:
   an upper part support provided on an upper surface of the radiator; and
   a lower part support protruding downward on one side of a lower surface of the radiator in the direction of the width of the vehicle, wherein the radiator is supported by the down pipes via said upper part support and lower part support, the radiator extending parallel to and being disposed between the two downward extending parts;
   a bracket extending rearwardly from at least one of the downward extending parts;
   a supporting member including a main plate attached to the bracket and a supporting plate extending forward from the main plate to a position between the two downward extending parts for supporting the radiator
   wherein an engine is attached to the main plate, thereby causing the engine to be supported by the down pipe.

2. The radiator support structure according to claim 1, wherein the upper part support is pair a of right and left upper part supports protruding upward, said pair of upper part supports being bolted to an upper installation member supported by the down pipe, thereby fixing the upper part of the radiator to the down pipe.

3. The radiator support structure according to claim 1, said supporting member being provided with a supporting hole fitted with a grommet, wherein the lower part support of the radiator is inserted into said grommet, thus enabling the radiator to be supported by the down pipe.

4. The radiator support structure according to claim 1, further comprising an exhaust port provided on a side of the lower surface of the radiator which is opposite the one side of the lower surface of the radiator where the lower part support protrudes downward.

5. A radiator support structure for a vehicle that supports a radiator in a state in which the radiator is housed between a head pipe of a body frame supporting a front fork and a down pipe which branches into two downward extending parts, comprising:
   an upper part support provided on an upper surface of the radiator; and
   a lower part support protruding downward on a lower surface of the radiator, said radiator being substantially rectangular in shape and being supported by the down pipes via said upper part support and lower part support, and said radiator being disposed between the two downward extending parts in a manner such that right and left sides of the radiator are parallel to the two downward extending parts, said radiator overlapping a whole length of the two downward extended parts of the down pipe; and a bracket extending rearwardly from at least one of the downward extending parts;

a supporting member attached to the bracket, the supporting member including a main plate for attaching an engine of the vehicle, the main plate being bolted to the bracket, thereby causing the engine to be supported by the down pipe, the supporting member also including a forward extending portion for supporting said lower part support.

6. The radiator support structure according to claim 5, wherein the upper part support is a pair of right and left upper part supports protruding upward, said pair of upper part supports being bolted to an upper installation member supported by the down pipe, thereby fixing the upper part of the radiator to the down pipe.

7. The radiator support structure according to claim 5, wherein the supporting member attached to the bracket supports an engine by the down pipe.

8. The radiator support structure according to claim 5, said supporting member being provided with a supporting hole fitted with a grommet, wherein the lower part support of the radiator is inserted into said grommet thus enabling the radiator to be supported by the down pipe.

9. The radiator support structure according to claim 5, wherein the lower part support of the radiator is fitted to the forward extending portion, thereby causing the lower surface of the radiator to be supported by the down pipe.

10. The radiator support structure according to claim 5, wherein the upper part support of the radiator is attached with a bolt, the bolt having an axis extending in a longitudinal direction of the vehicle.

11. A radiator support structure for a vehicle that supports a radiator in a state in which the radiator is housed between a head pipe of a body frame supporting a front fork and a down pipe which branches in two directions and extends downward, comprising:

an upper part support provided on an upper surface of the radiator; and a lower part support protruding downward on a lower surface of the radiator, a bracket extending rearwardly from at least one of the downward extending parts;

a supporting member attached to the bracket, wherein the radiator is supported by the down pipes via said upper part support and lower part support, and wherein said radiator is substantially rectangular in shape and overlaps a whole length of a downward extended part of the down pipe, wherein the lower part support is supported by the supporting member, wherein the lower part support is provided on one side of the lower surface of the radiator in the direction of the width of the vehicle, and said supporting member also serving as an engine hanger for supporting an engine of the vehicle.

12. A radiator support structure for a vehicle that supports a radiator in a state in which the radiator is housed between a head pipe of a body frame supporting a front fork and a down pipe which branches into two downward extending parts, comprising:

an upper part support provided on an upper surface of the radiator; and a lower part support provided on a lower surface of the radiator, wherein the radiator is supported by the down pipes via said upper part support and lower part support; and a bracket extending rearwardly from at least one of the downward extending parts;

a supporting member attached to the bracket, wherein said lower part support is supported by a forward extending portion of the supporting member, said supporting member also serving as an engine hanger for supporting an engine of the vehicle, and wherein the radiator is mounted between the two downward extending parts and on a plane formed by the two downward extending parts.

* * * * *